United States Patent
Salerno

(10) Patent No.: US 7,232,062 B1
(45) Date of Patent: Jun. 19, 2007

(54) METHOD AND APPARATUS FOR MONITORING THE STATUS AND TRANSFER OF FOOD PRODUCTS

(76) Inventor: Mark Salerno, 13 Harmony Rd., Huntington, NY (US) 11743

( * ) Notice: Subject to any disclaimer, the term of this patent is extended or adjusted under 35 U.S.C. 154(b) by 679 days.

(21) Appl. No.: 09/692,578

(22) Filed: Oct. 19, 2000

Related U.S. Application Data

(60) Provisional application No. 60/160,878, filed on Oct. 22, 1999.

(51) Int. Cl.
G06K 15/00 (2006.01)
G06Q 30/00 (2006.01)

(52) U.S. Cl. .................... 235/383; 235/385; 705/15

(58) Field of Classification Search ............... 705/15, 705/7, 8, 10; 235/383, 385; 707/3, 10
See application file for complete search history.

(56) References Cited

U.S. PATENT DOCUMENTS

| | | | |
|---|---|---|---|
| 4,737,463 A | | 4/1988 | Bhattracharjee et al. |
| 4,812,963 A | | 3/1989 | Albrecht et al. |
| 5,043,860 A | | 8/1991 | Koether et al. |
| 5,045,283 A | | 9/1991 | Patel |
| 5,132,914 A | * | 7/1992 | Cahlander et al. .......... 700/211 |
| 5,218,527 A | * | 6/1993 | Ishikawa et al. .............. 705/15 |
| 5,357,426 A | * | 10/1994 | Morita et al. .................. 700/90 |
| 5,377,097 A | * | 12/1994 | Fuyama et al. ............... 705/15 |
| 5,590,586 A | | 1/1997 | Ulfig et al. |
| 5,667,303 A | | 9/1997 | Arens et al. |
| 5,712,985 A | * | 1/1998 | Lee et al. ....................... 705/7 |
| 5,875,430 A | | 2/1999 | Koether |
| 6,009,400 A | | 12/1999 | Blackman |
| 6,011,243 A | * | 1/2000 | Arnold et al. .............. 219/506 |
| 6,026,372 A | | 2/2000 | Savage |
| 6,052,667 A | | 4/2000 | Walker et al. |

(Continued)

OTHER PUBLICATIONS

McD's puts new priority on speed (McDonald's new prototype in Colorado Springs, CO, serves up food orders in average 2.1 minutes; 30% faster than regular units; prototype also cuts waste); Advertising Age; v. 68; n. 15; Apr. 14, 1997.*

(Continued)

Primary Examiner—Andrew Joseph Rudy
(74) Attorney, Agent, or Firm—Gerald T. Bodner

(57) ABSTRACT

A system and method is provided for monitoring a status of a plurality of products, such as prepared food, located in product locations within stations throughout a restaurant. The status of each product indicates whether that product exists in a particular storage location, and whether that product has exceeded its shelf life or hold time. The storage time which has elapsed for each product is automatically counted and compared to the hold time. A cook time, which is that duration of time required to cook a particular product, is also maintained for each of the products. The status indicates when additional product should be cooked in order to have new product prior to the expiration of existing product by indicating when the hold time less the cook time has elapsed. The status also indicates which product is the oldest to facilitate the transfer and use of the oldest product first. A transfer of one product to another product location automatically transfers the corresponding elapsed storage time with that product.

15 Claims, 76 Drawing Sheets

U.S. PATENT DOCUMENTS

| | | | |
|---|---|---|---|
| 6,088,681 A * | 7/2000 | Coleman et al. | 705/15 |
| 6,298,331 B1 | 10/2001 | Walker et al. | |
| 2001/0047301 A1* | 11/2001 | Walker et al. | 705/15 |
| 2001/0056376 A1* | 12/2001 | Walker et al. | 705/15 |
| 2004/0225556 A1* | 11/2004 | Willen et al. | 705/10 |

OTHER PUBLICATIONS

RT Systems, Inc., "WMS, RFDC, and bar codes control perisahbles," www.rt-systems.com/Food-Lipari.html, Apr. 1999, 3 pages.*

Business: McJITters, *The Economist*; London; Apr. 4, 1998; pp. 1-2.

Business: McJITters, *The Economist;* London; Apr. 4, 1998; pp. 1-2.

\* cited by examiner

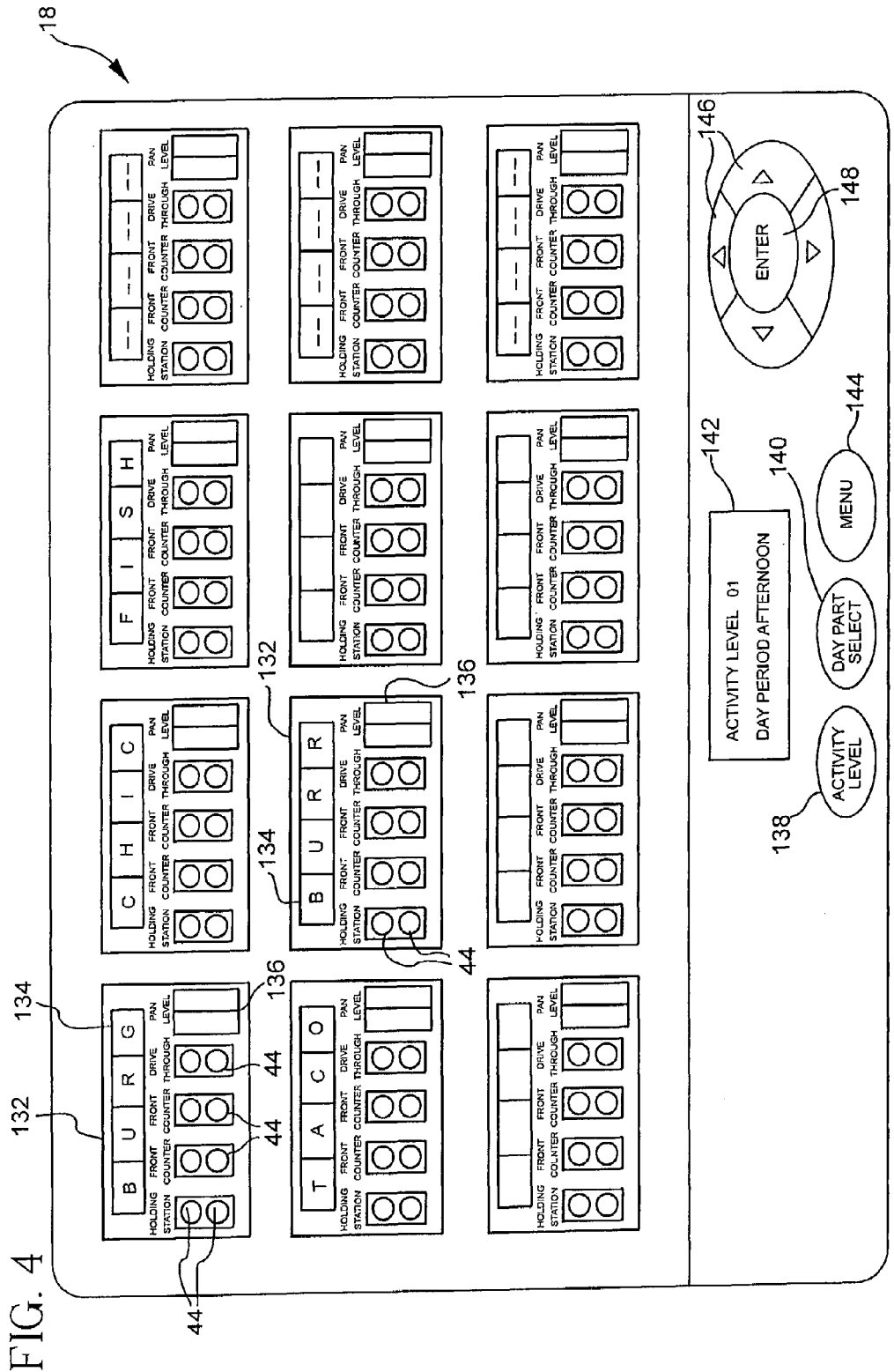

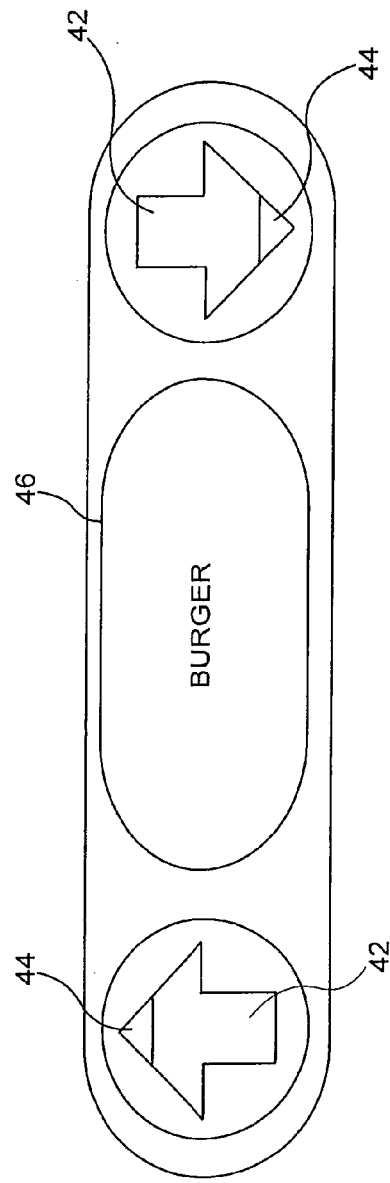
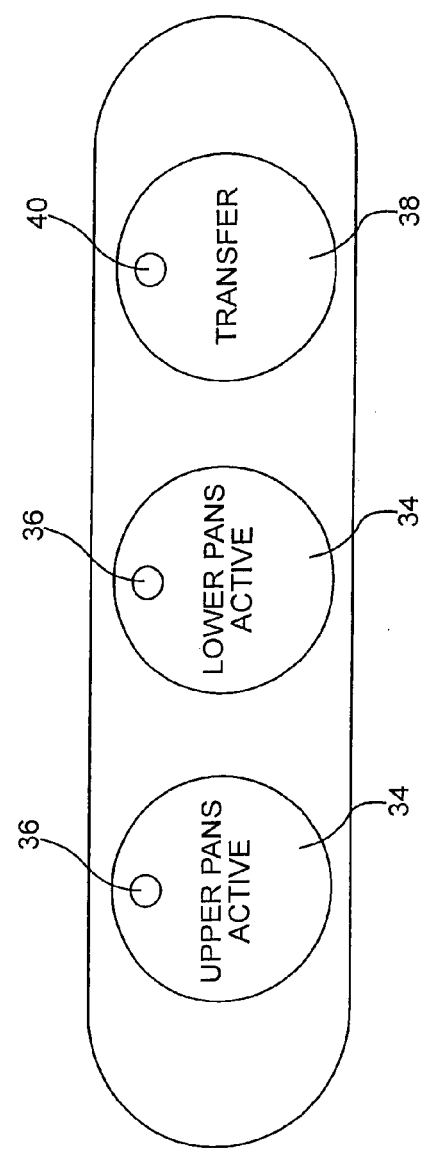
FIG. 5A
FIG. 5B

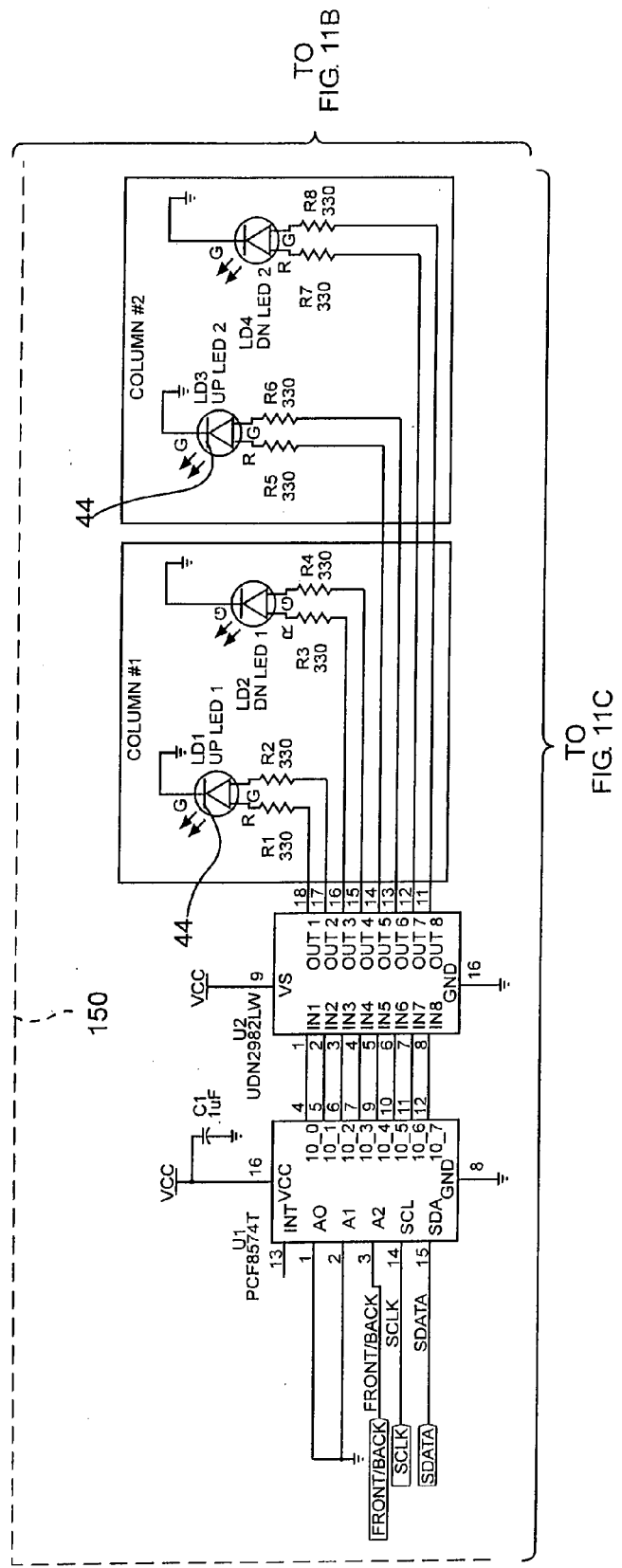
FIG. 11A STATION / WORKER INTERFACE BOARD

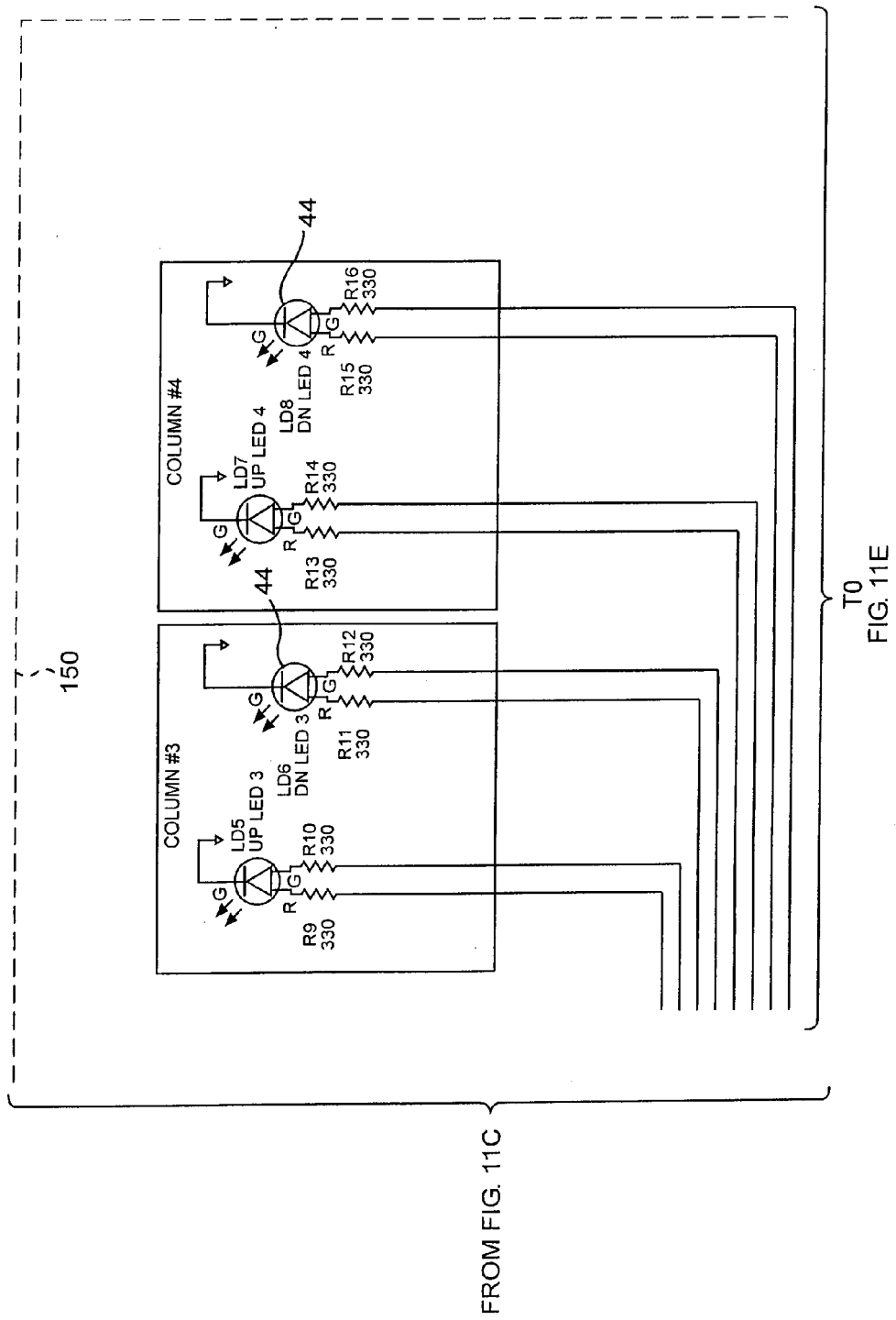
FIG. 11B STATION / WORKER INTERFACE BOARD

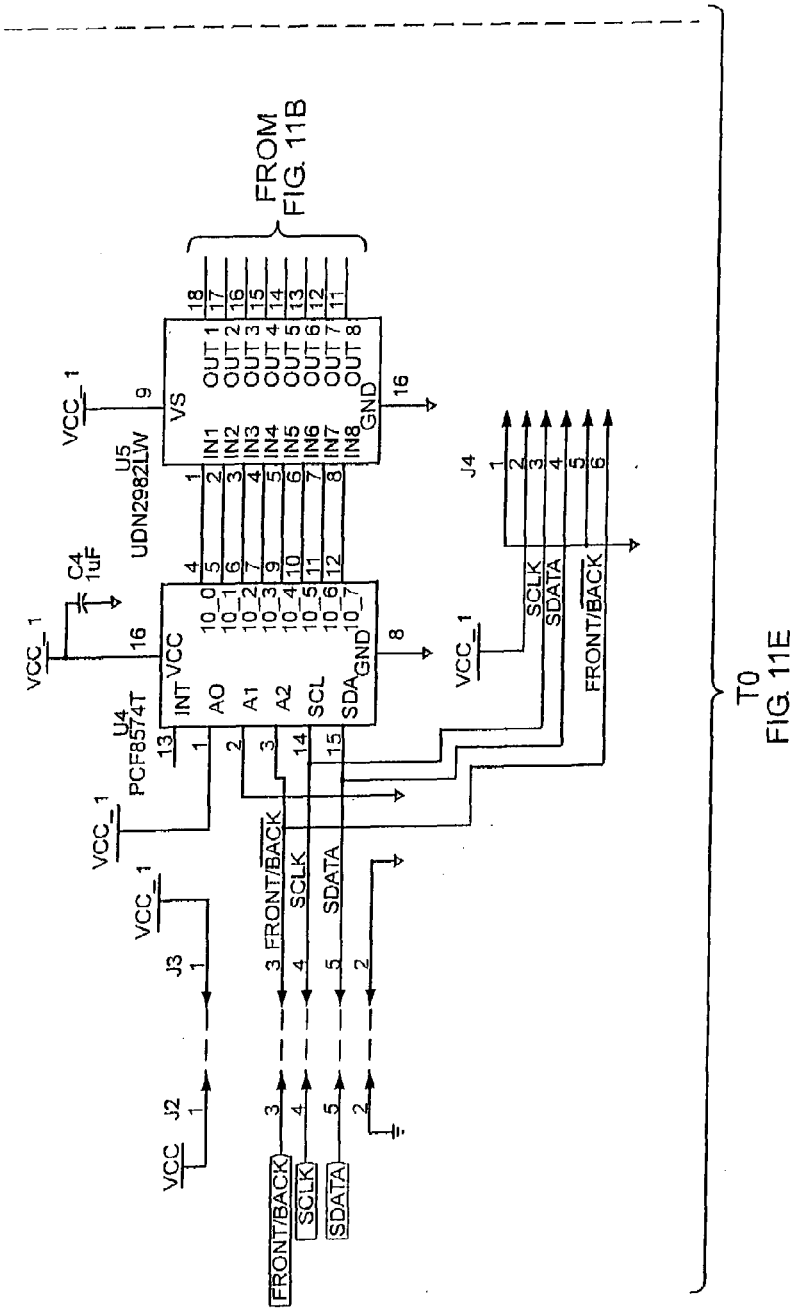
FIG. 11C STATION / WORKER INTERFACE BOARD

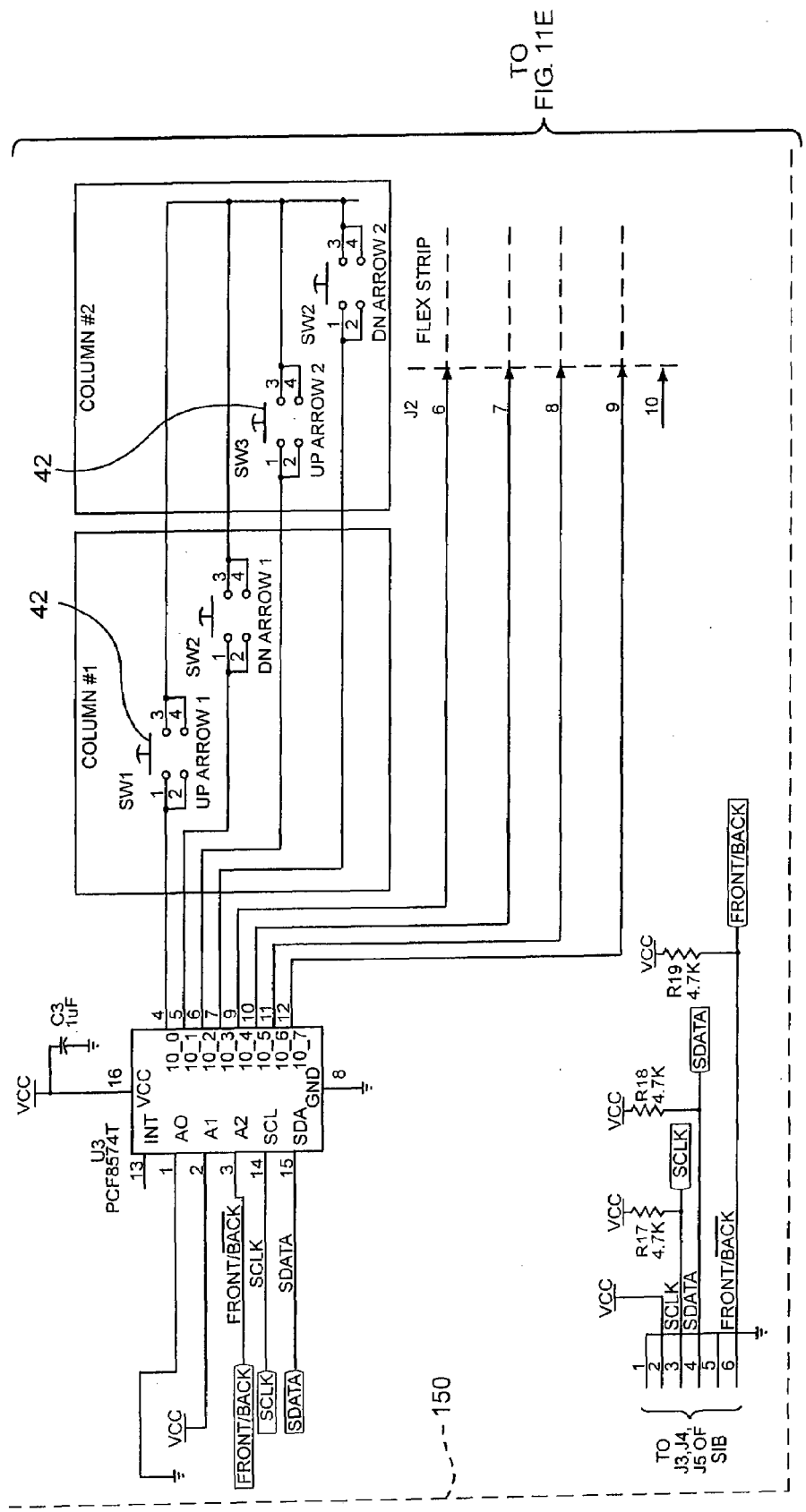
FIG. 11D STATION / WORKER INTERFACE BOARD

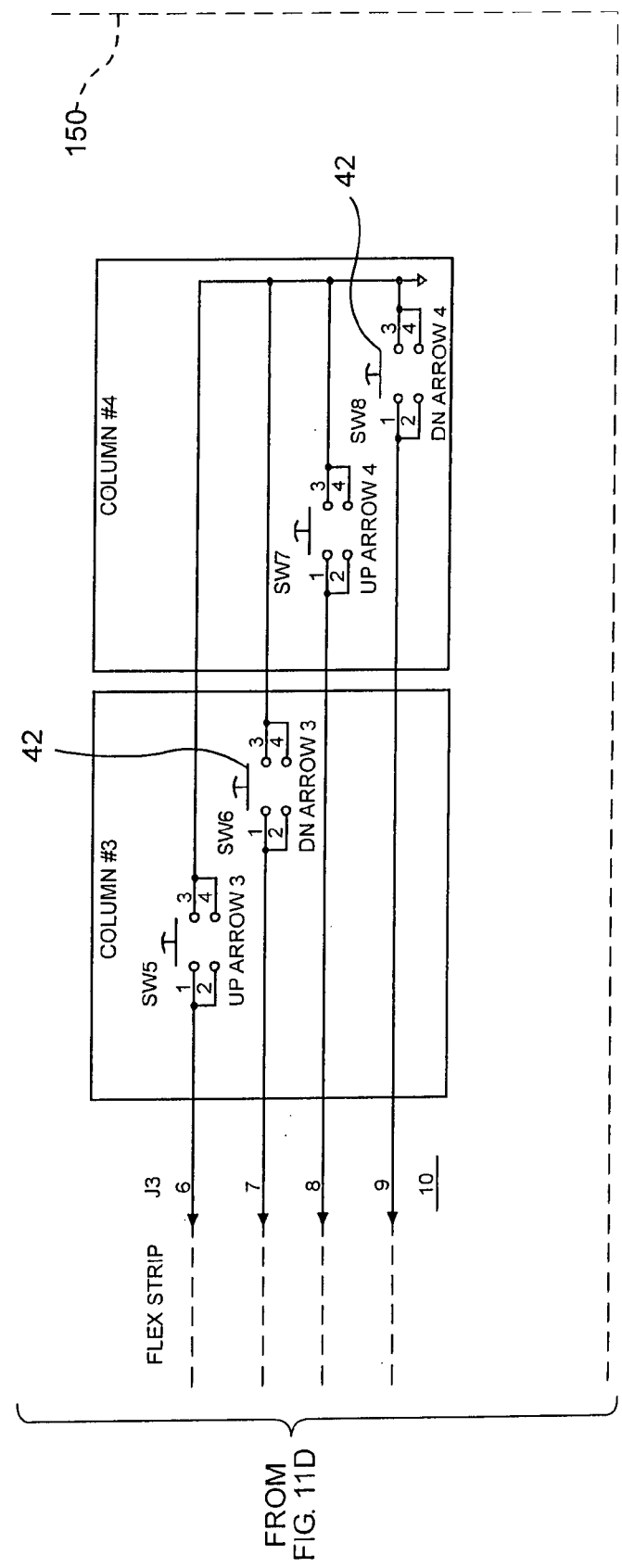
FIG. 11E STATION / WORKER INTERFACE BOARD

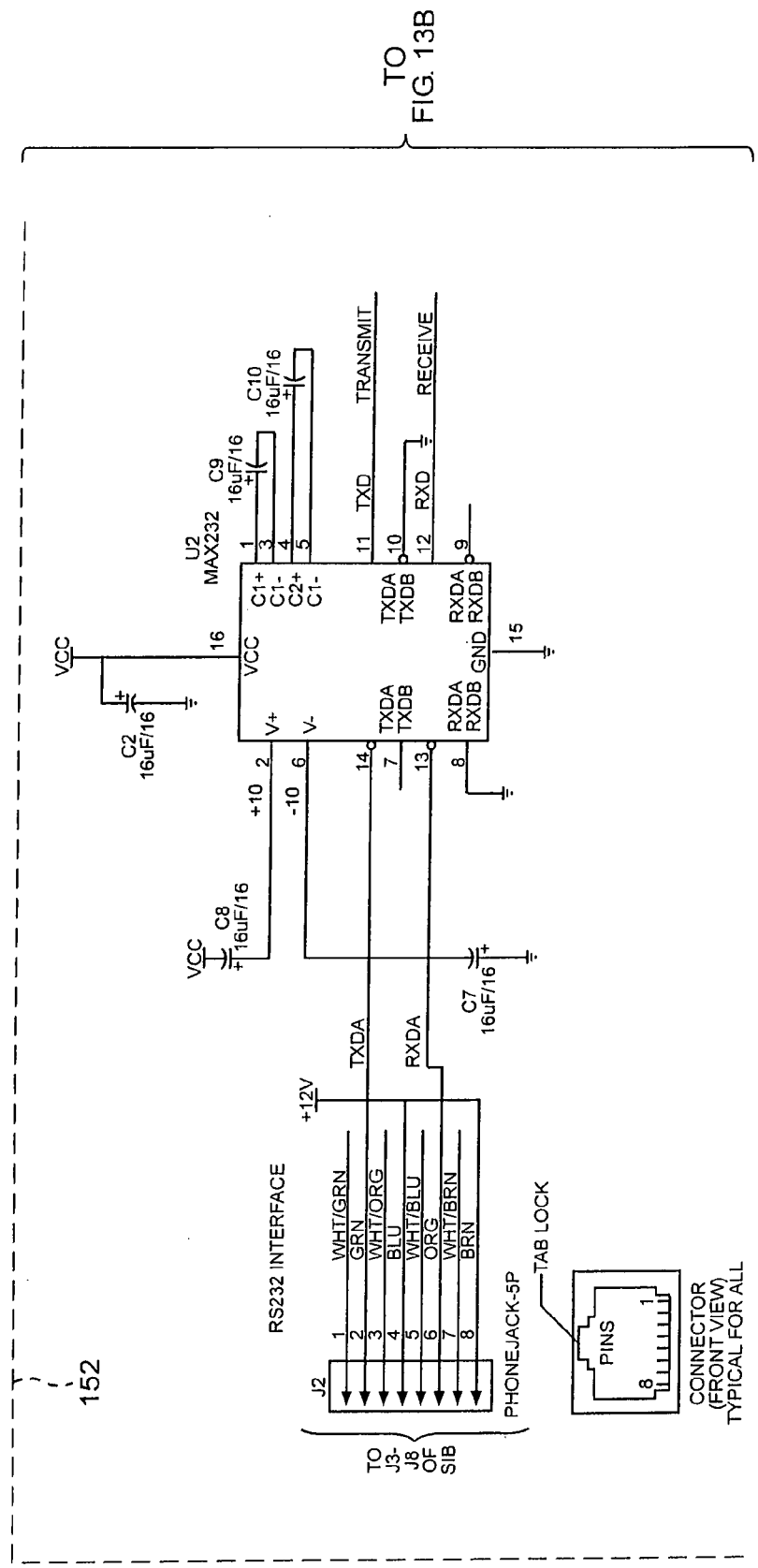
FIG. 13A STATION INTERFACE BOARD (SIB)

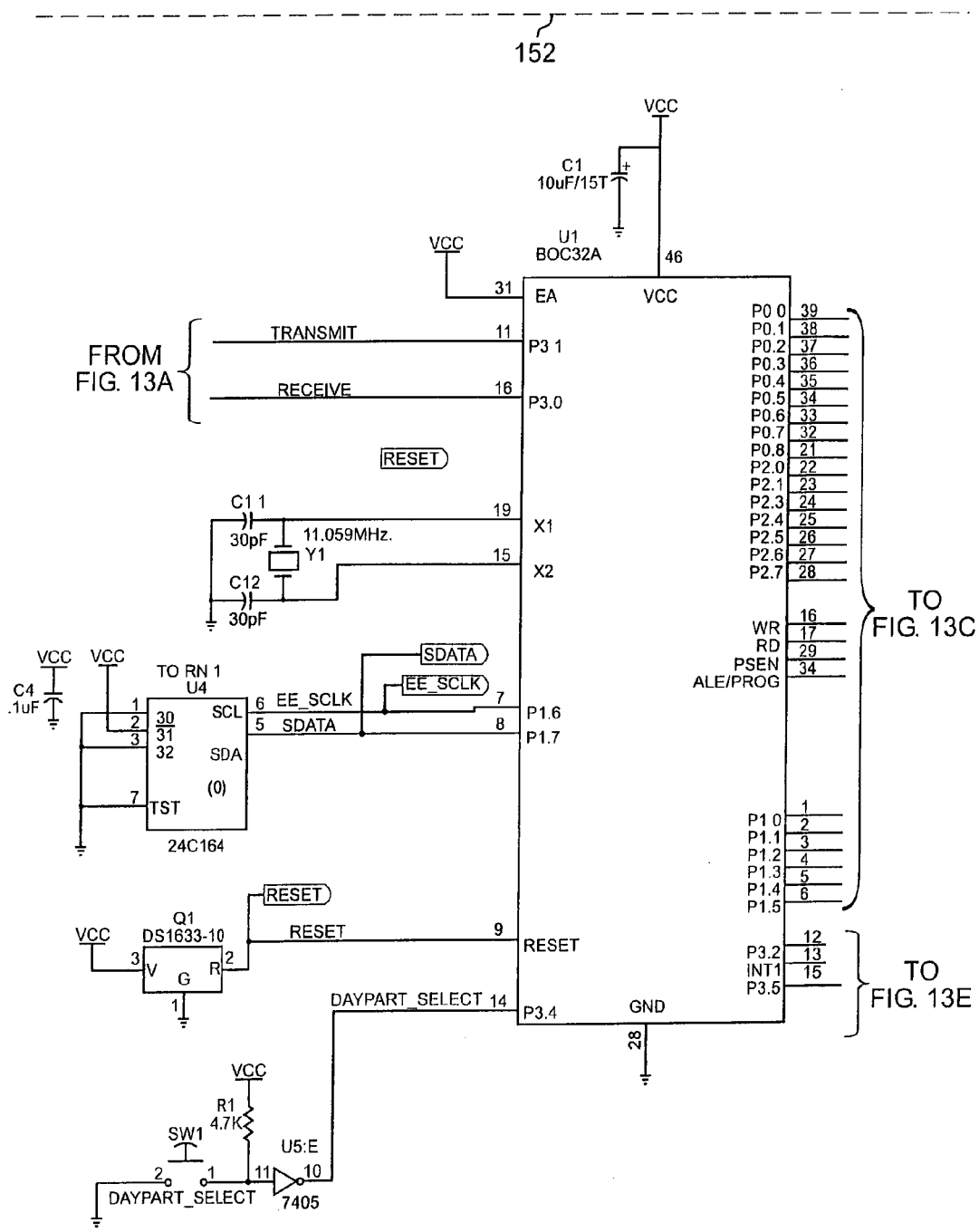
FIG. 13B STATION INTERFACE BOARD (SIB)

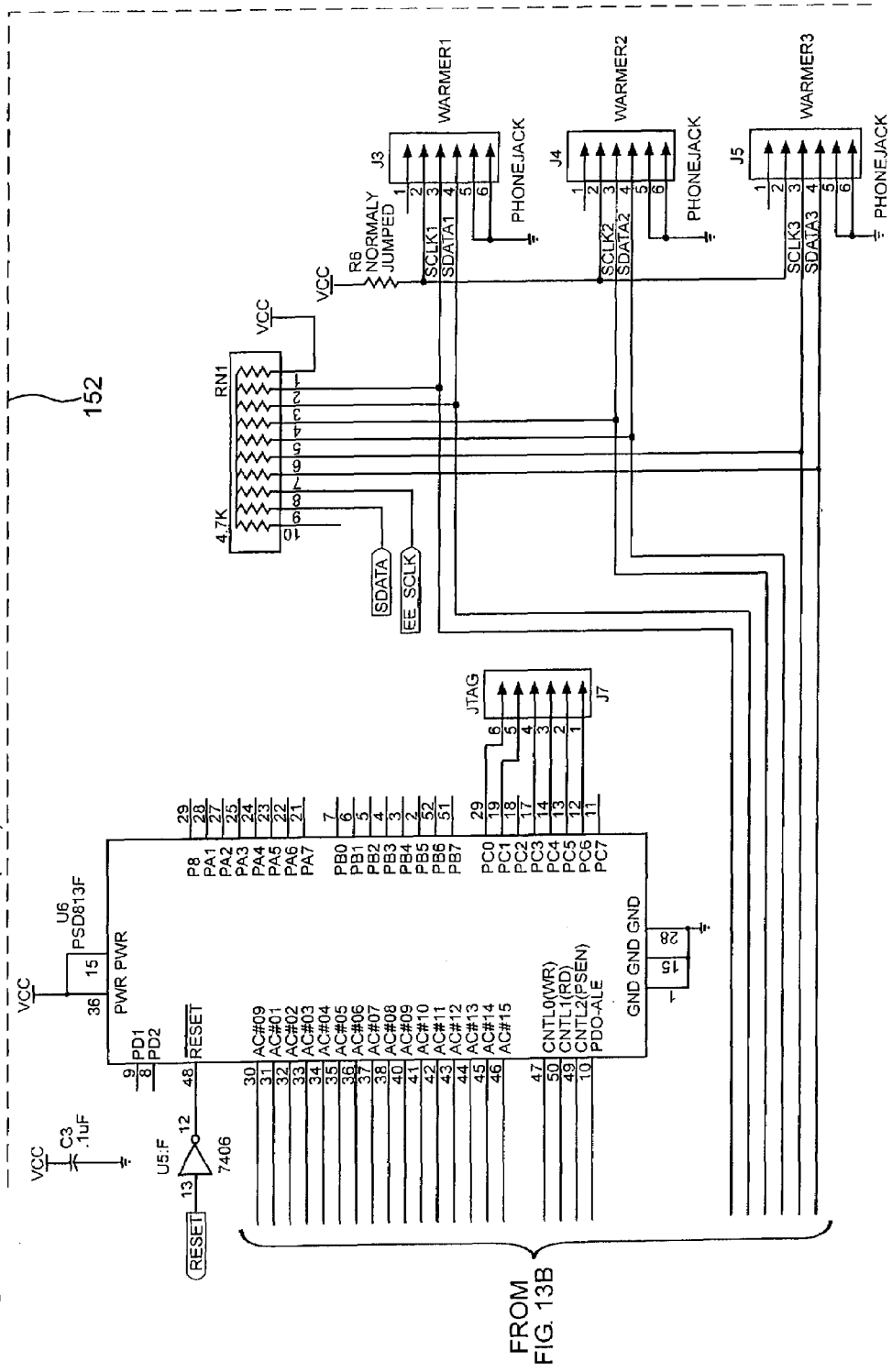
FIG. 13C STATION INTERFACE BOARD (SIB)

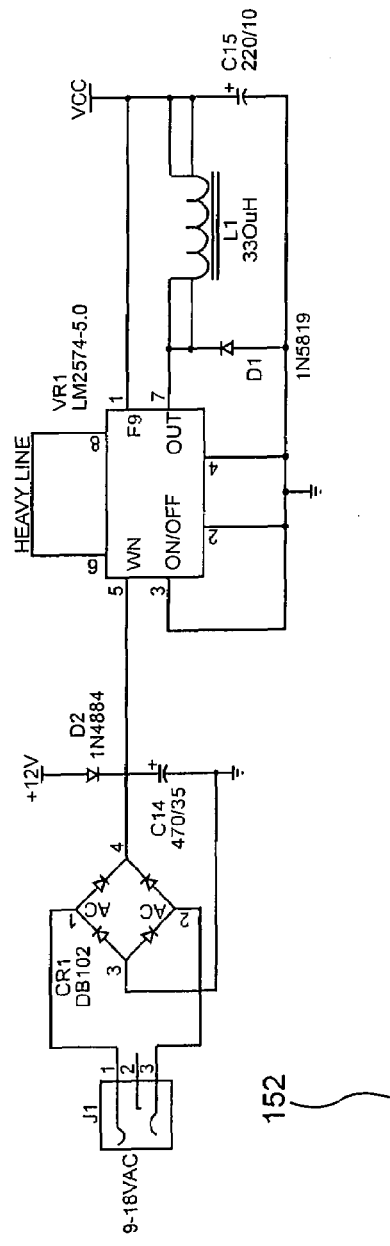
FIG. 13D STATION INTERFACE BOARD (SIB)

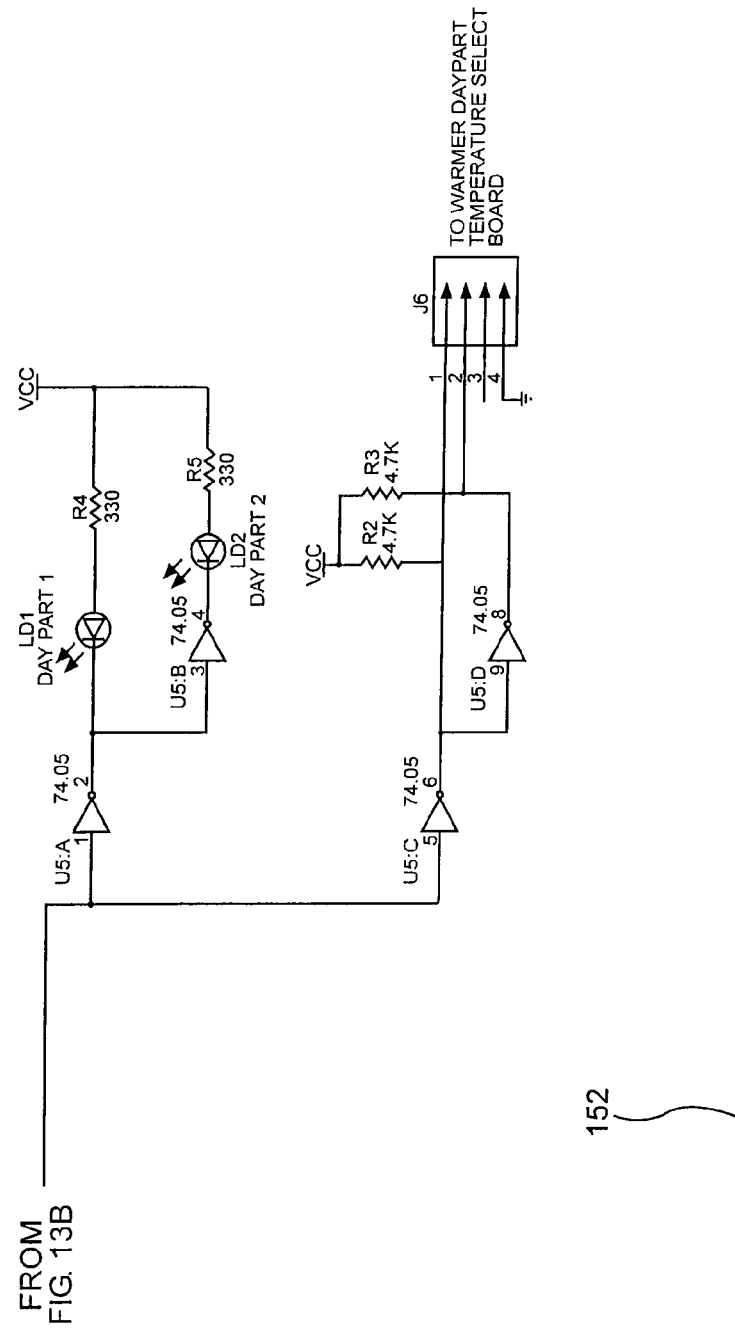
FIG. 13E STATION INTERFACE BOARD (SIB)

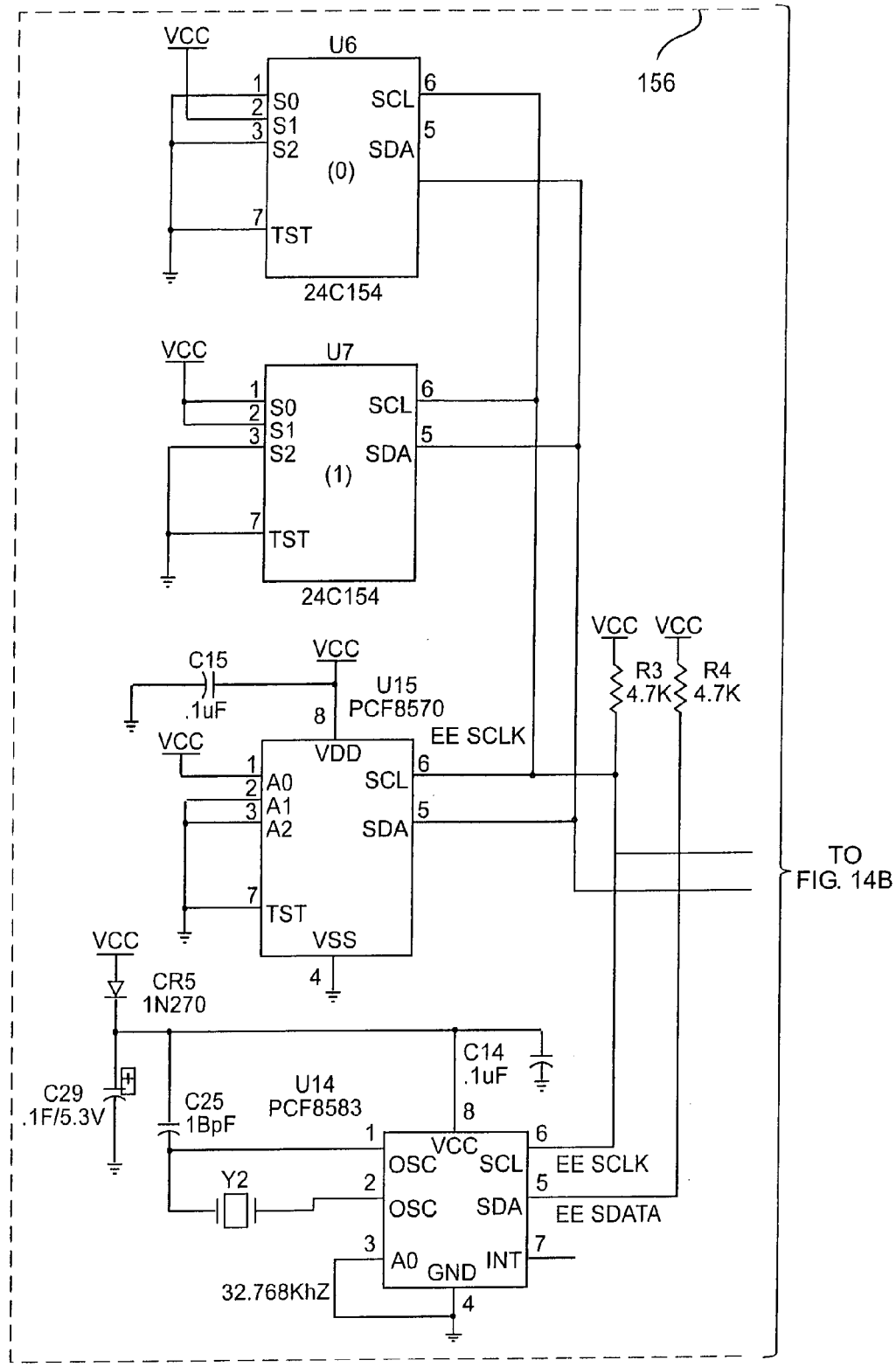
FIG. 14A STATION CONTROL BOARD (SCB)

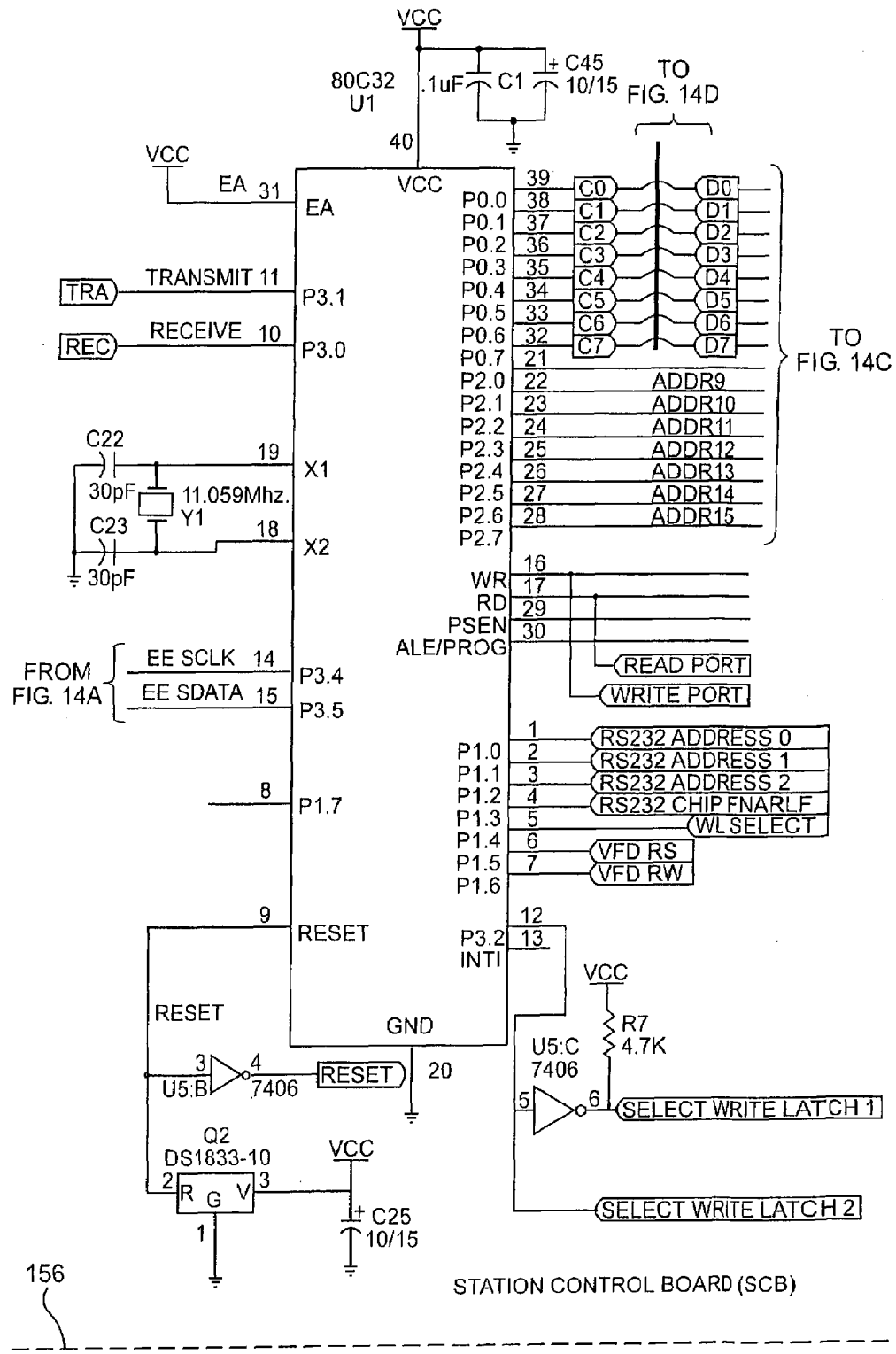
FIG. 14B STATION CONTROL BOARD (SCB)

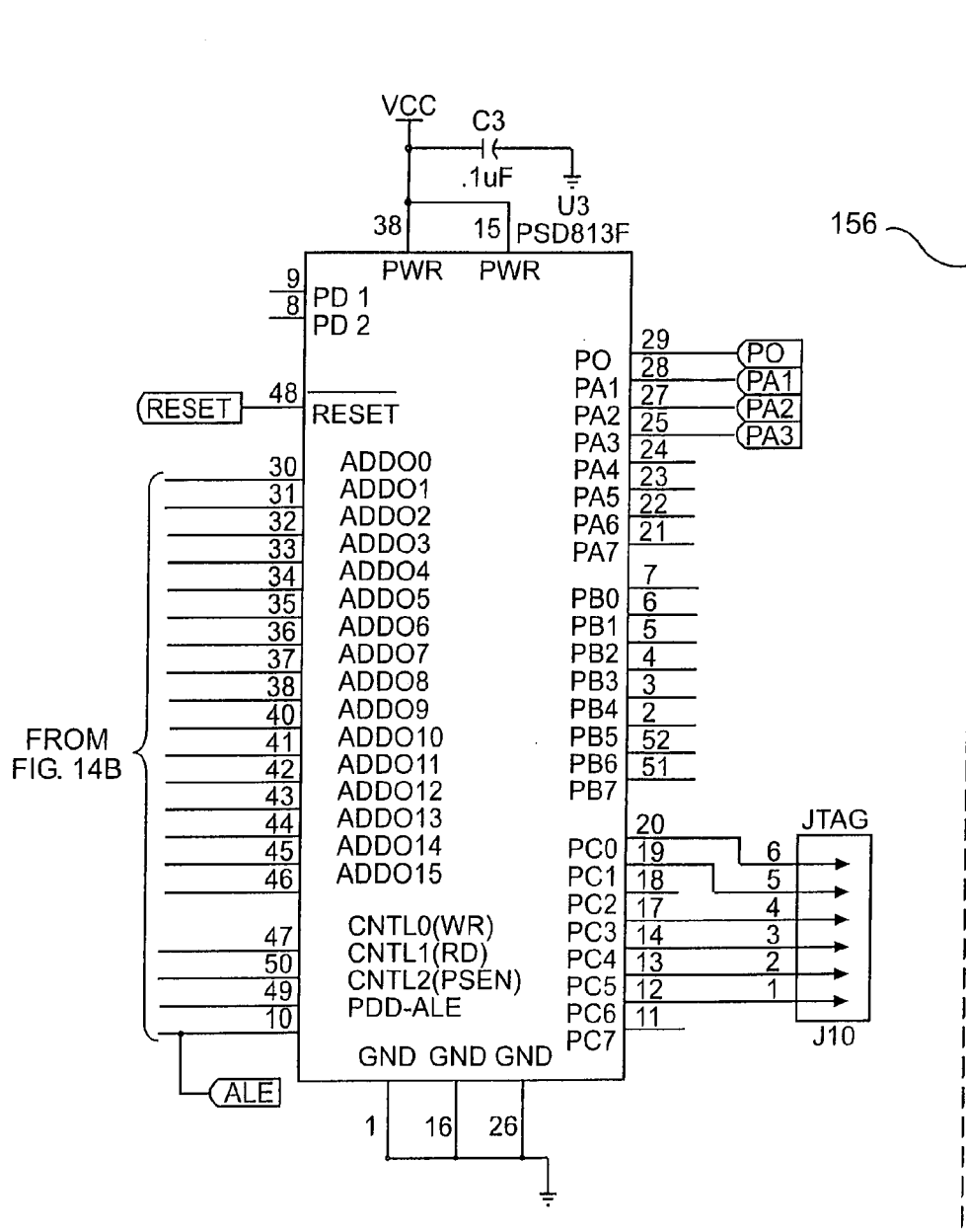
FIG. 14C STATION CONTROL BOARD (SCB)

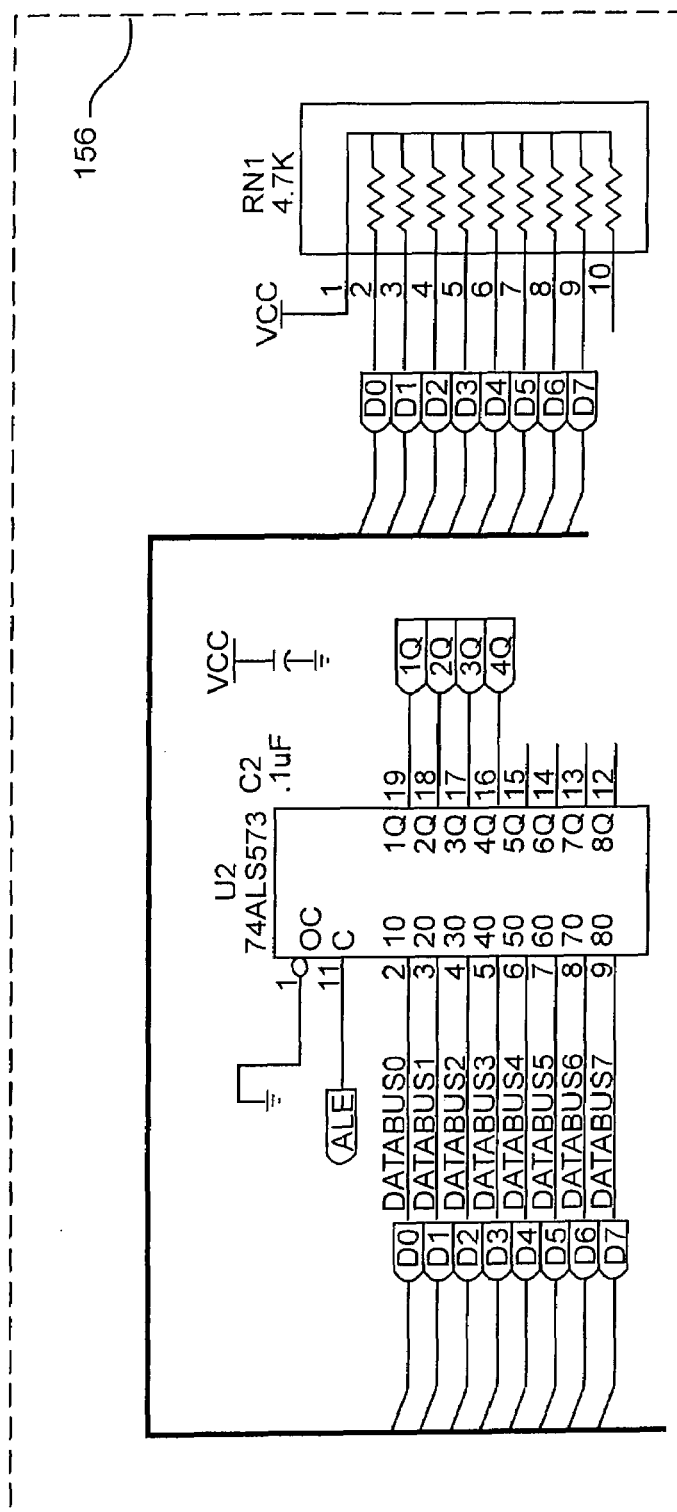
FIG. 14D STATION CONTROL BOARD (SCB)

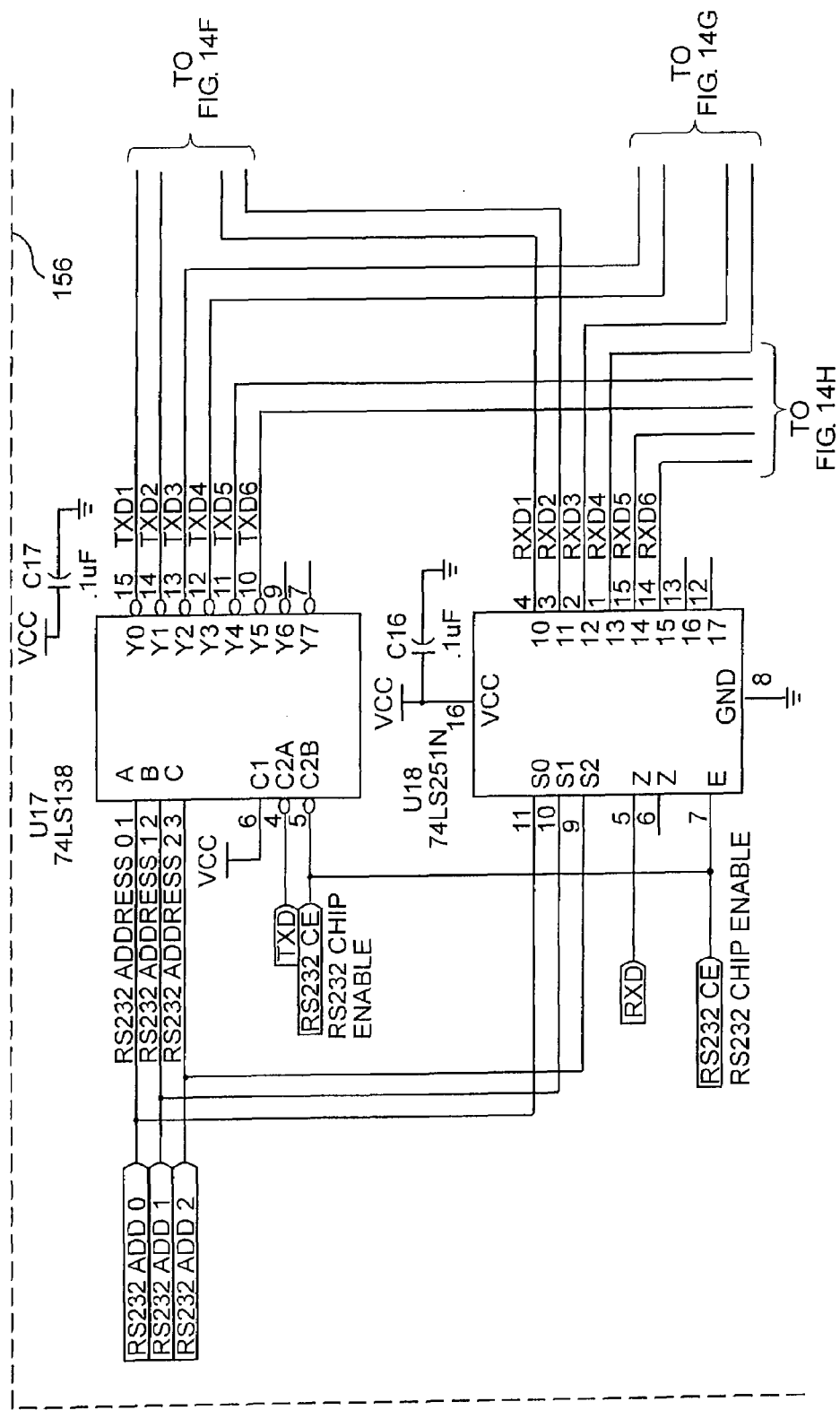
FIG. 14E STATION CONTROL BOARD (SCB)

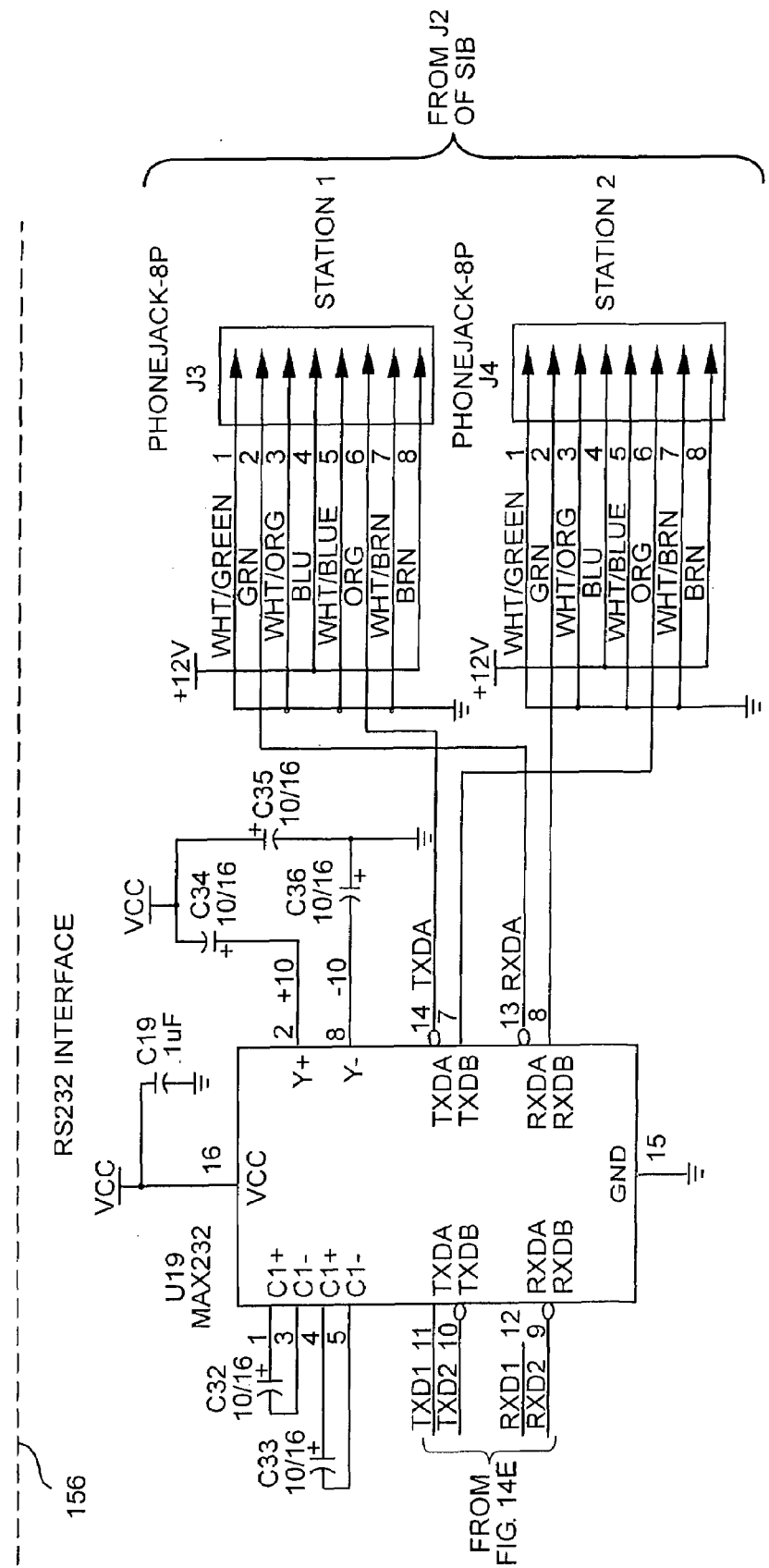
FIG. 14F STATION CONTROL BOARD (SCB)

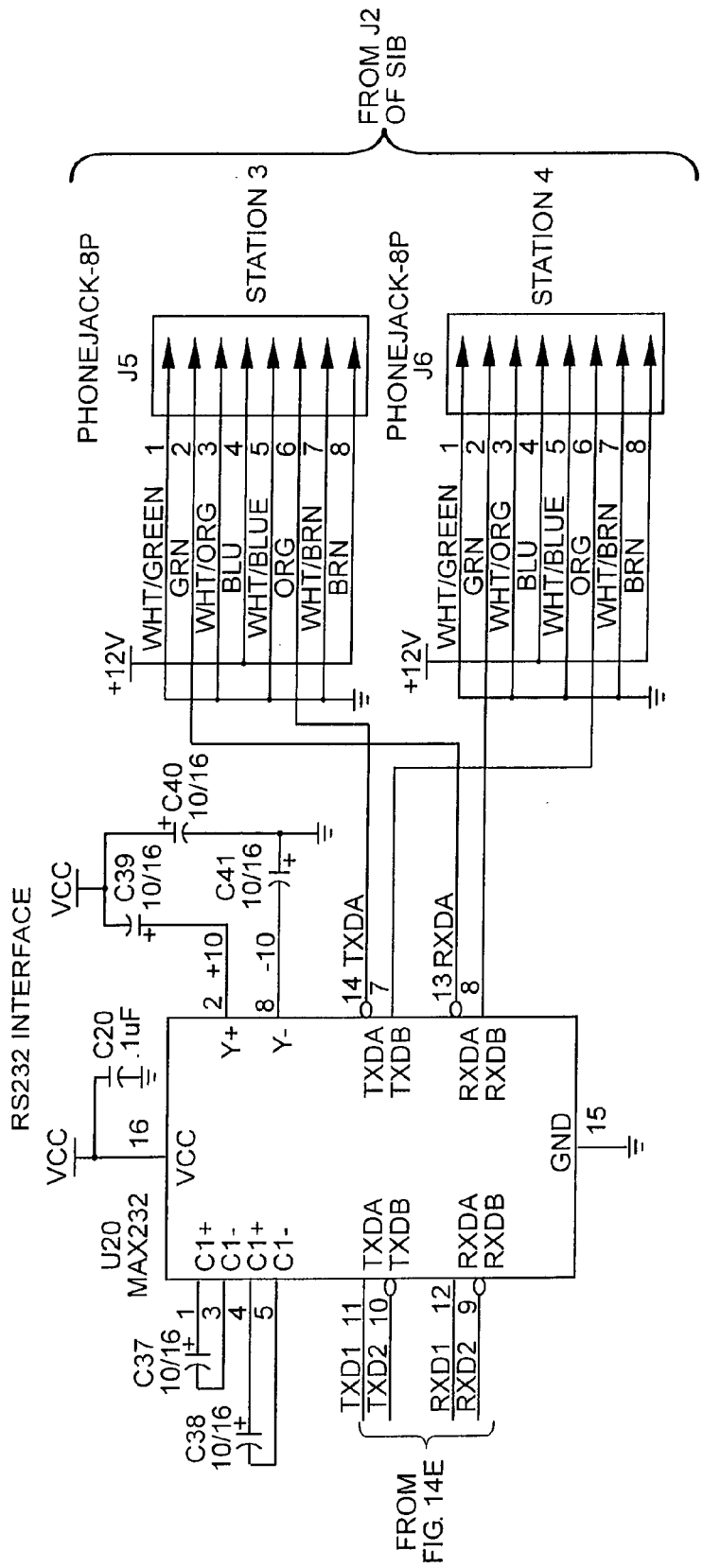
FIG. 14G STATION CONTROL BOARD (SCB)

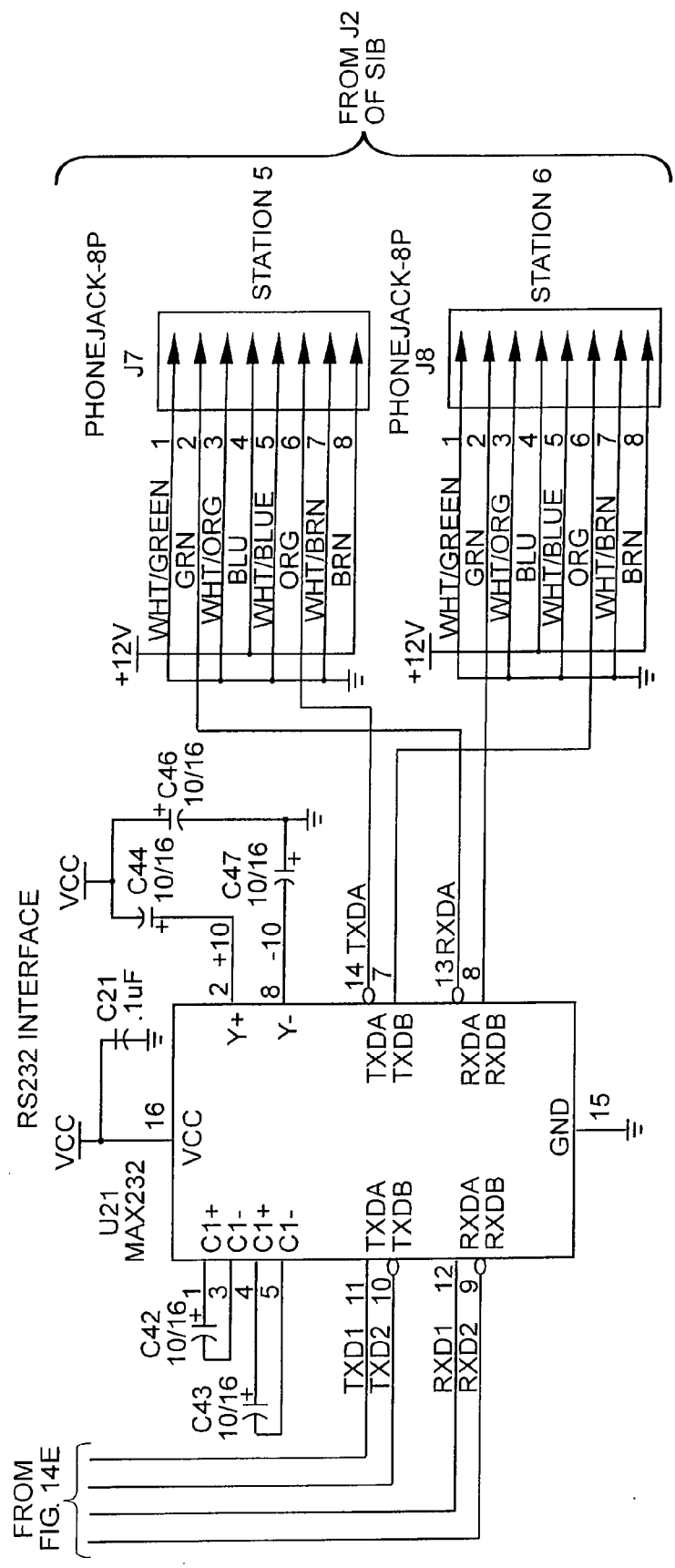
FIG. 14H STATION CONTROL BOARD (SCB)

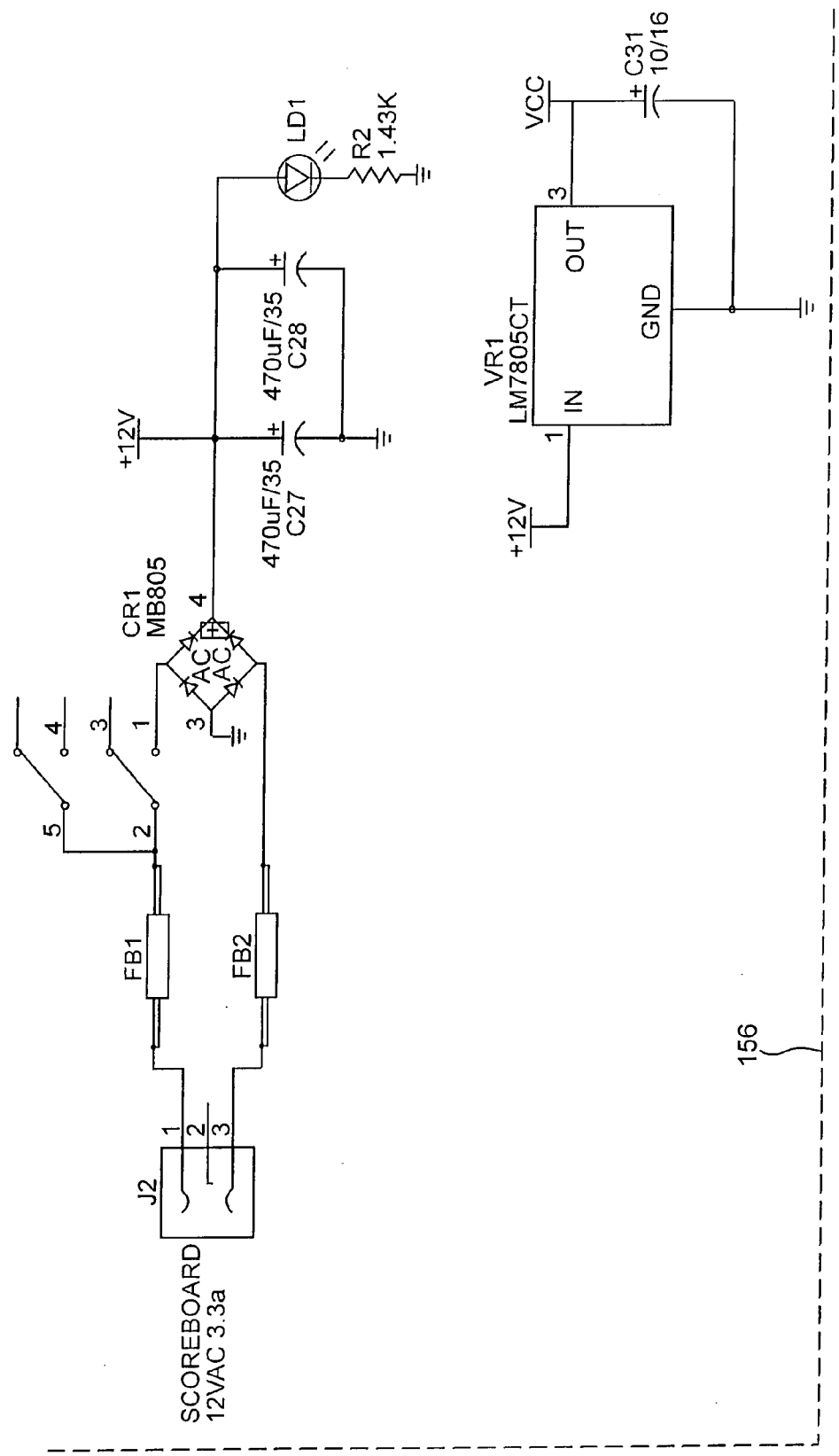
FIG. 14I STATION CONTROL BOARD (SCB)

FIG. 14J STATION CONTROL BOARD (SCB)
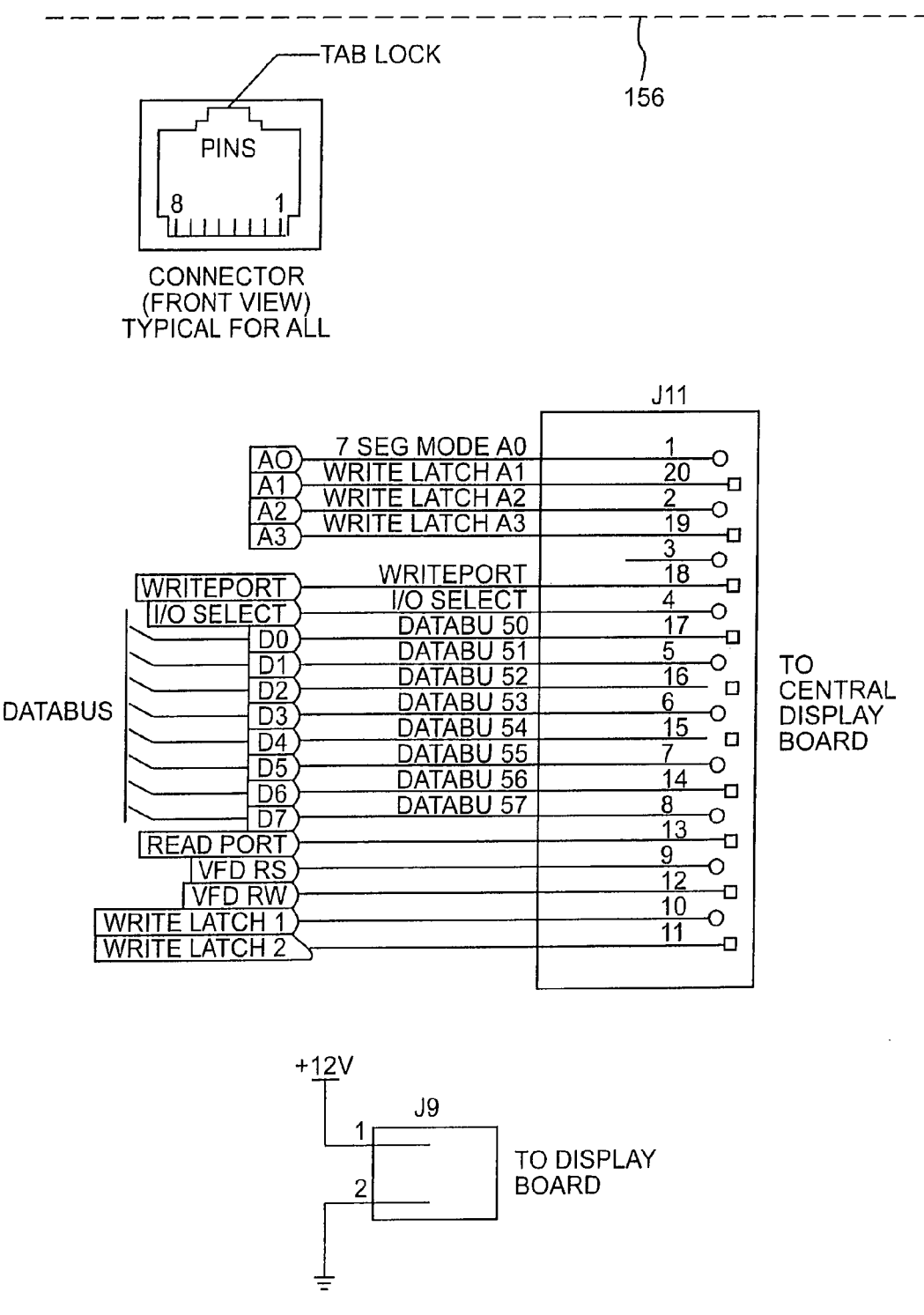

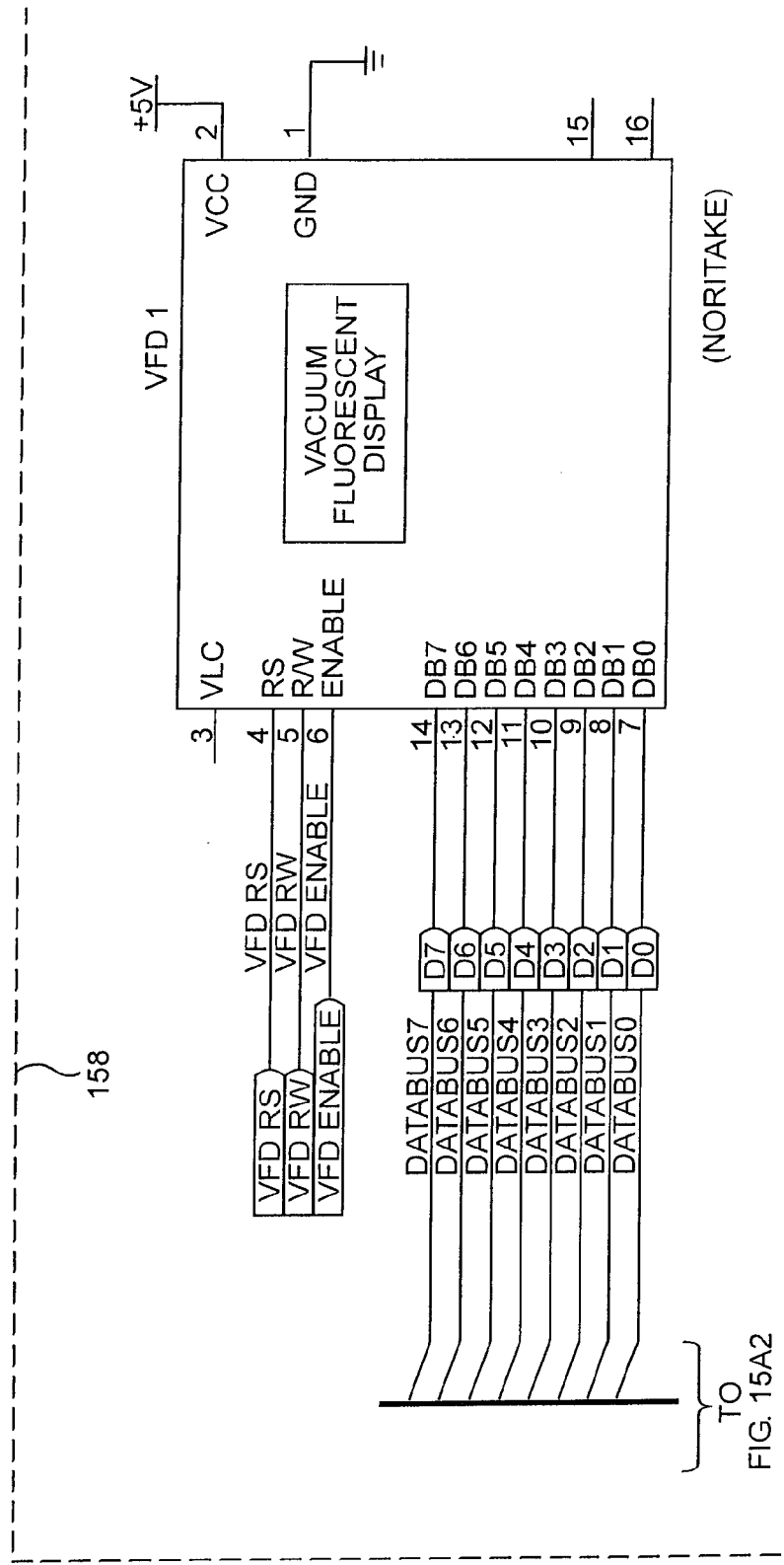
FIG. 15A1 CENTRAL DISPLAY BOARD

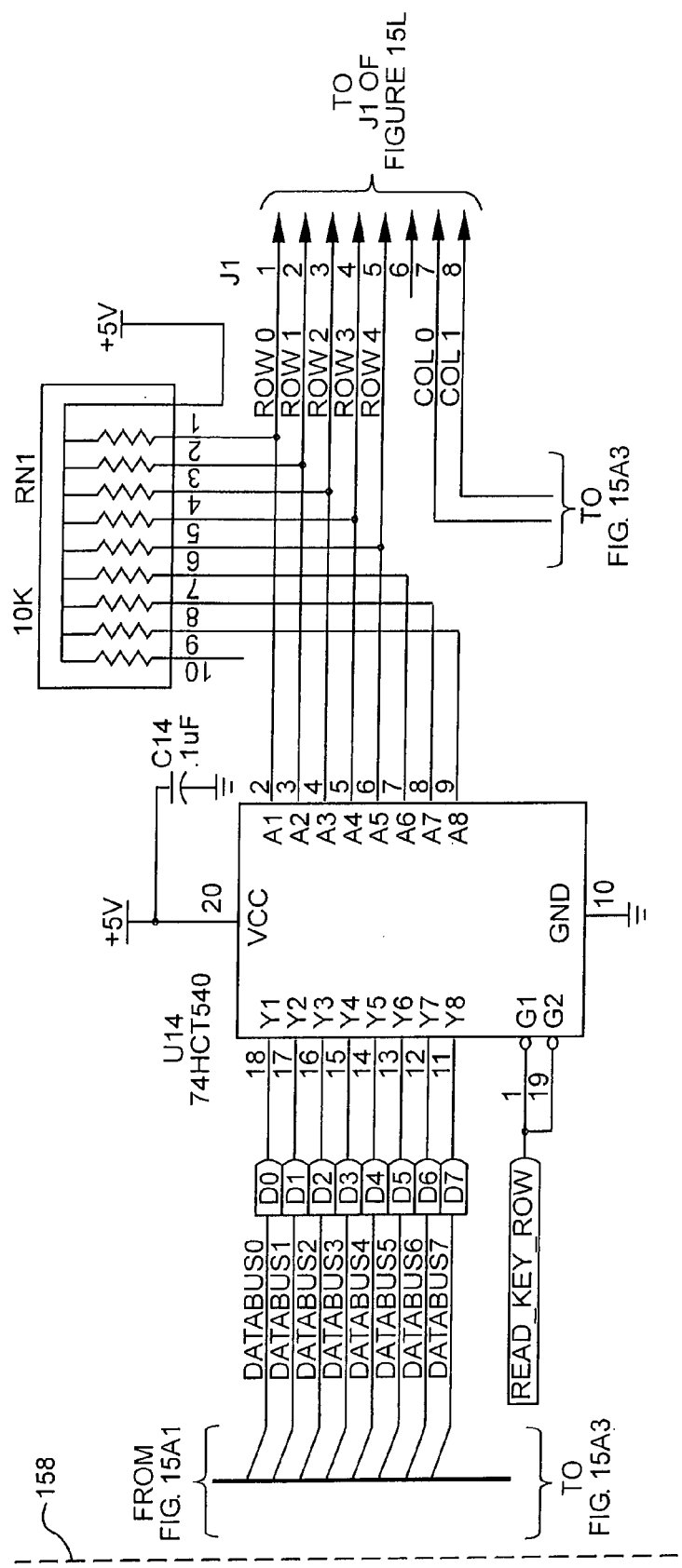
FIG. 15A2 CENTRAL DISPLAY BOARD

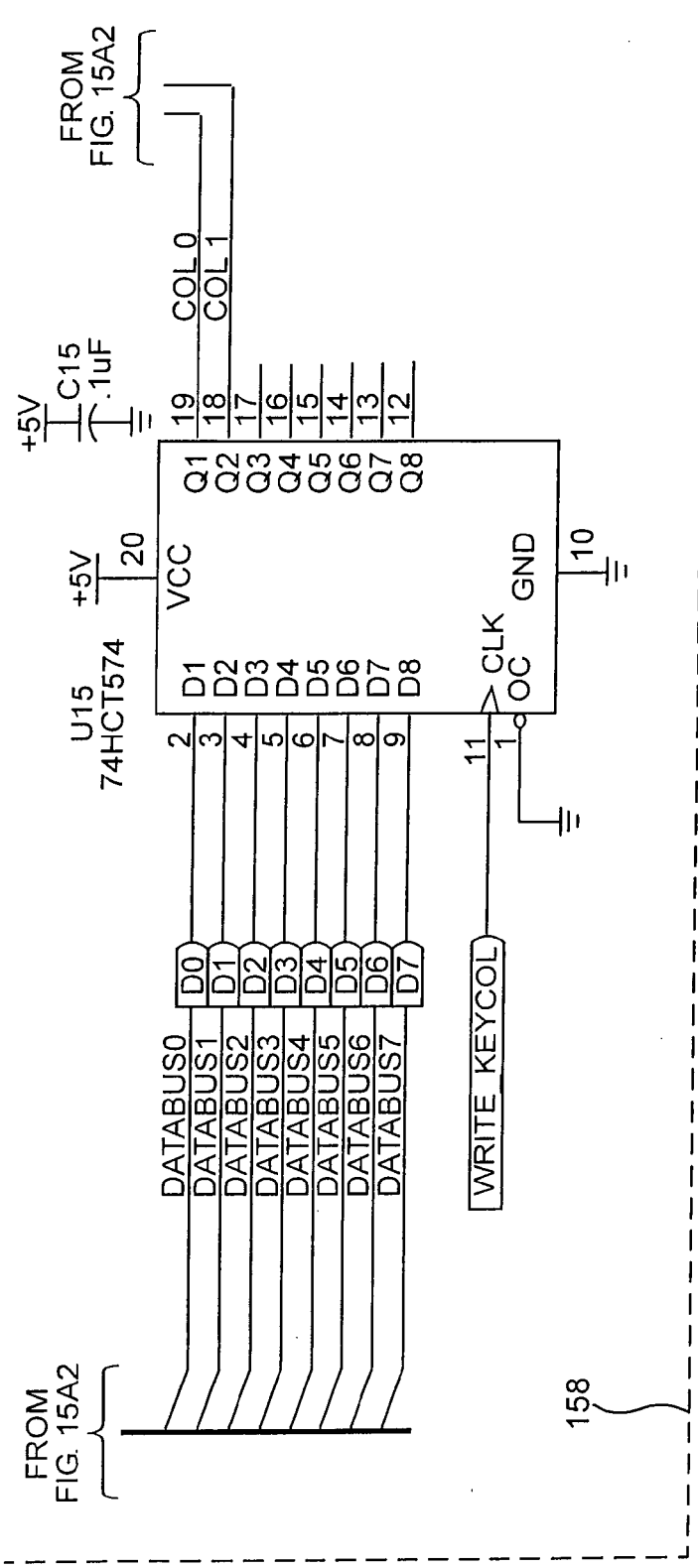
FIG. 15A3 CENTRAL DISPLAY BOARD

FIG. 15A4 CENTRAL DISPLAY BOARD
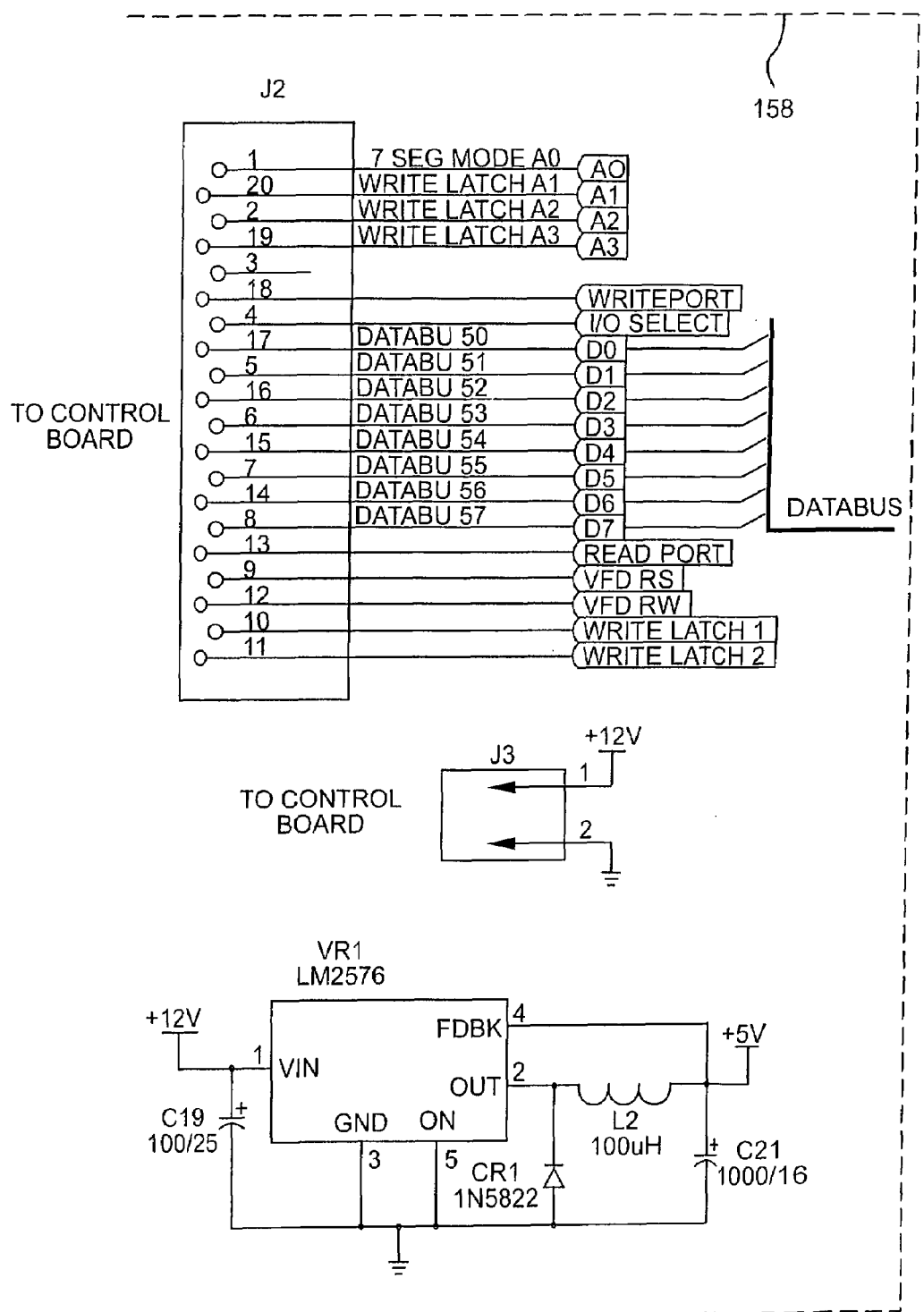

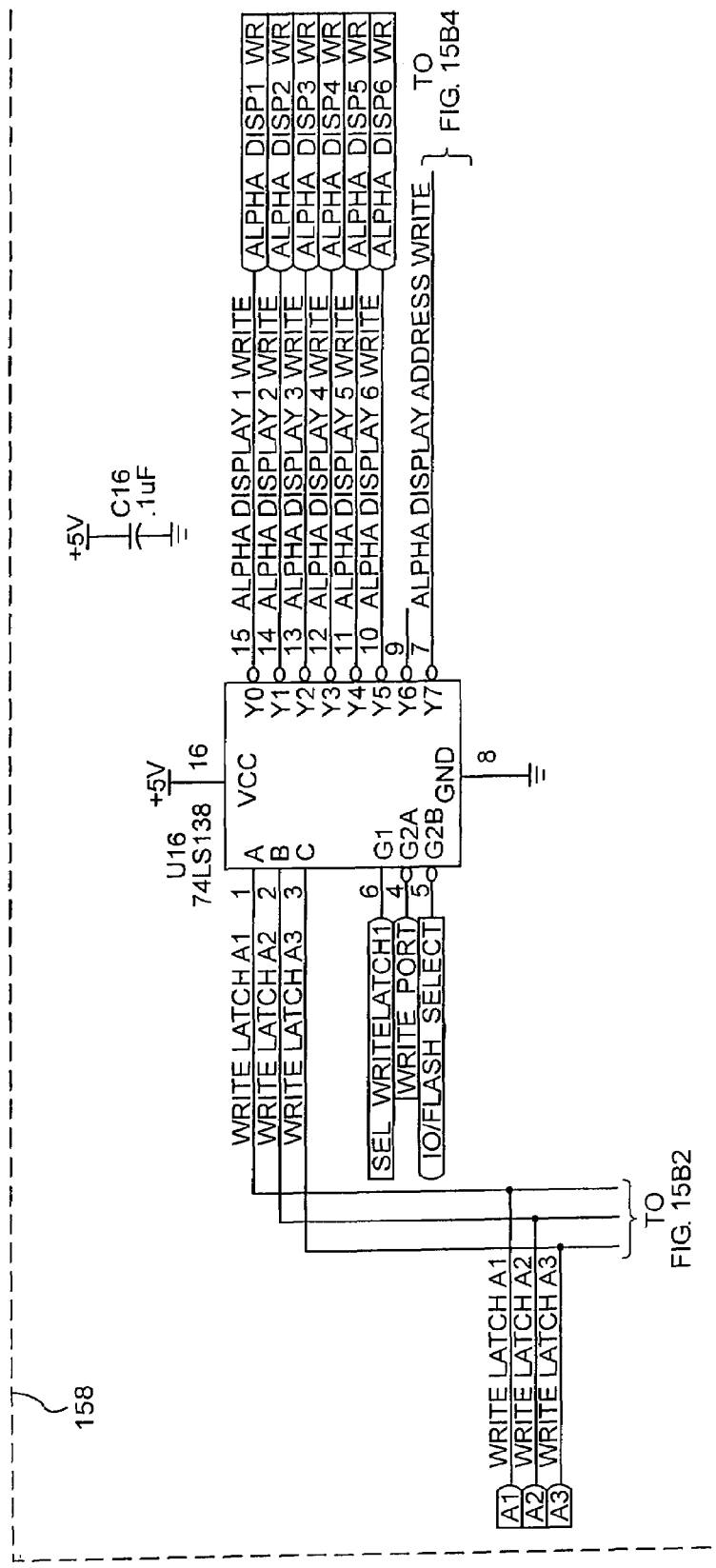
FIG. 15B1 CENTRAL DISPLAY BOARD

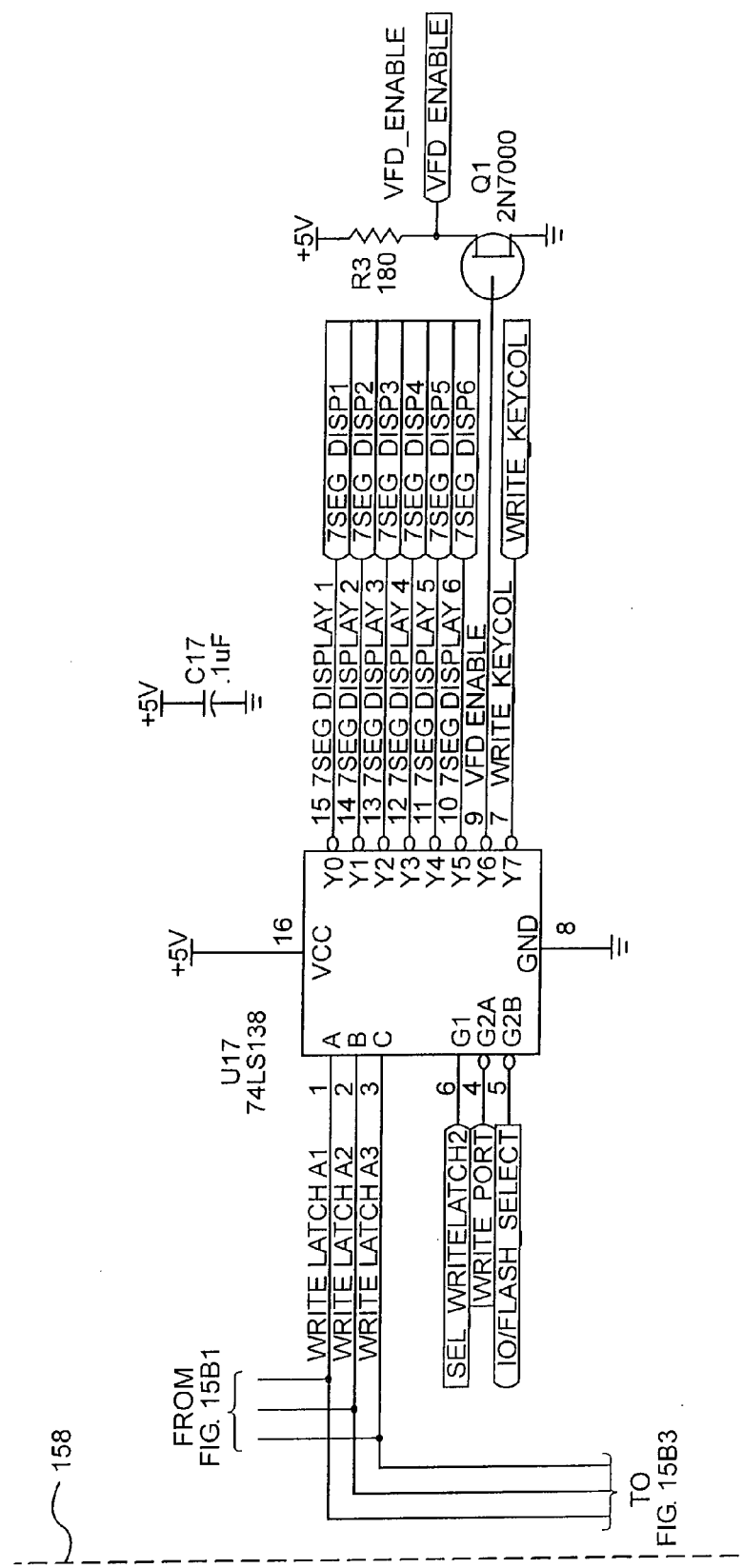
FIG. 15B2 CENTRAL DISPLAY BOARD

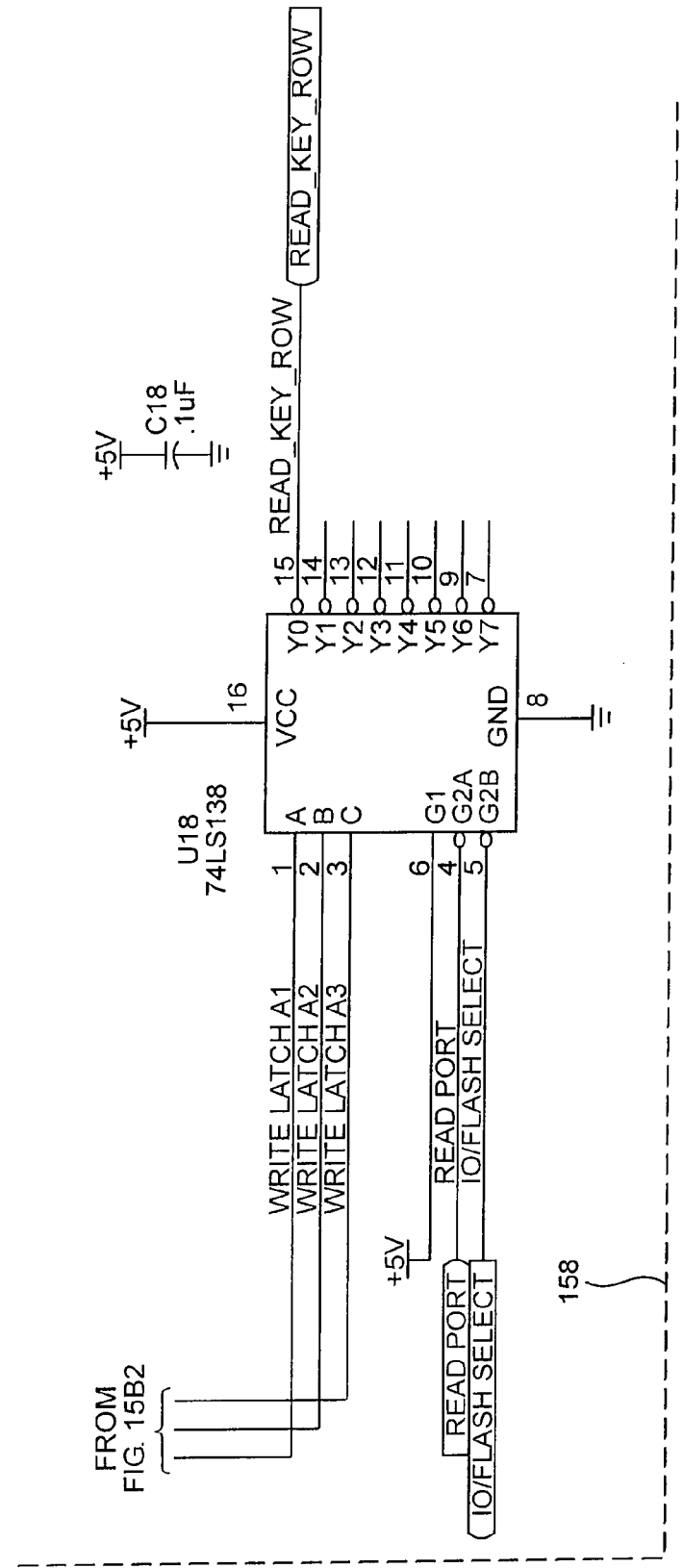
FIG. 15B3 CENTRAL DISPLAY BOARD

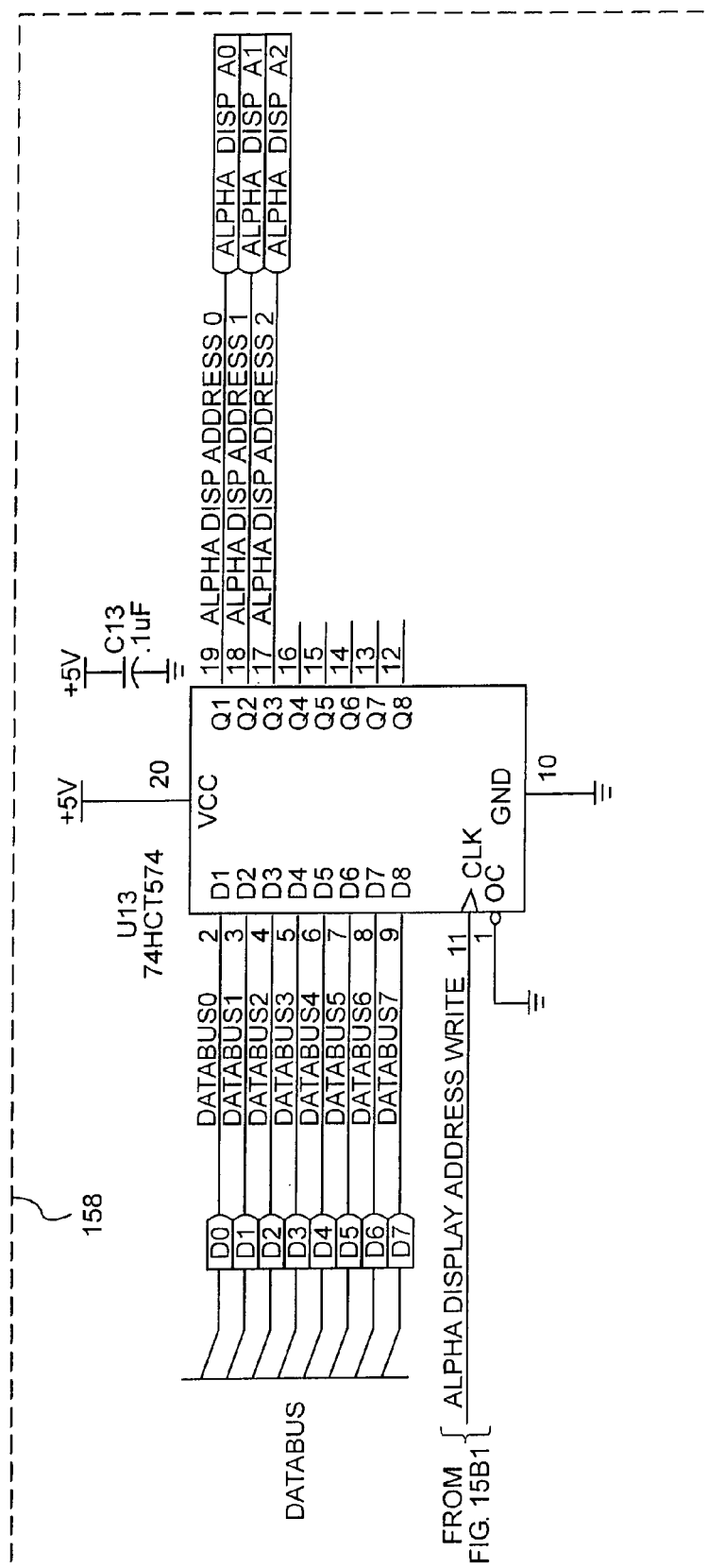
FIG. 15B4 CENTRAL DISPLAY BOARD

FIG. 15C1 CENTRAL DISPLAY BOARD
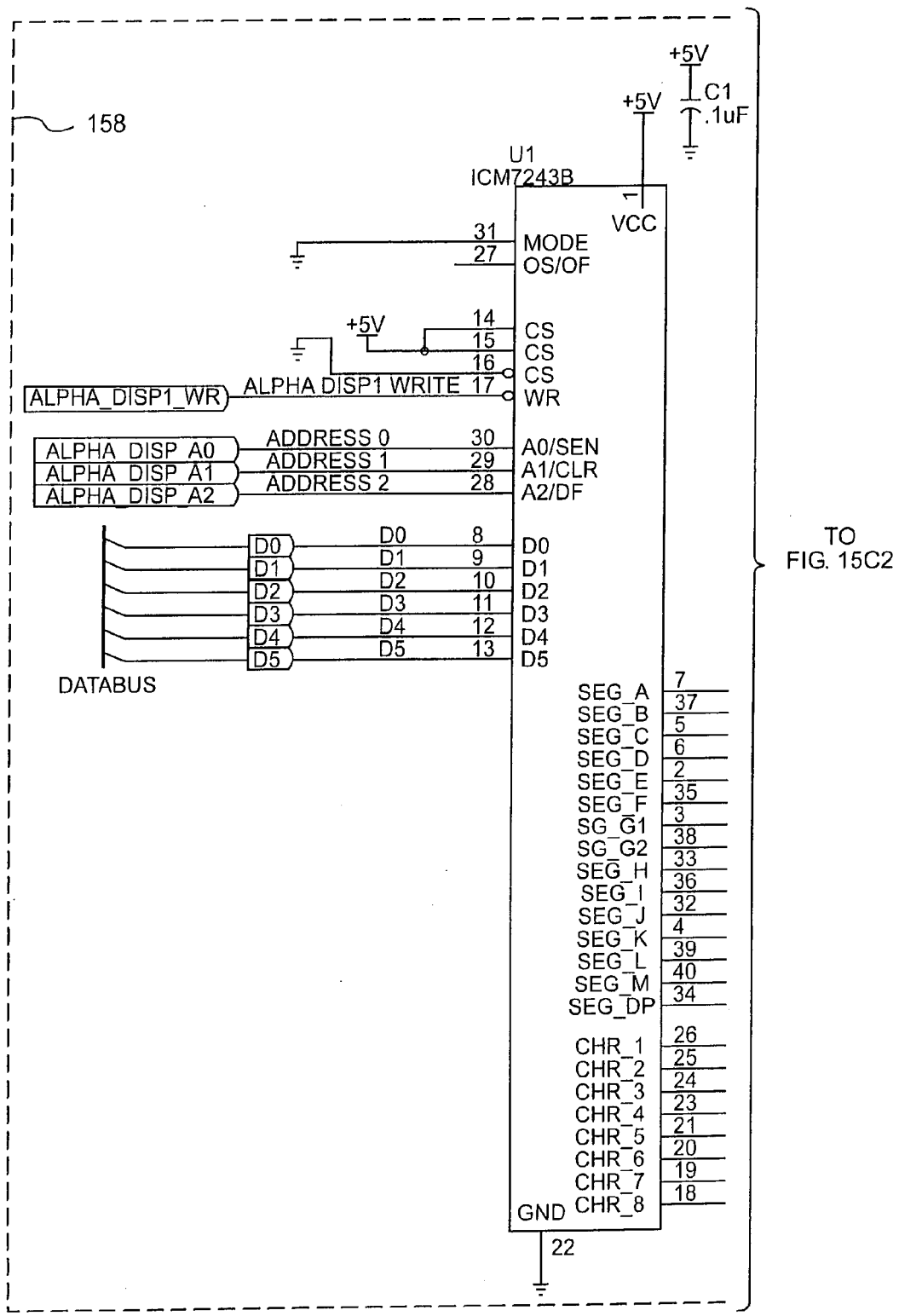

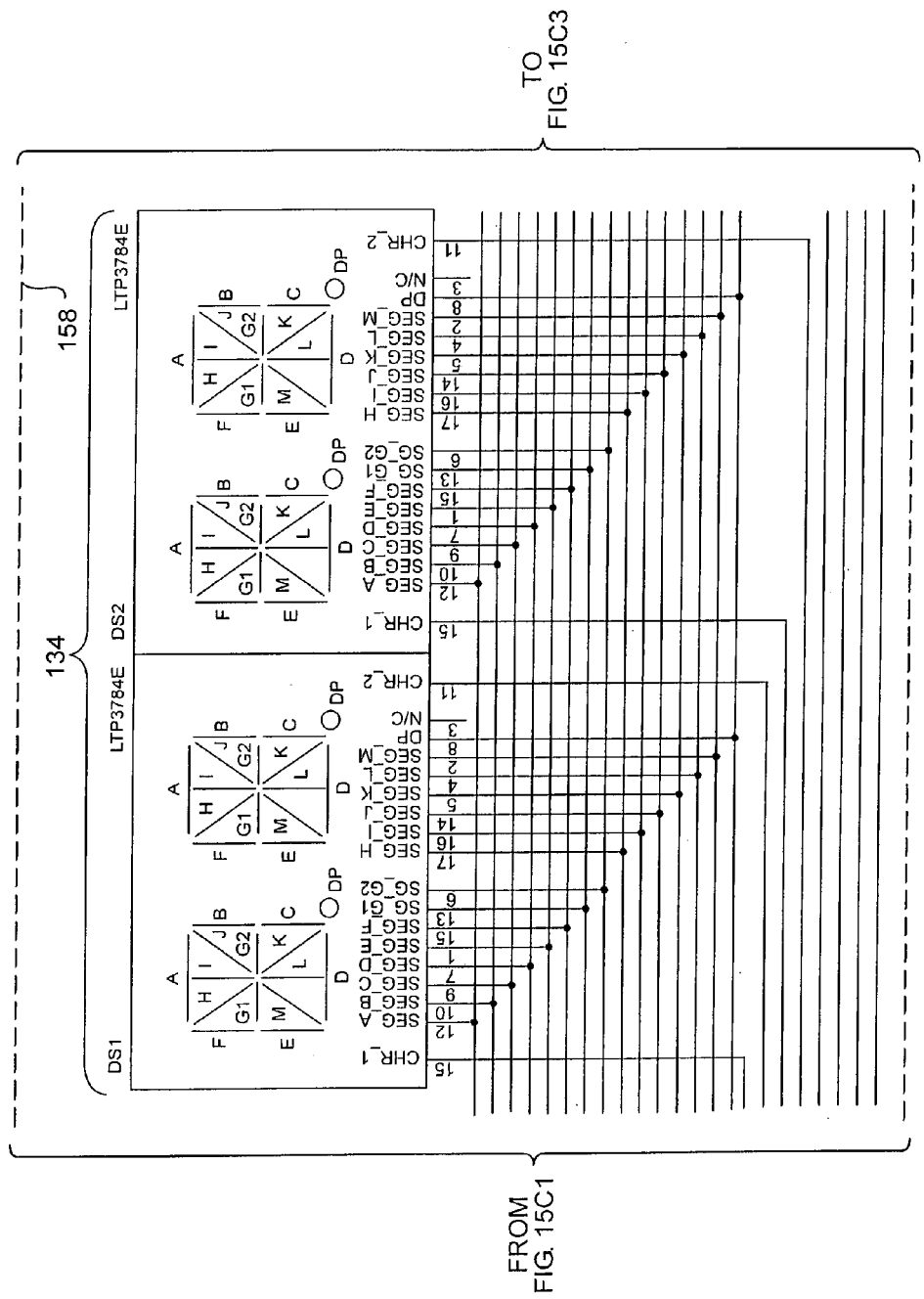
FIG. 15C2 CENTRAL DISPLAY BOARD

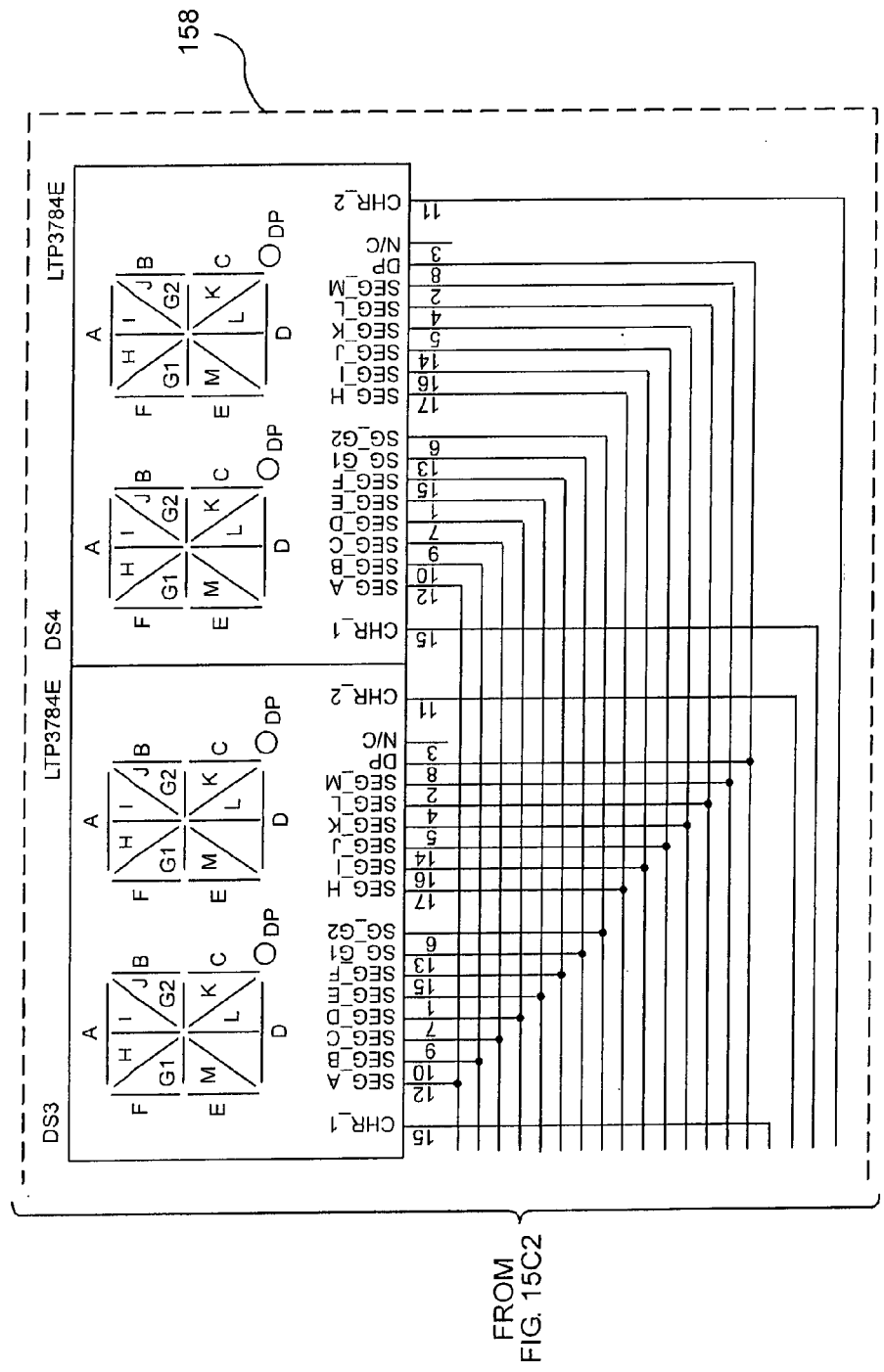
FIG. 15C3 CENTRAL DISPLAY BOARD

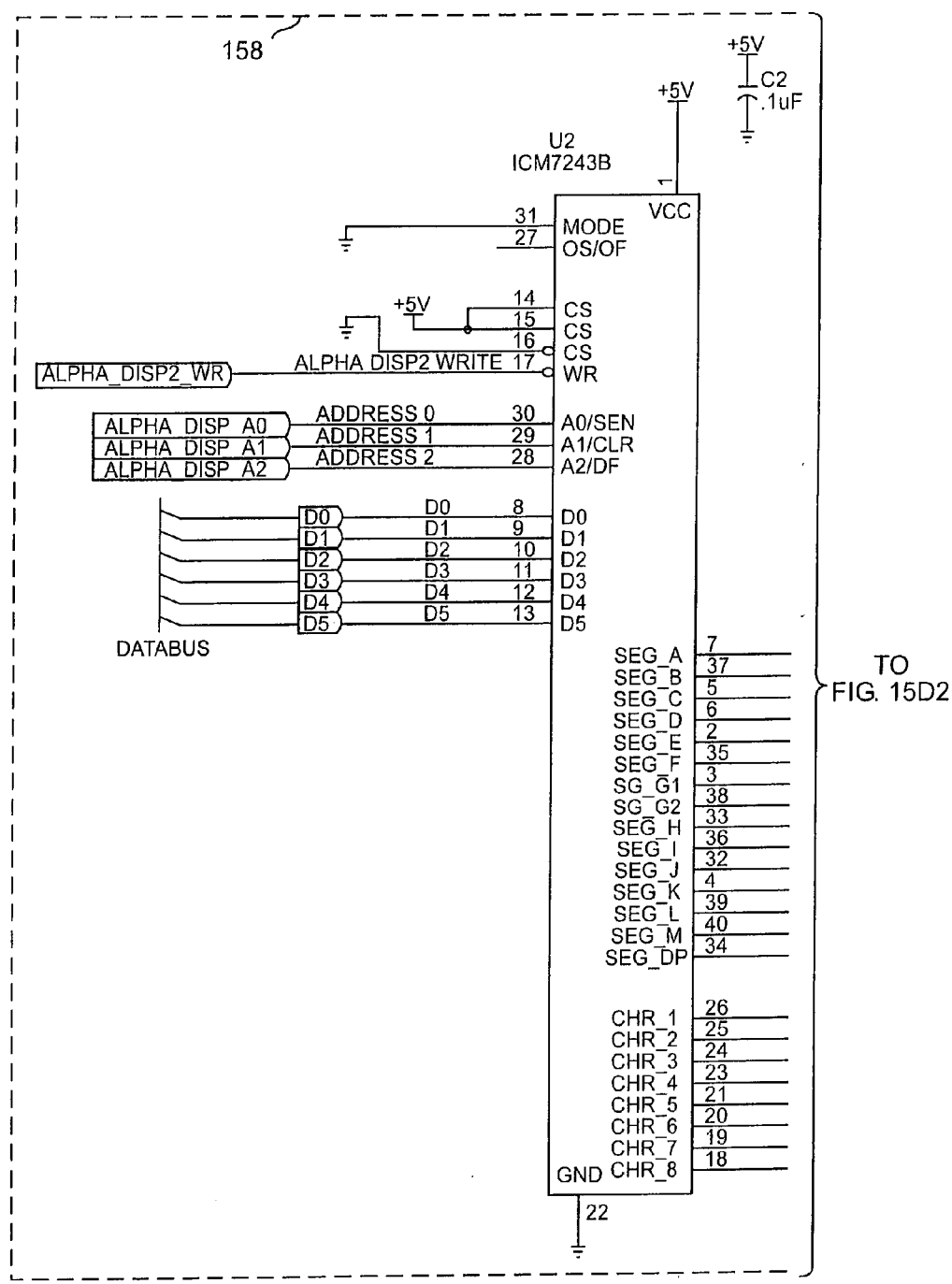
FIG. 15D CENTRAL DISPLAY BOARD

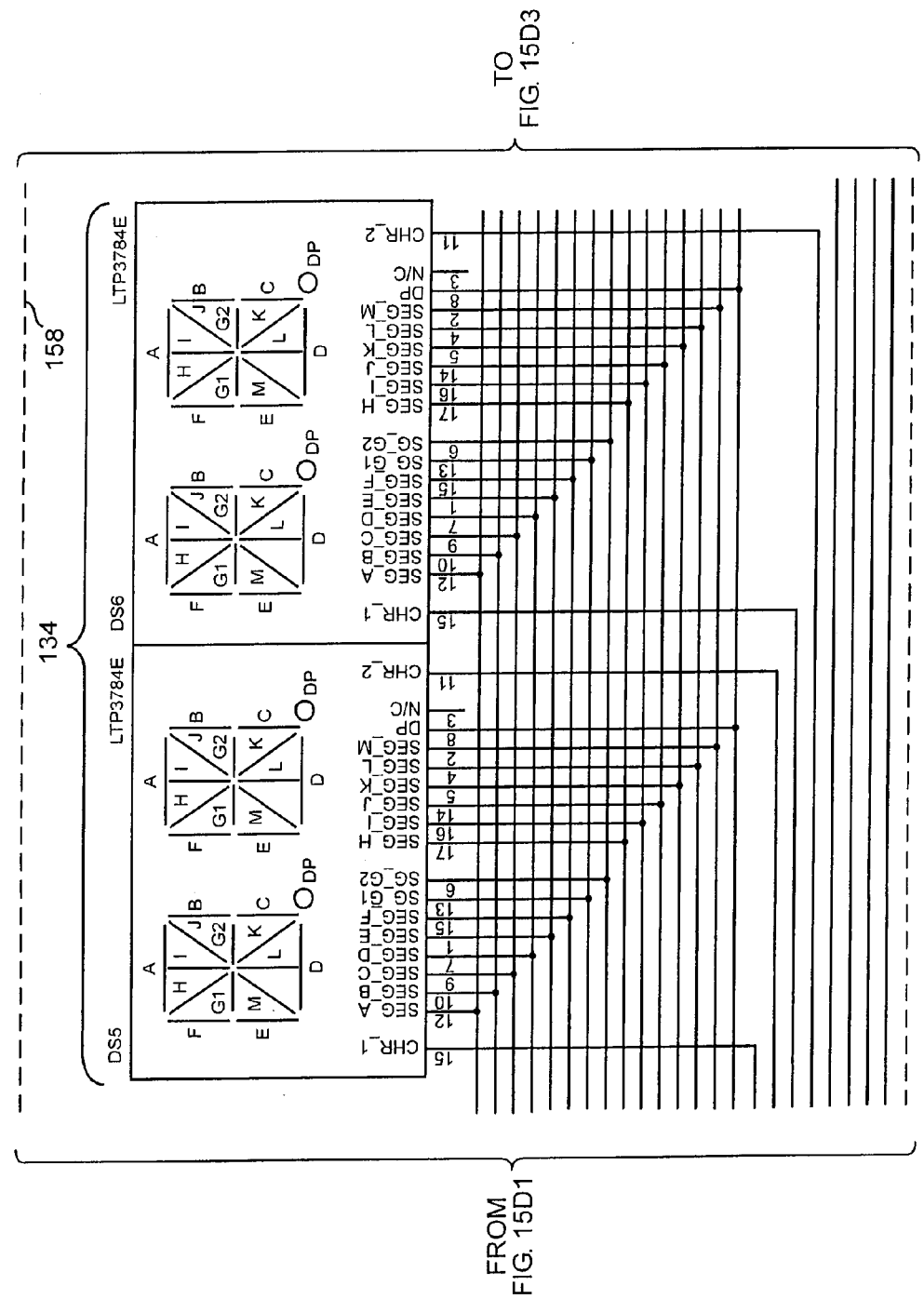
FIG. 15D2 CENTRAL DISPLAY BOARD

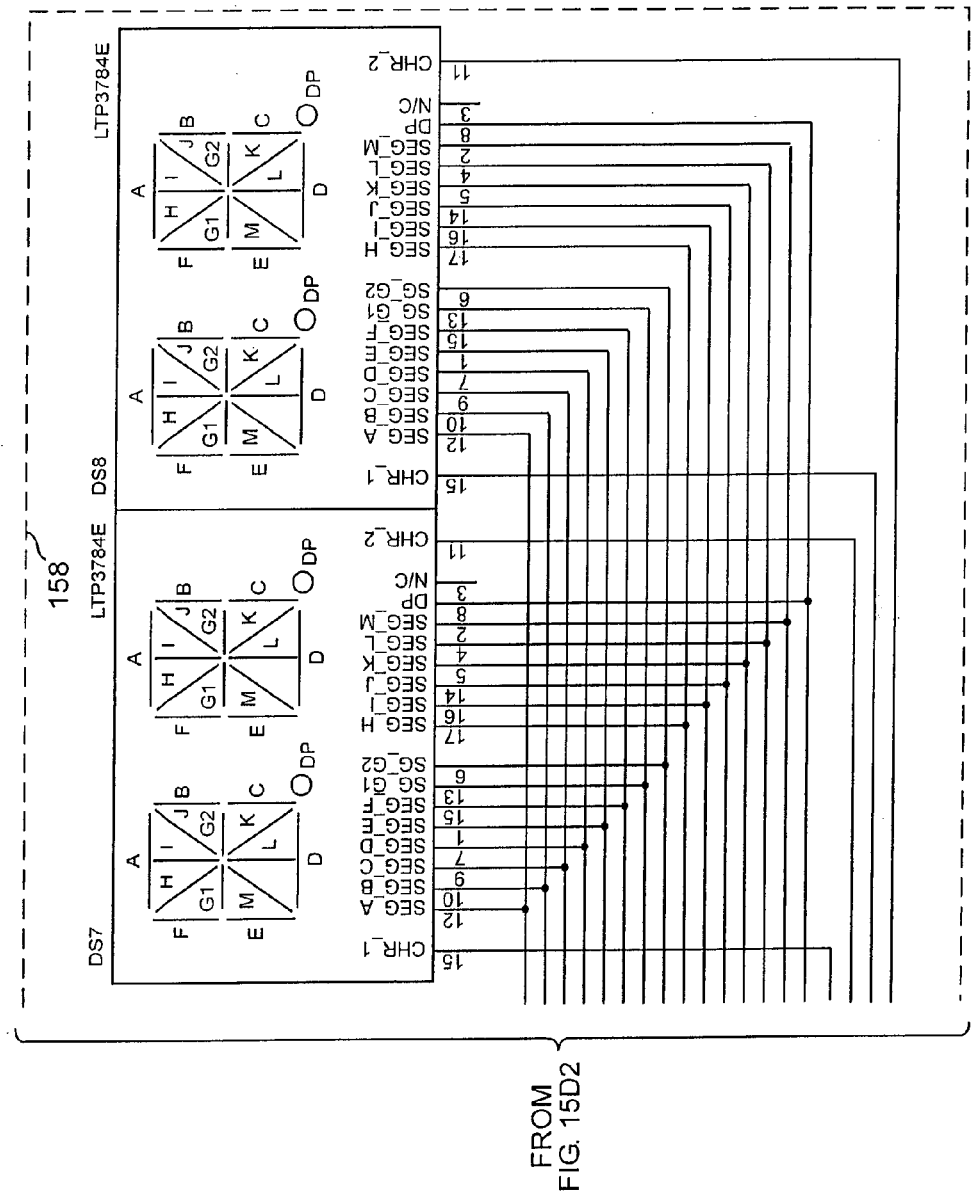
FIG. 15D3 CENTRAL DISPLAY BOARD

FIG. 15E1 CENTRAL DISPLAY BOARD
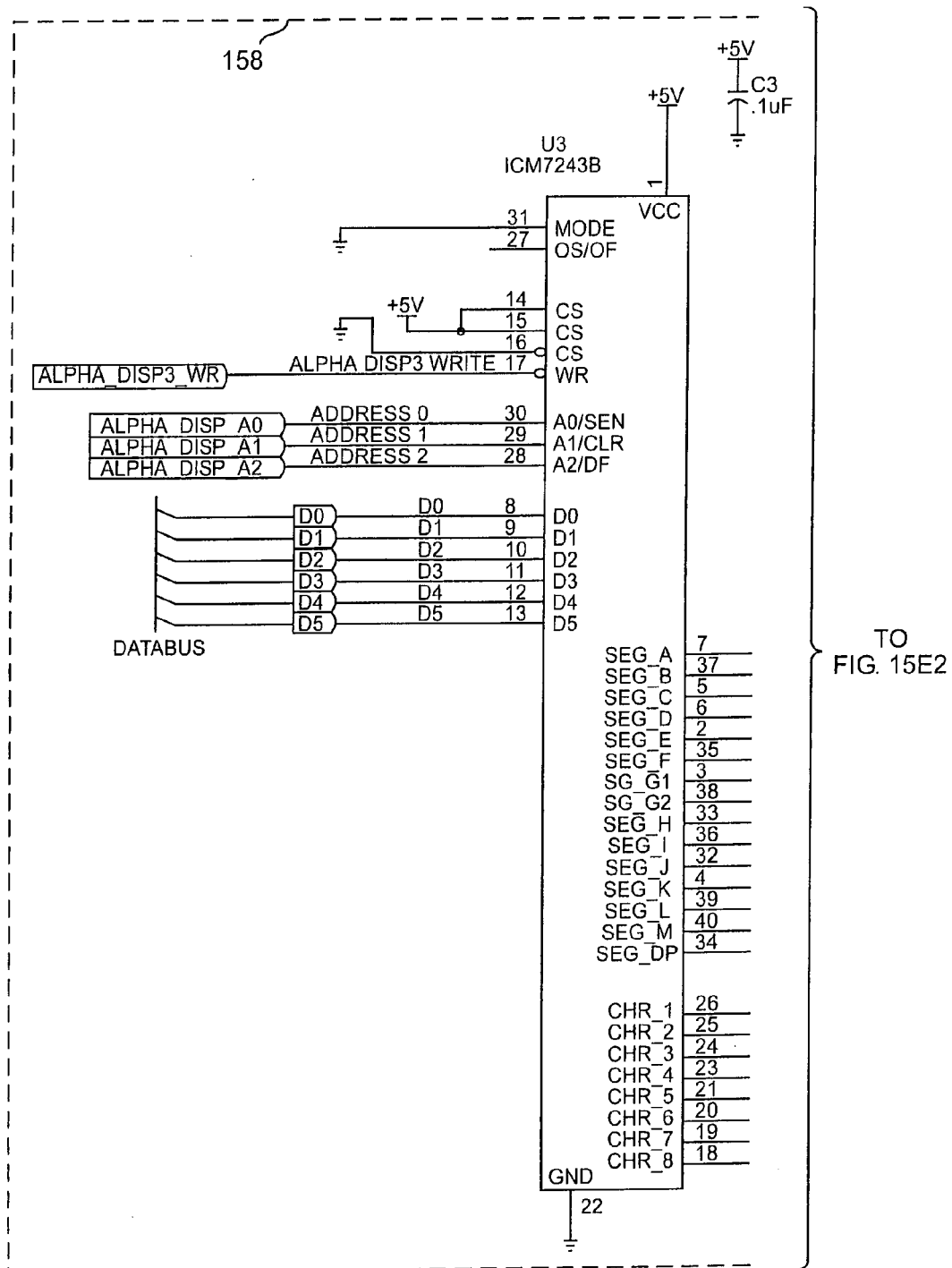

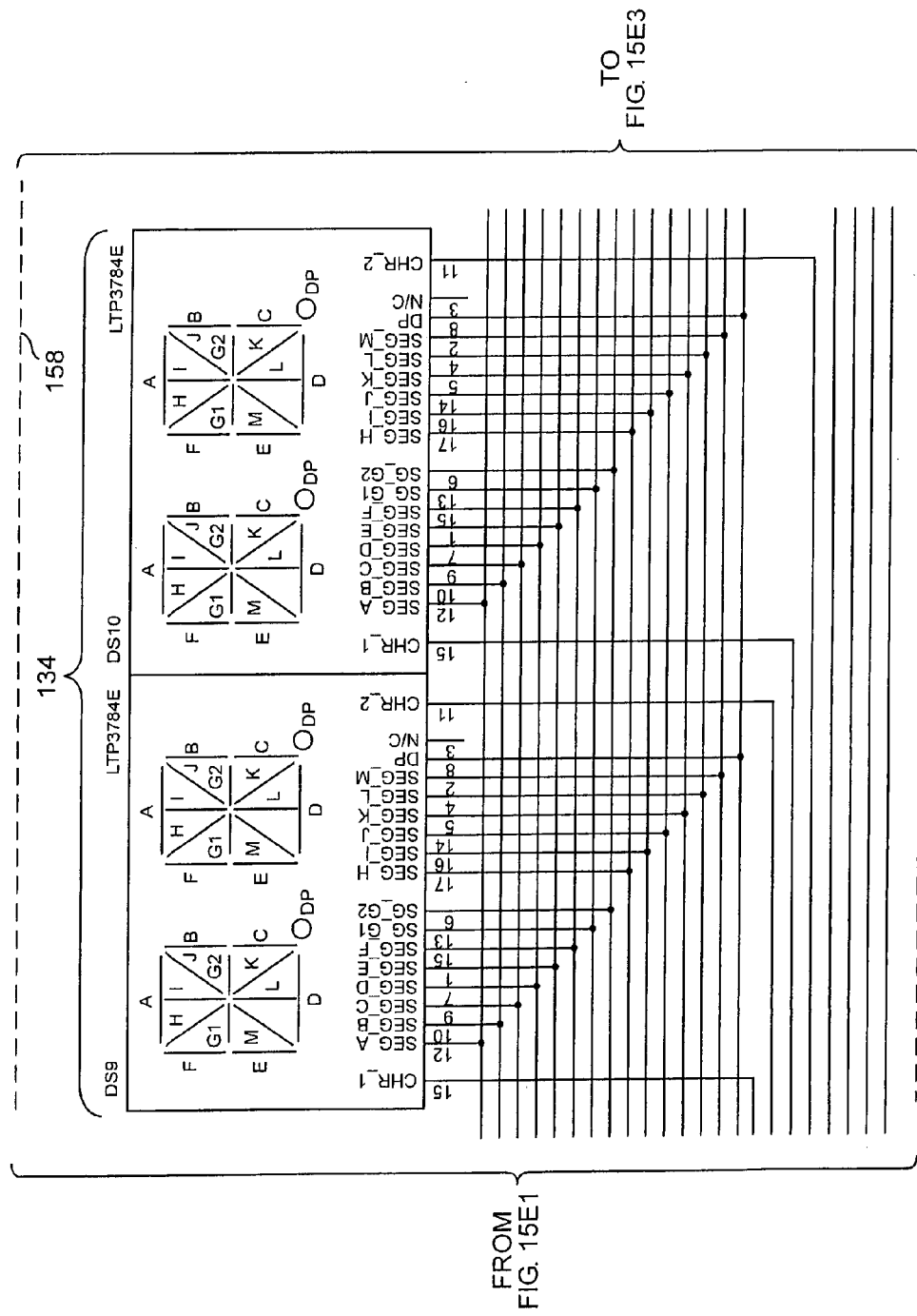
FIG. 15E2 CENTRAL DISPLAY BOARD

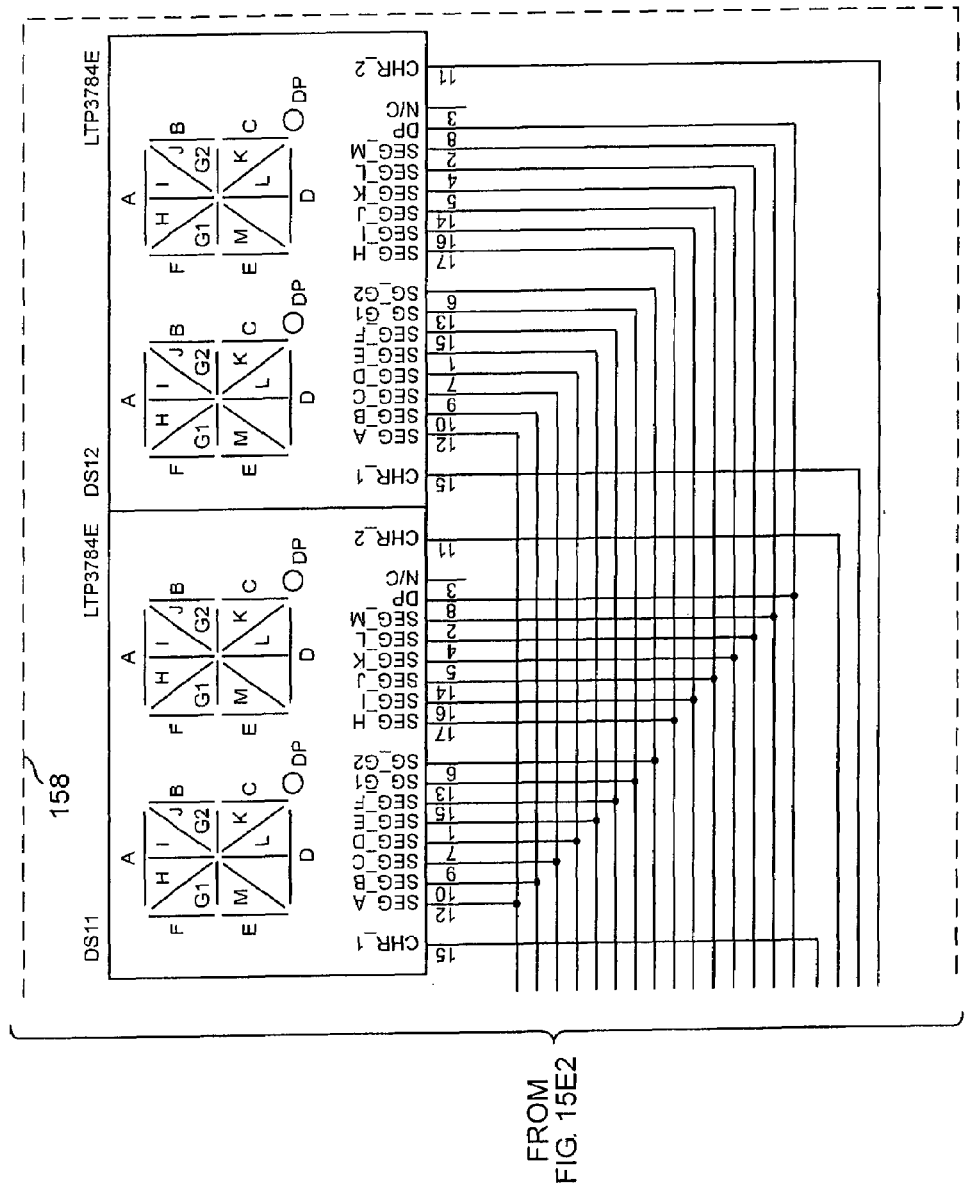
FIG. 15E3 CENTRAL DISPLAY BOARD

FIG. 15F1 CENTRAL DISPLAY BOARD
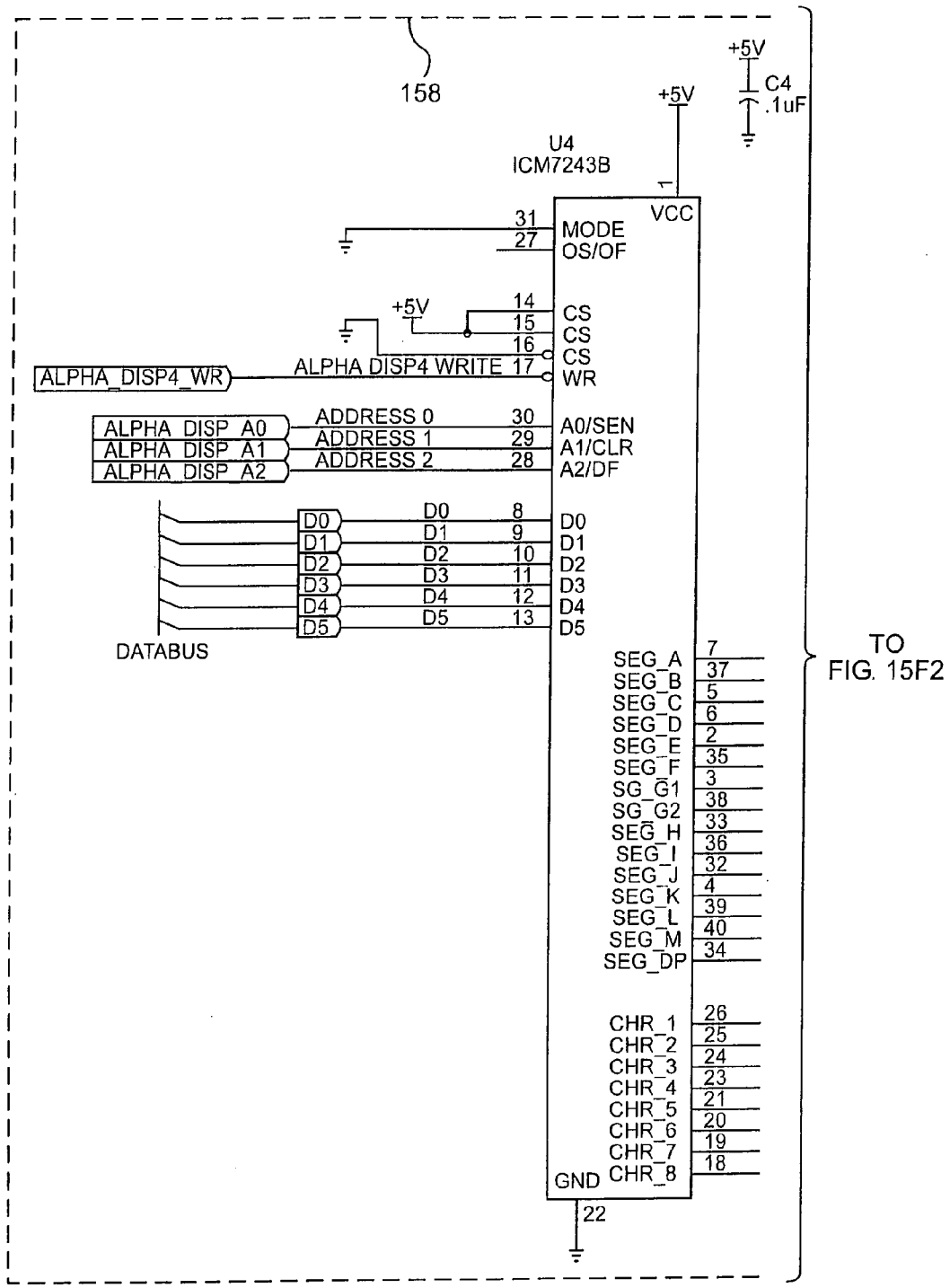

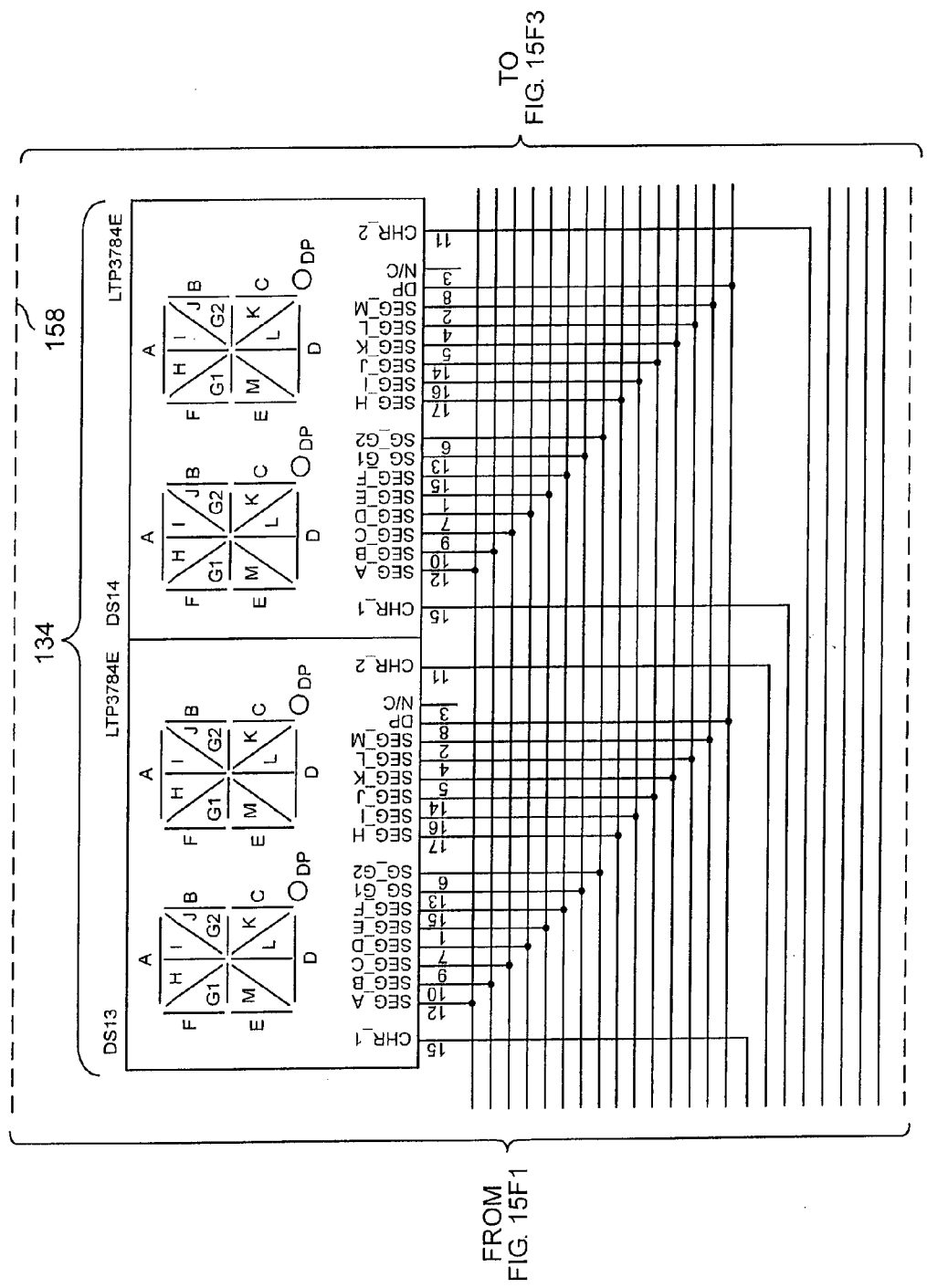
FIG. 15F2 CENTRAL DISPLAY BOARD

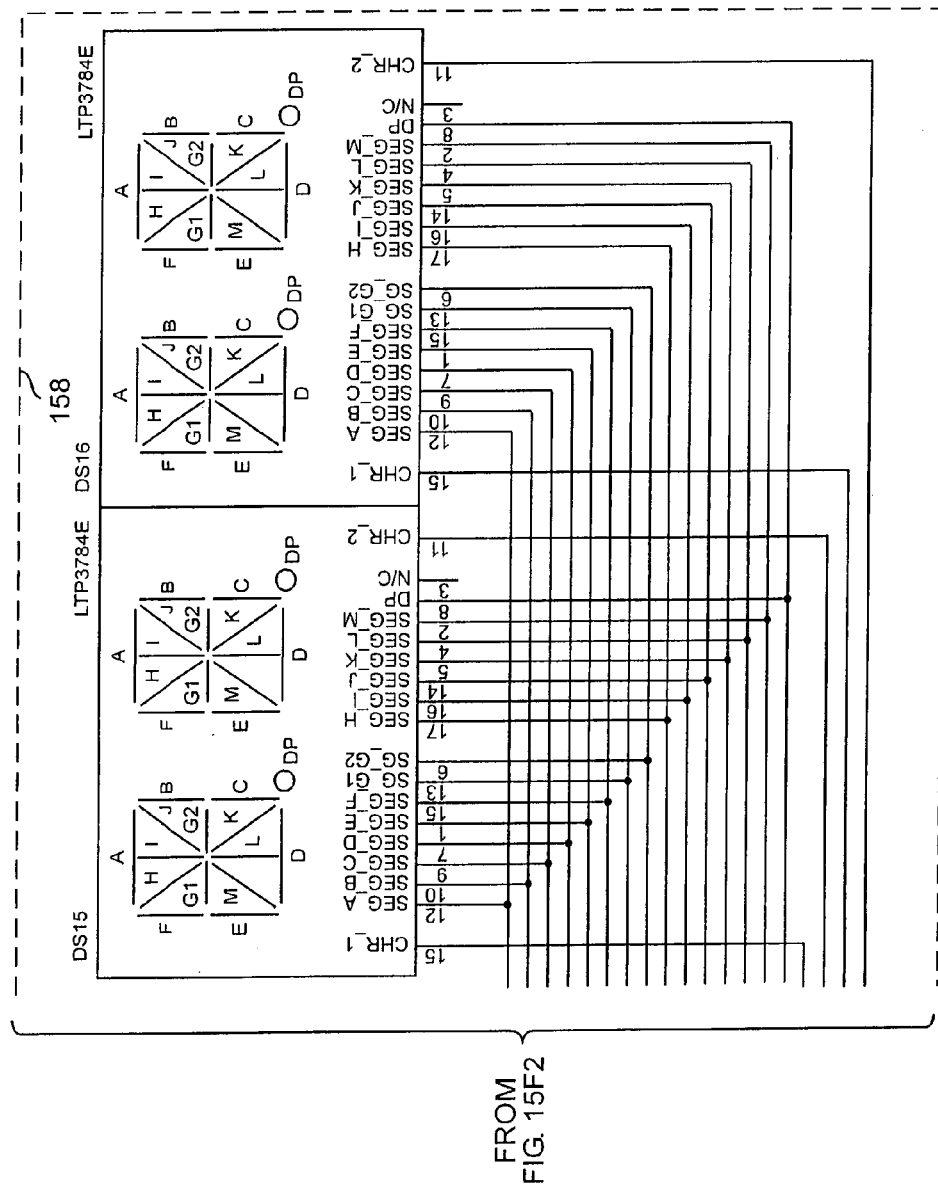
FIG. 15F3 CENTRAL DISPLAY BOARD

FIG. 15G1 CENTRAL DISPLAY BOARD
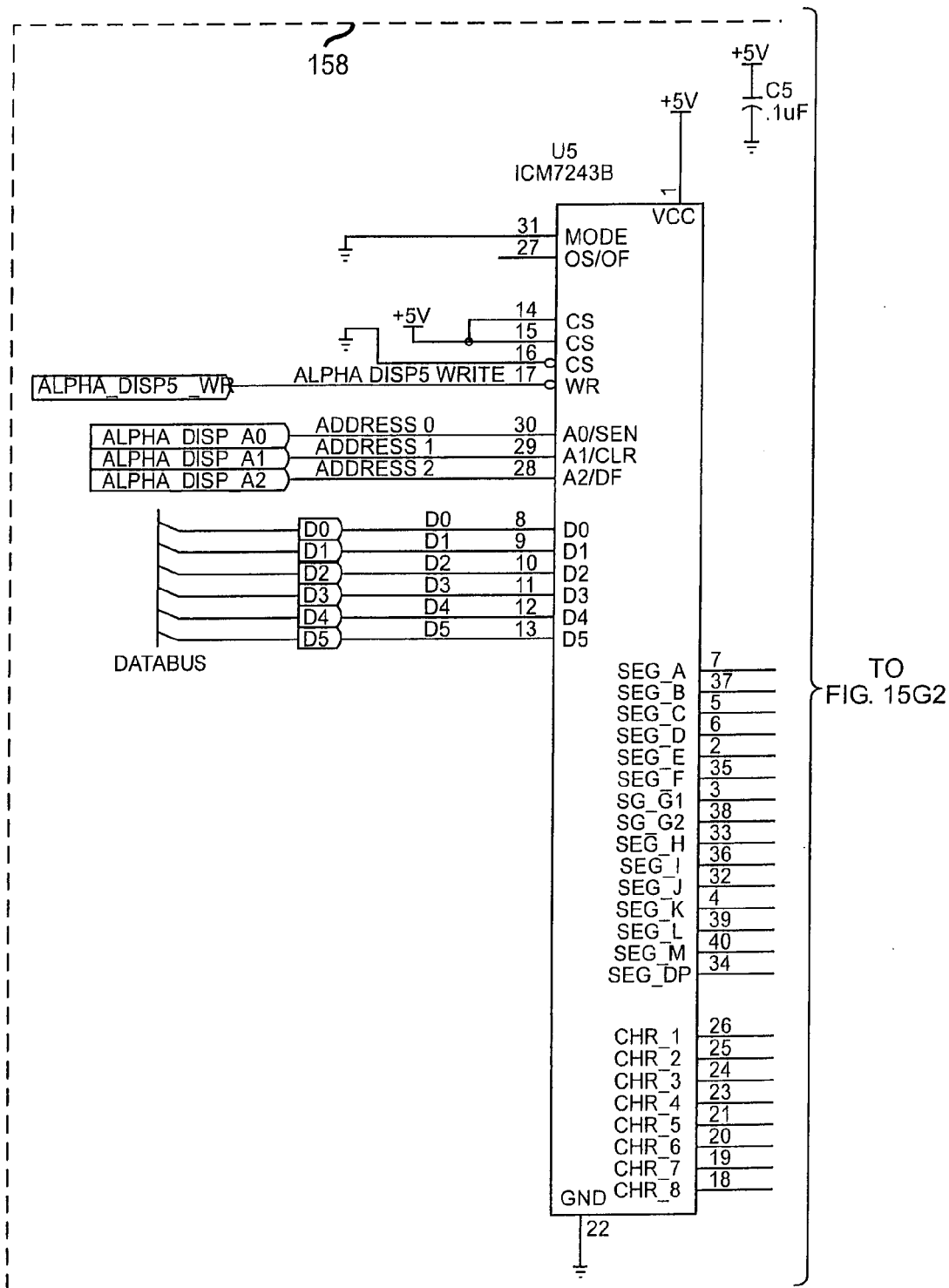

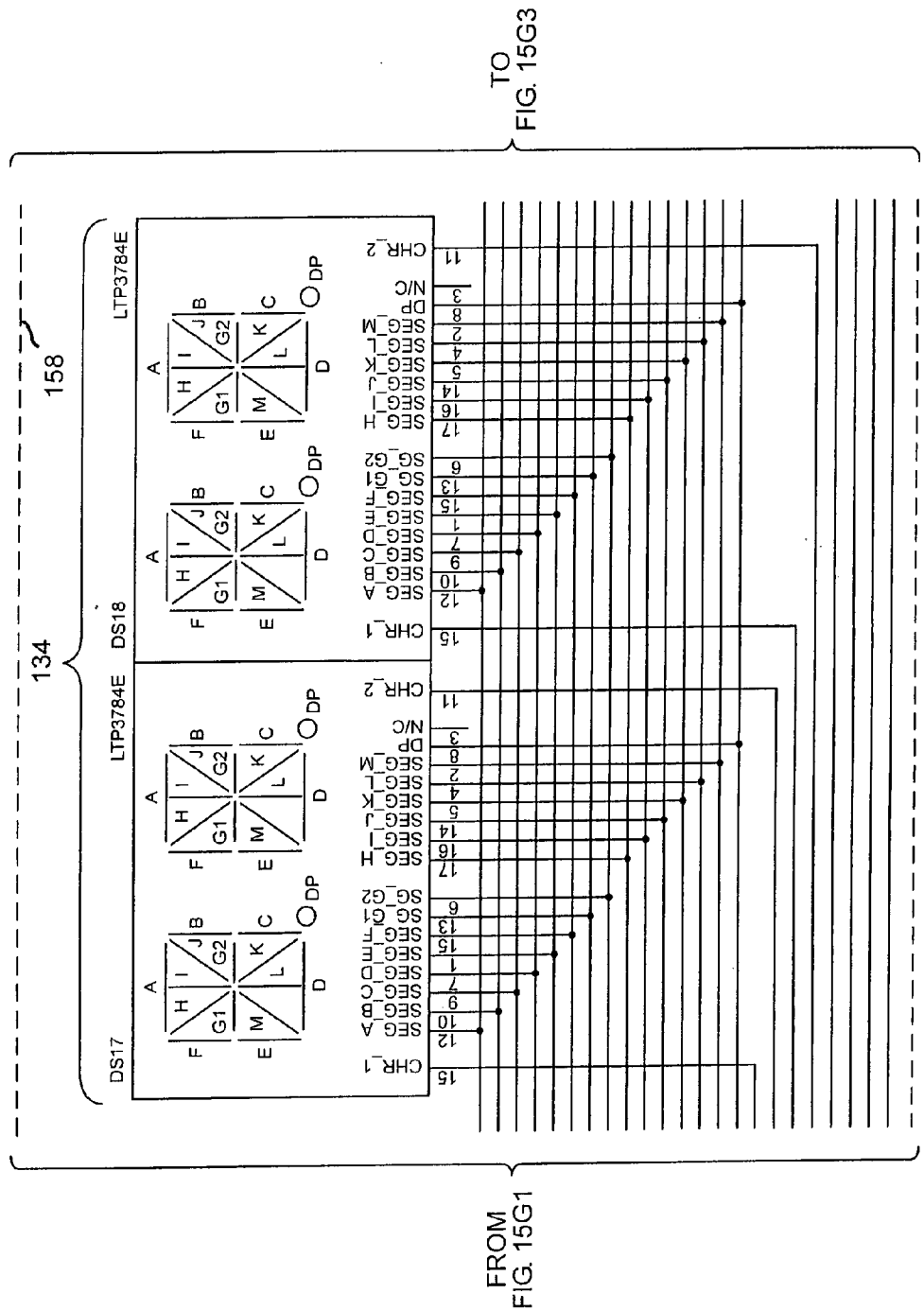
FIG. 15G2 CENTRAL DISPLAY BOARD

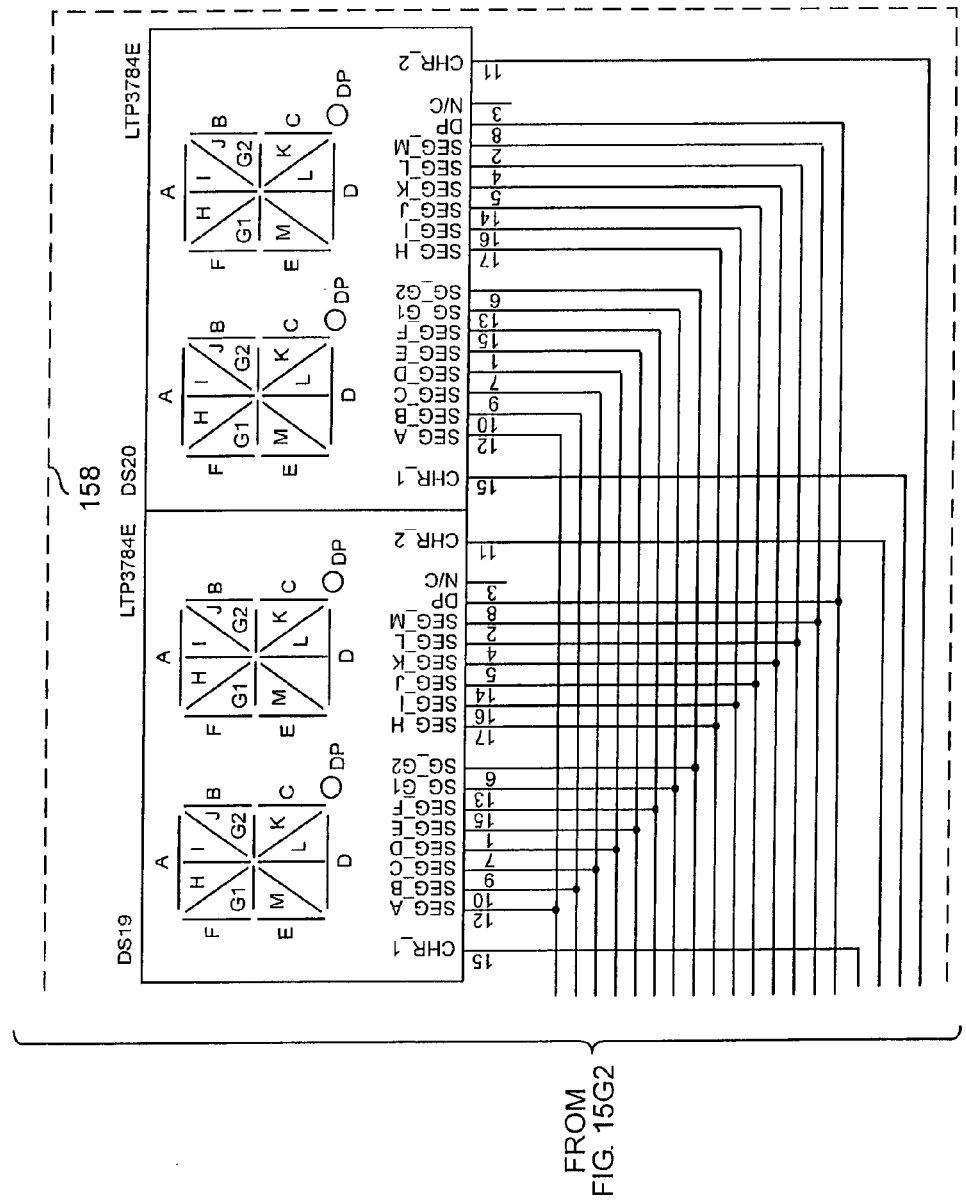
FIG. 15G3 CENTRAL DISPLAY BOARD

FIG. 15H1 CENTRAL DISPLAY BOARD
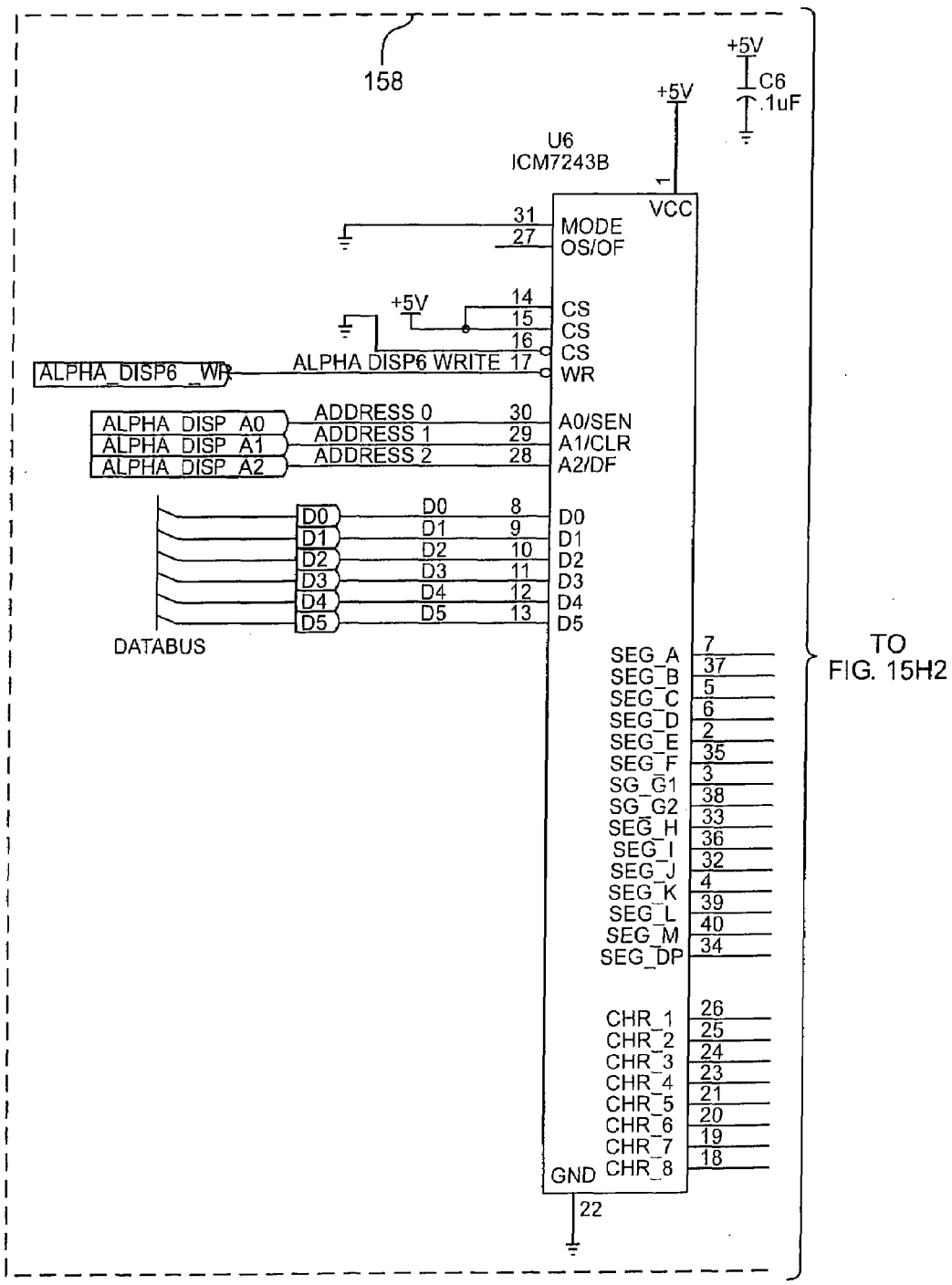

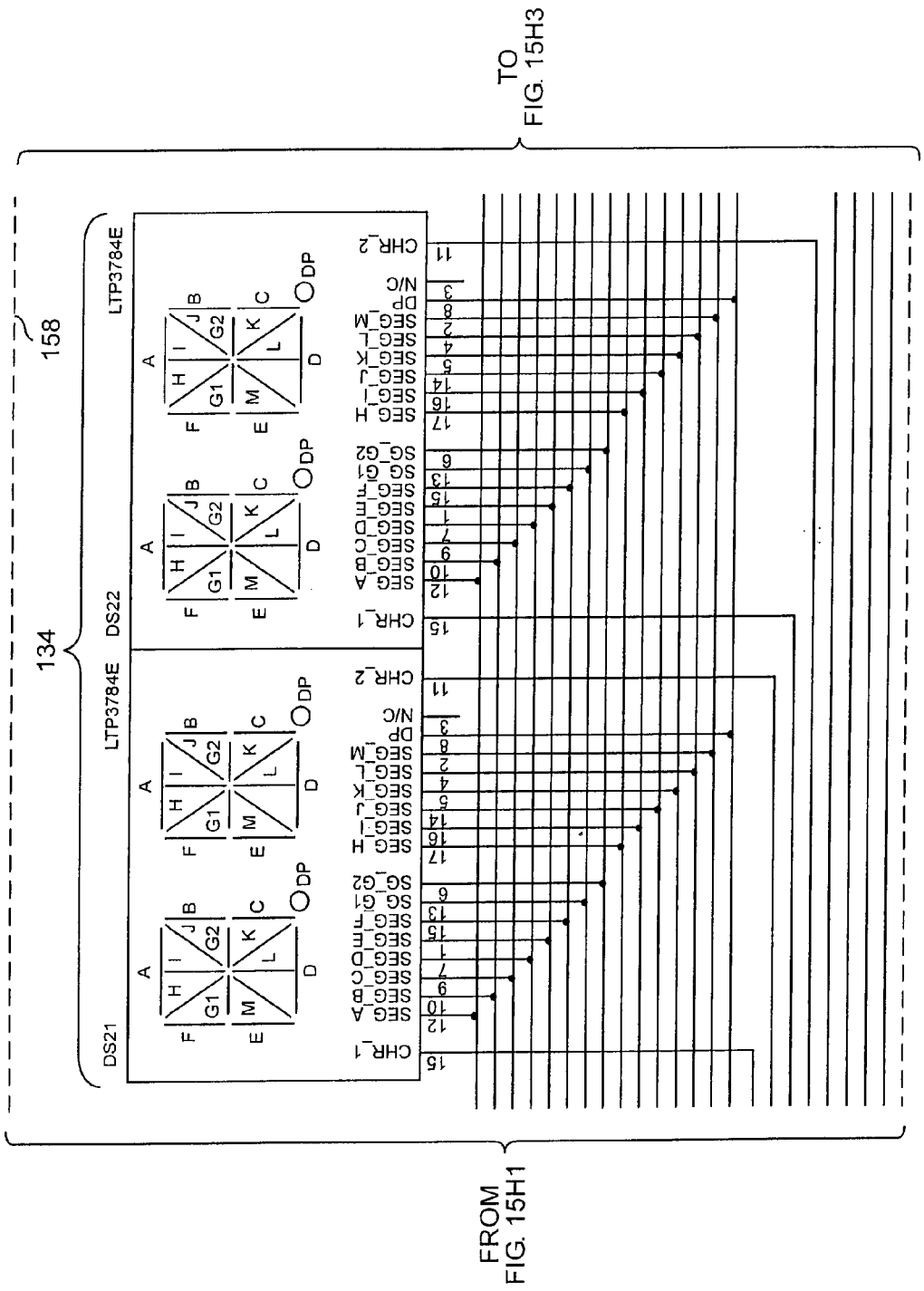
FIG. 15H2 CENTRAL DISPLAY BOARD

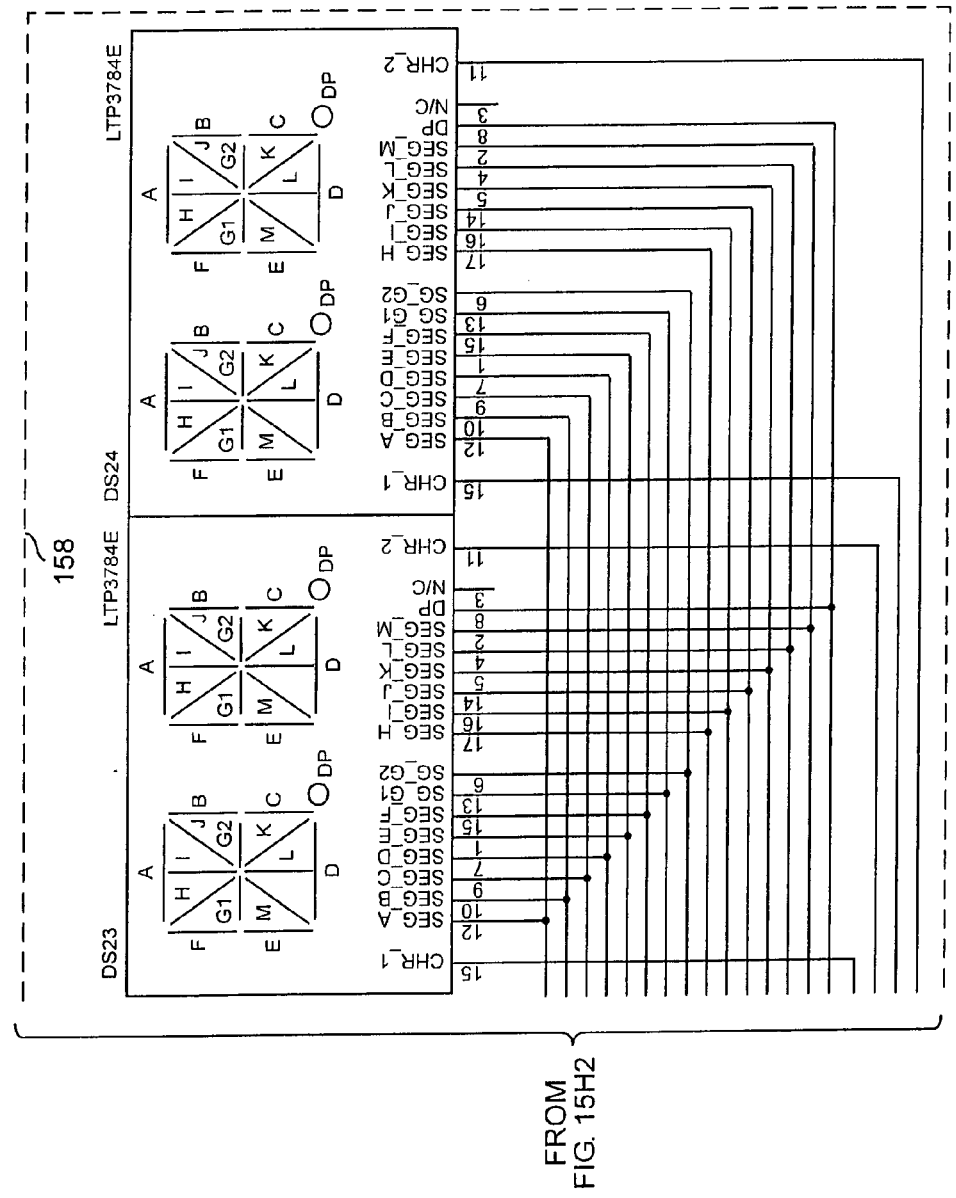
FIG. 15H3 CENTRAL DISPLAY BOARD

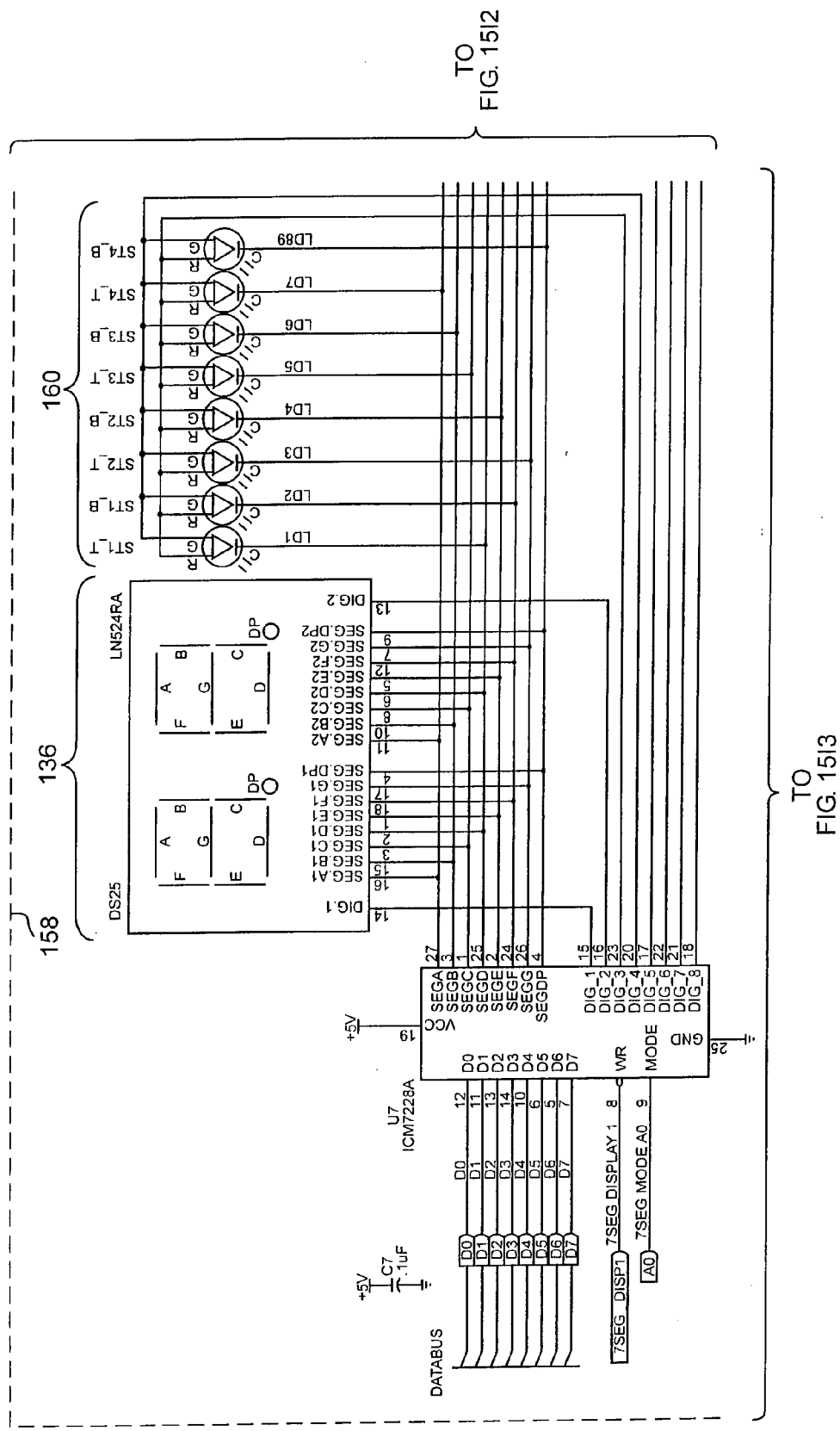
FIG. 15I1 CENTRAL DISPLAY BOARD

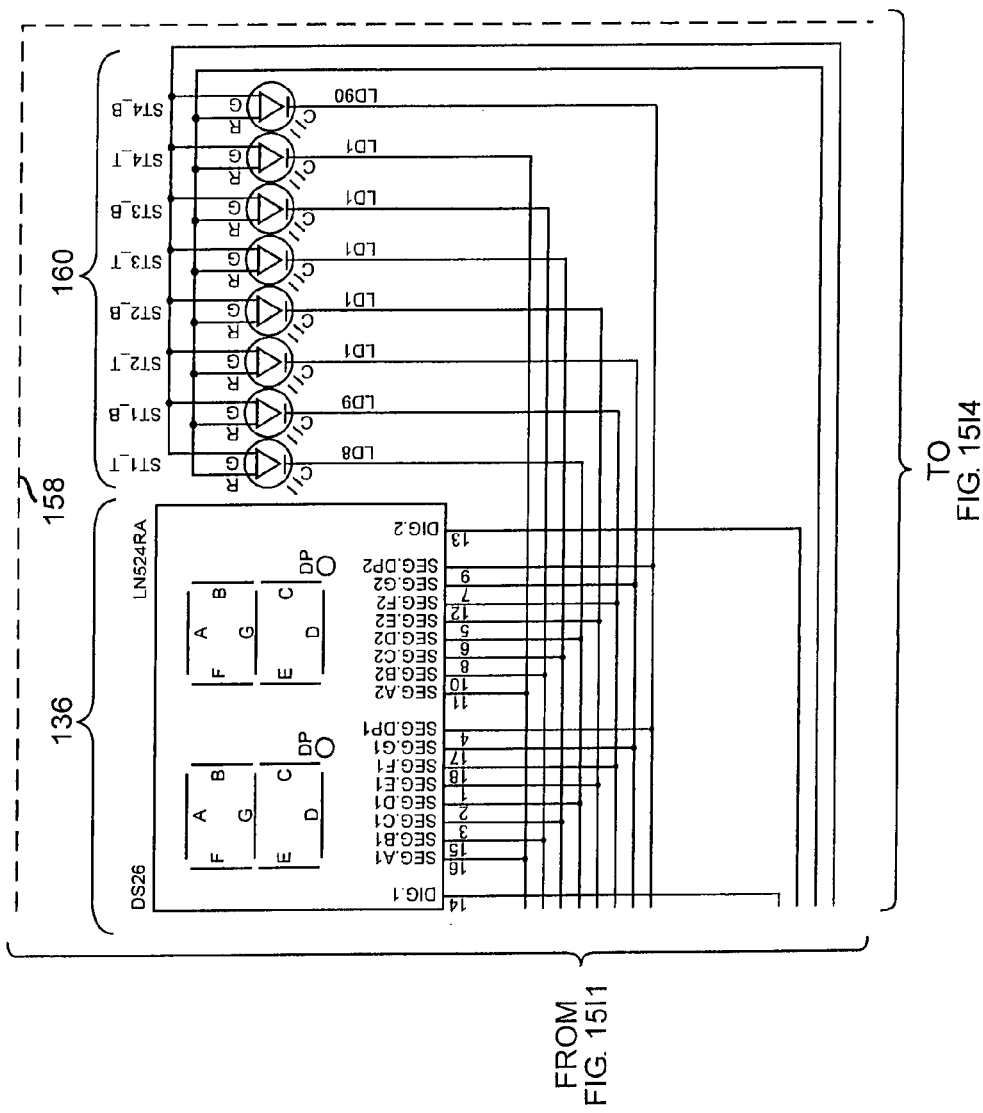
FIG. 15I2 CENTRAL DISPLAY BOARD

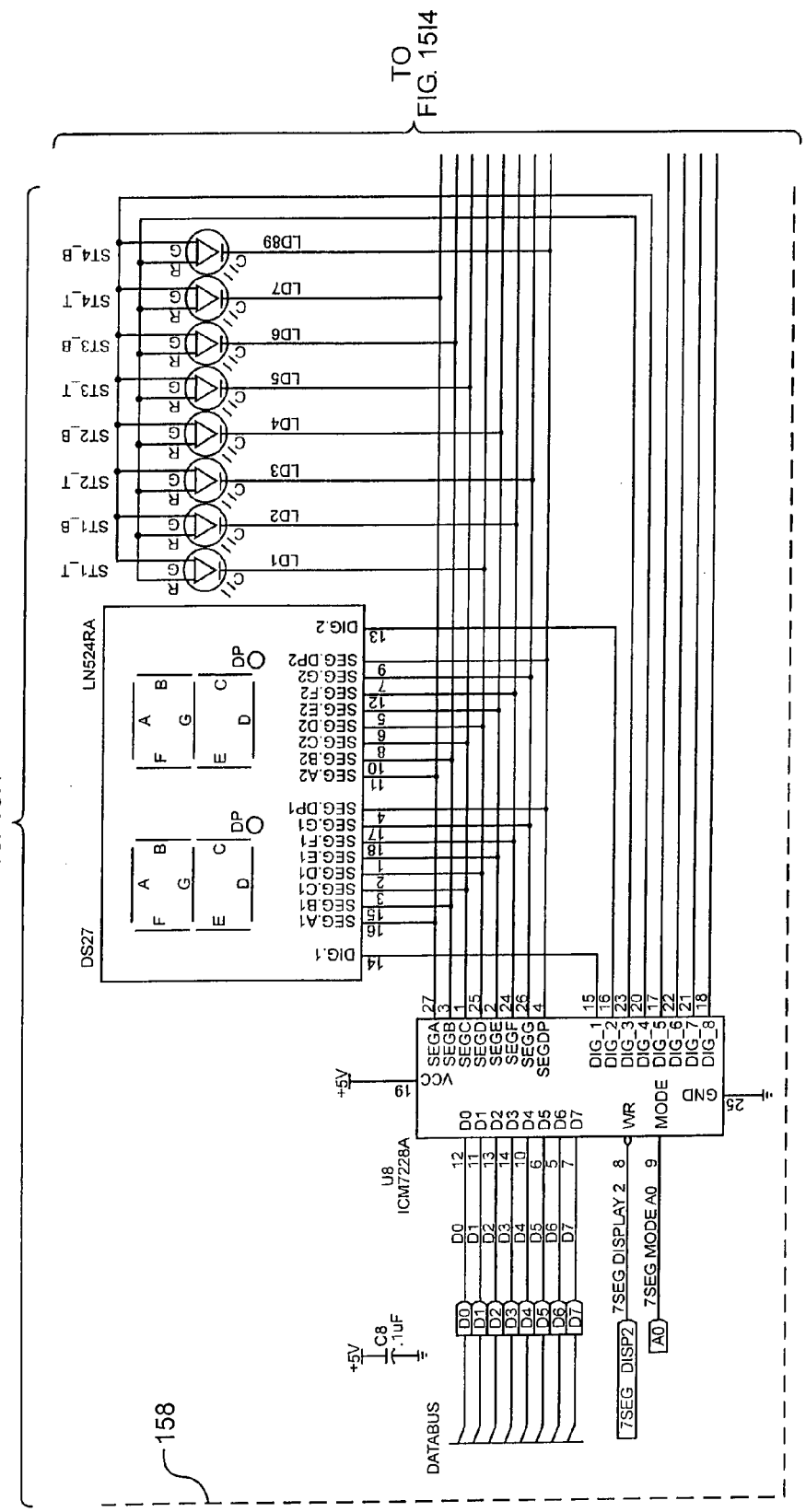
FIG. 1513 CENTRAL DISPLAY BOARD

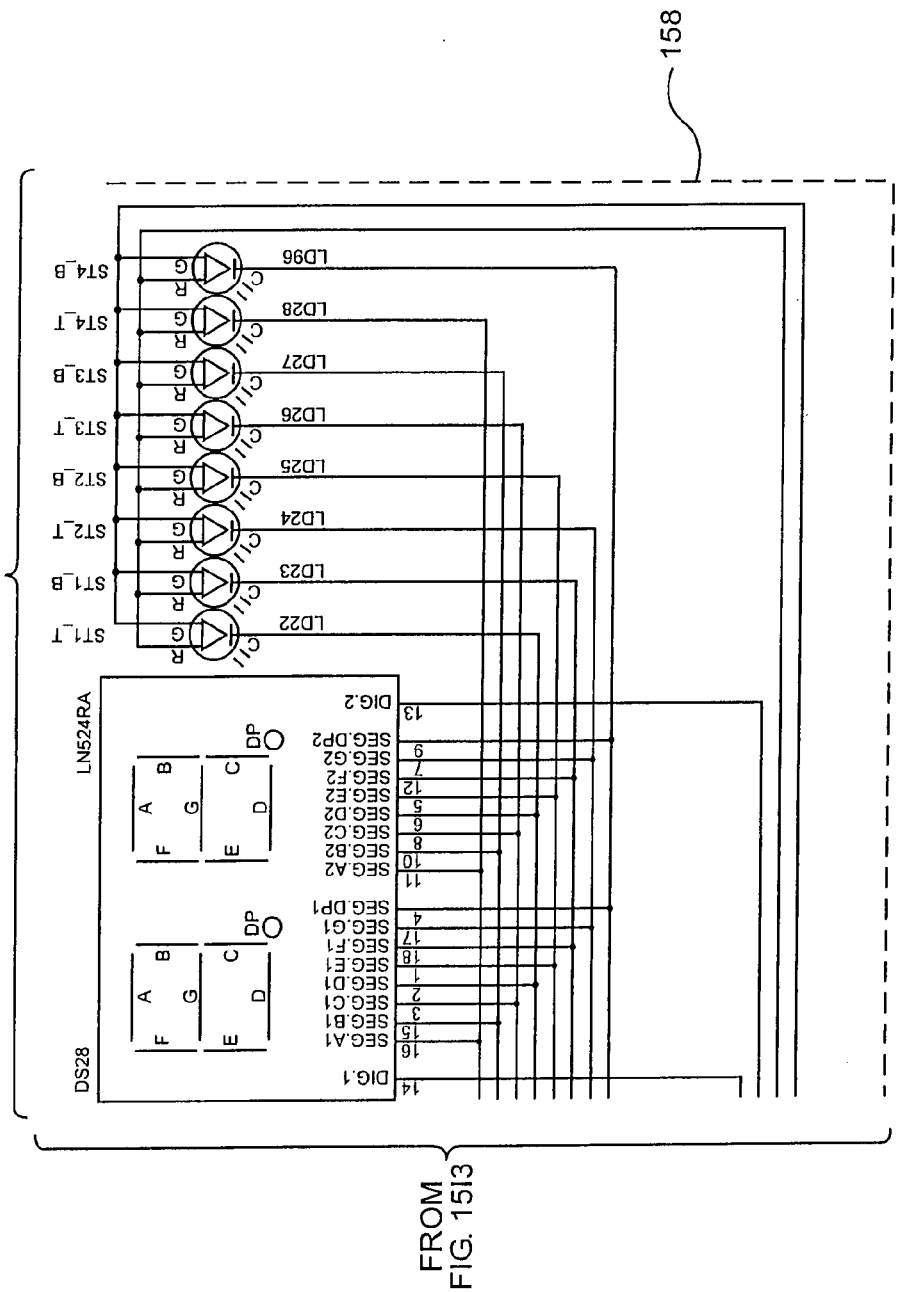
FIG. 1514 CENTRAL DISPLAY BOARD

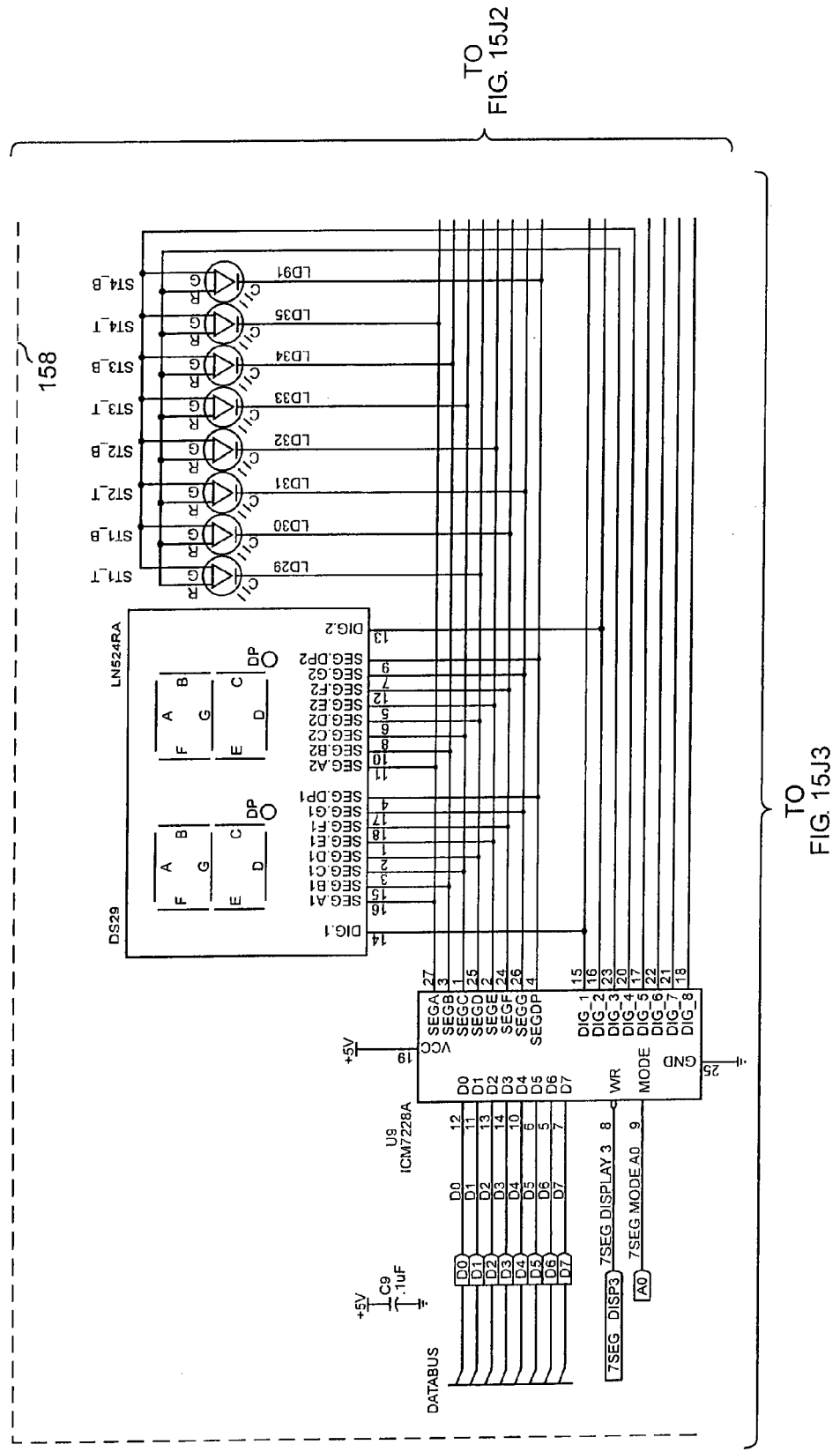
FIG. 15J1 CENTRAL DISPLAY BOARD

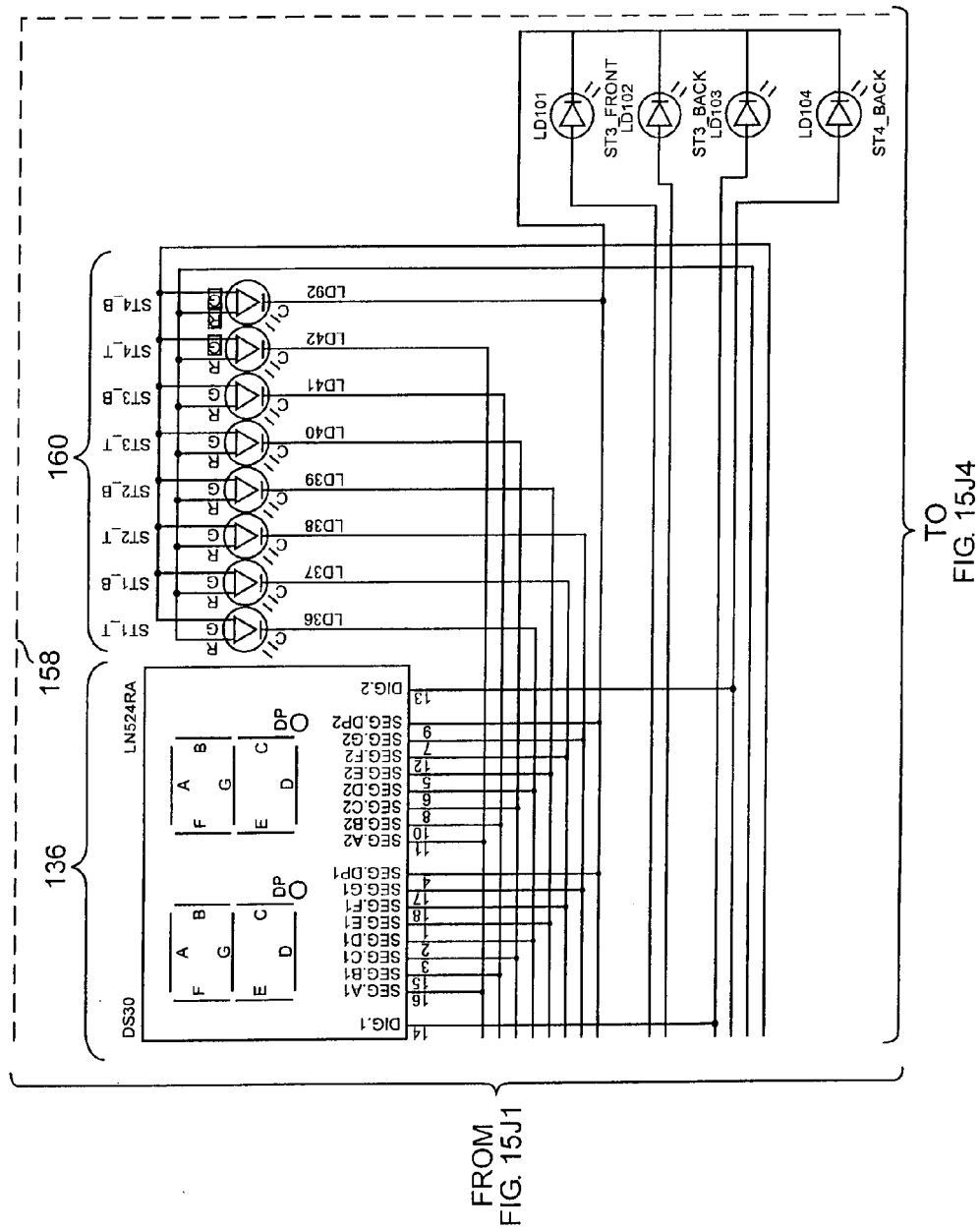
FIG. 15J2 CENTRAL DISPLAY BOARD

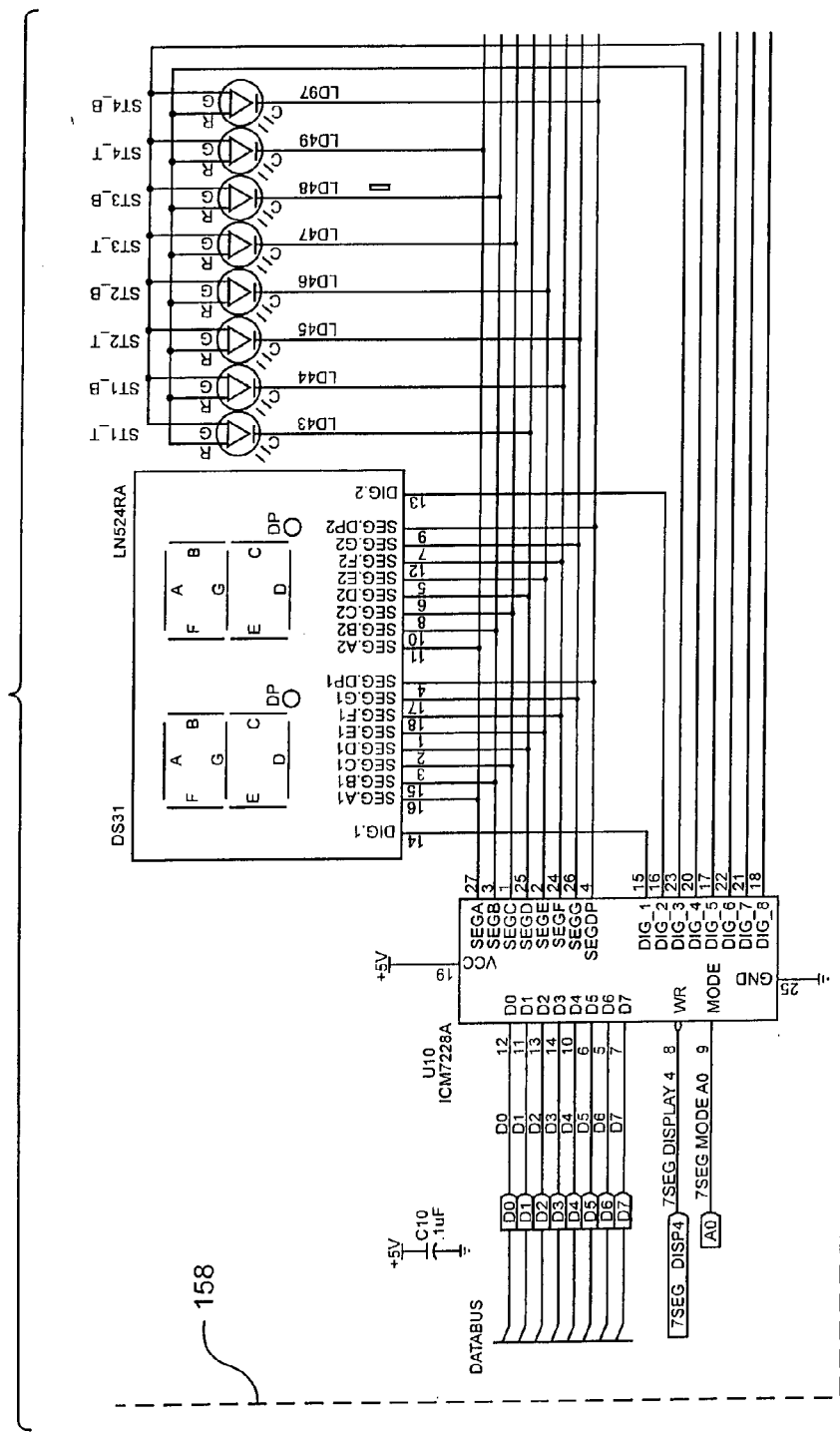
FIG. 15J3 CENTRAL DISPLAY BOARD

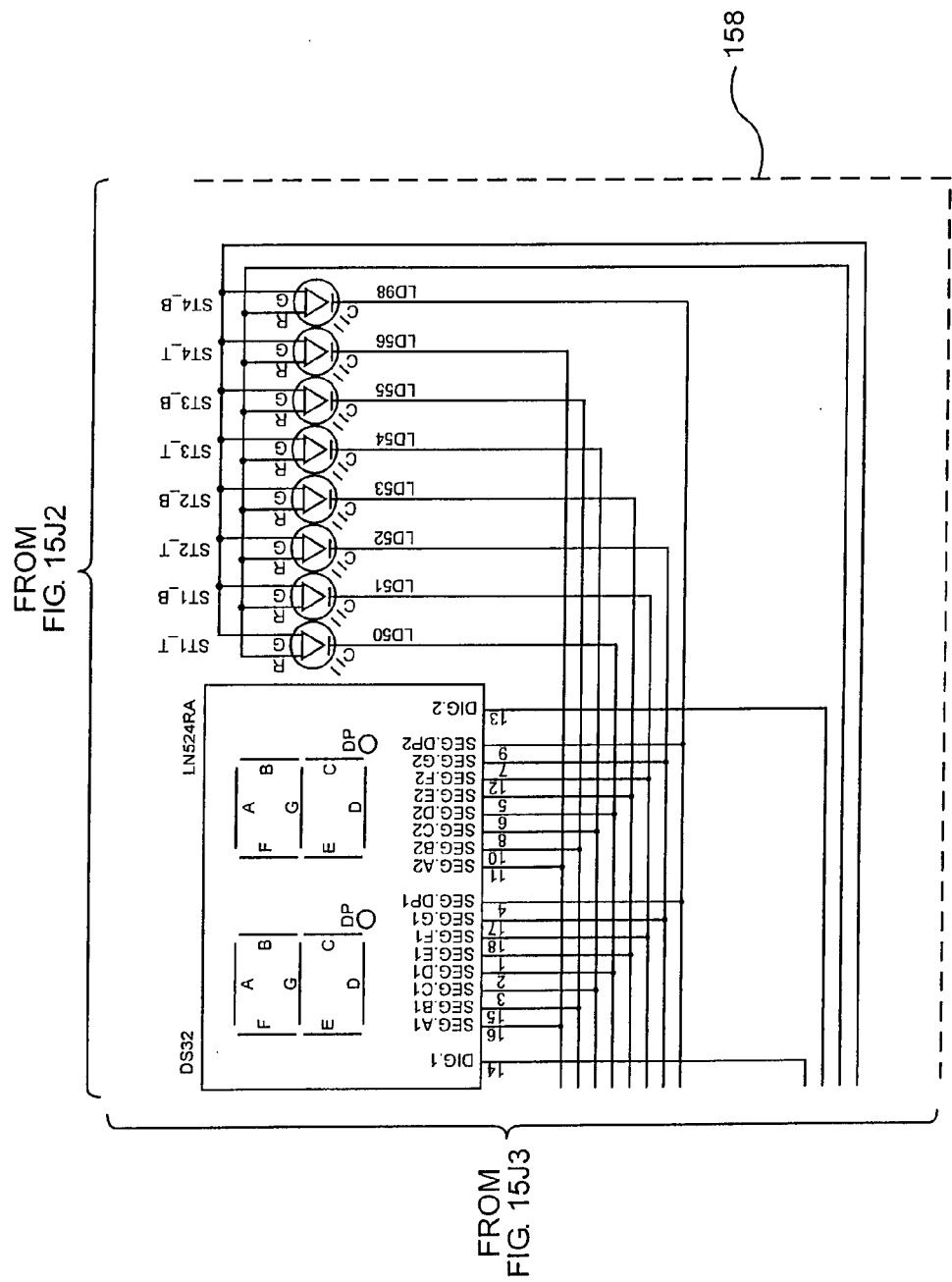
FIG. 15J4 CENTRAL DISPLAY BOARD

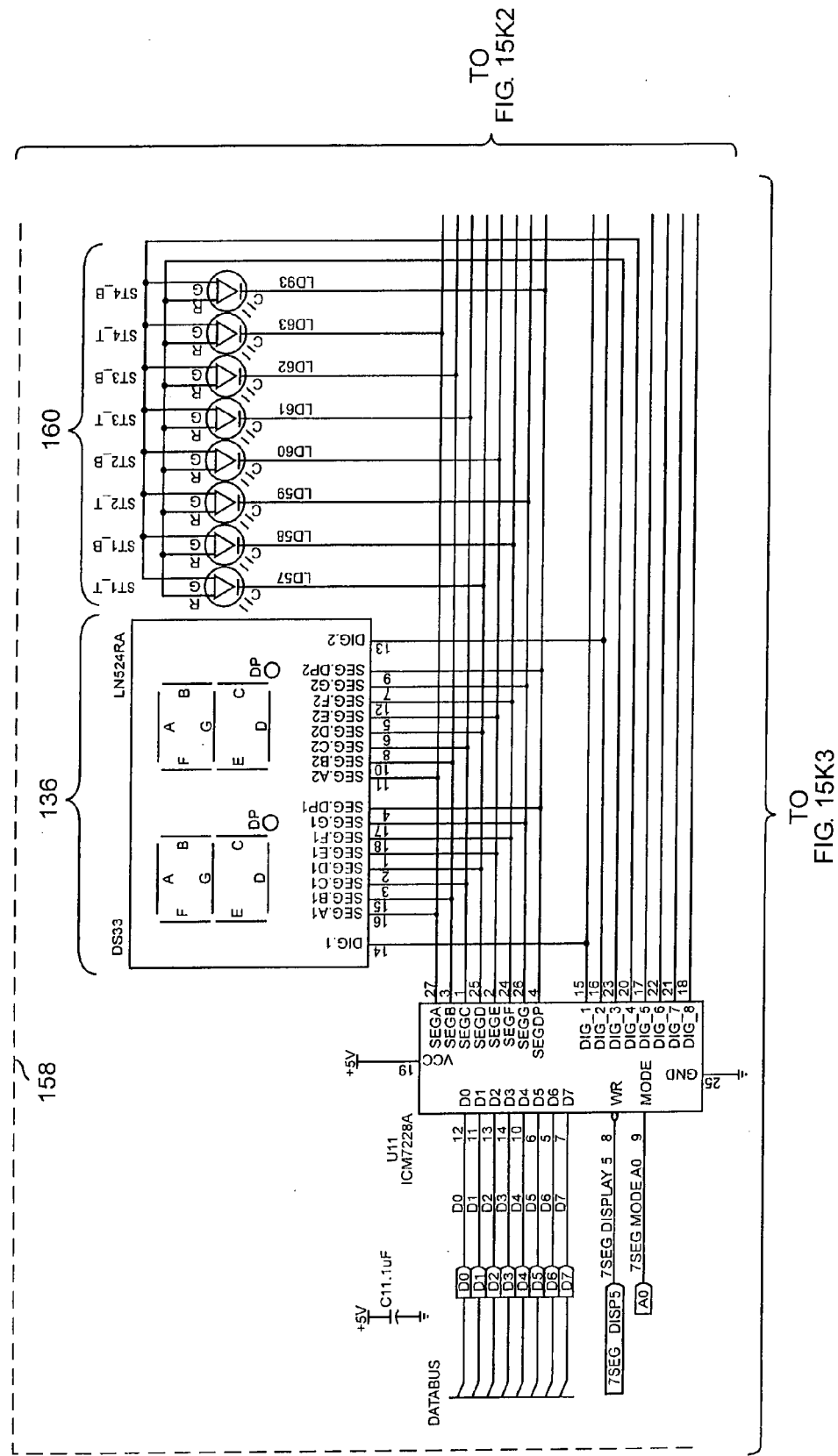
FIG. 15K1 CENTRAL DISPLAY BOARD

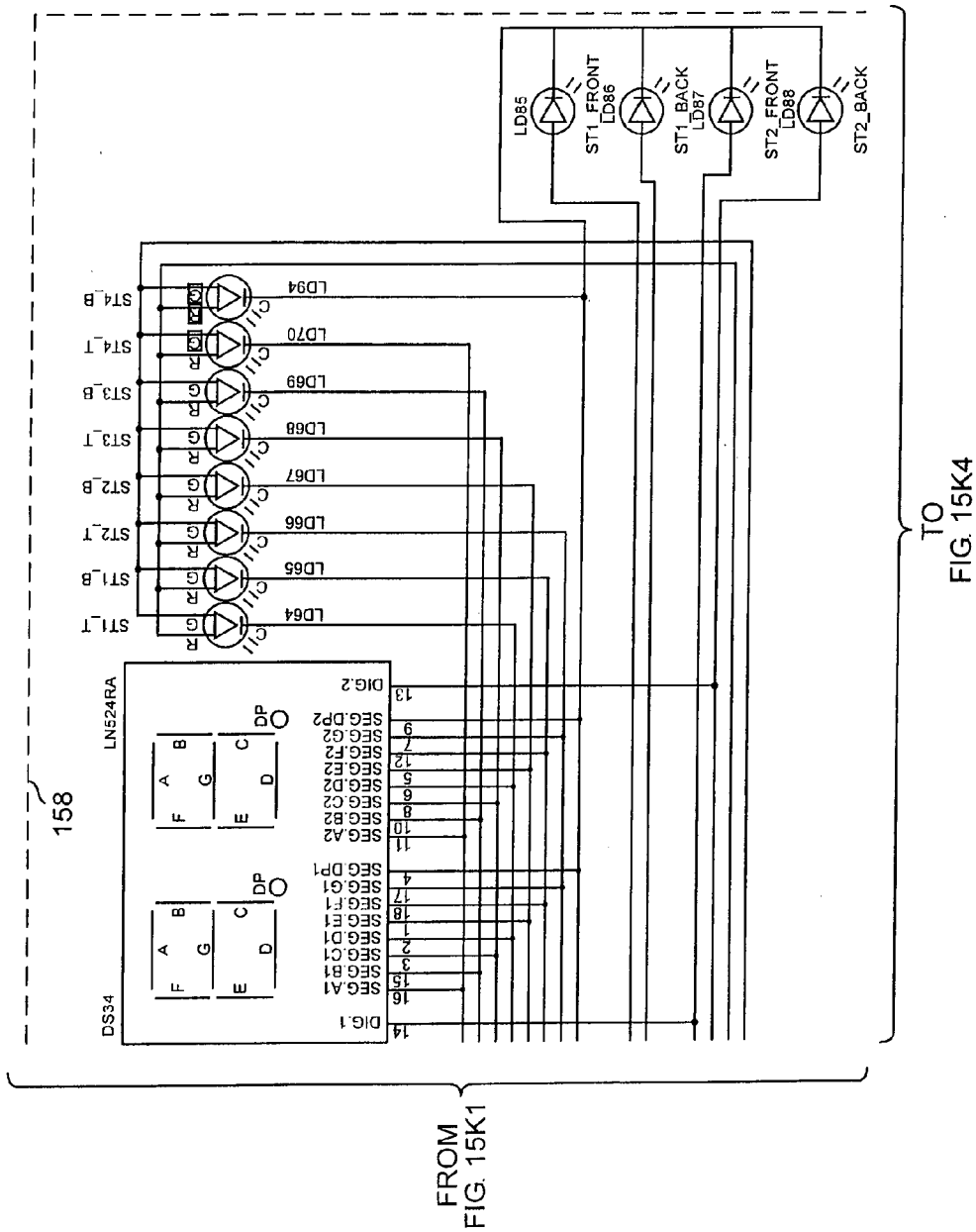
FIG. 15K2 CENTRAL DISPLAY BOARD

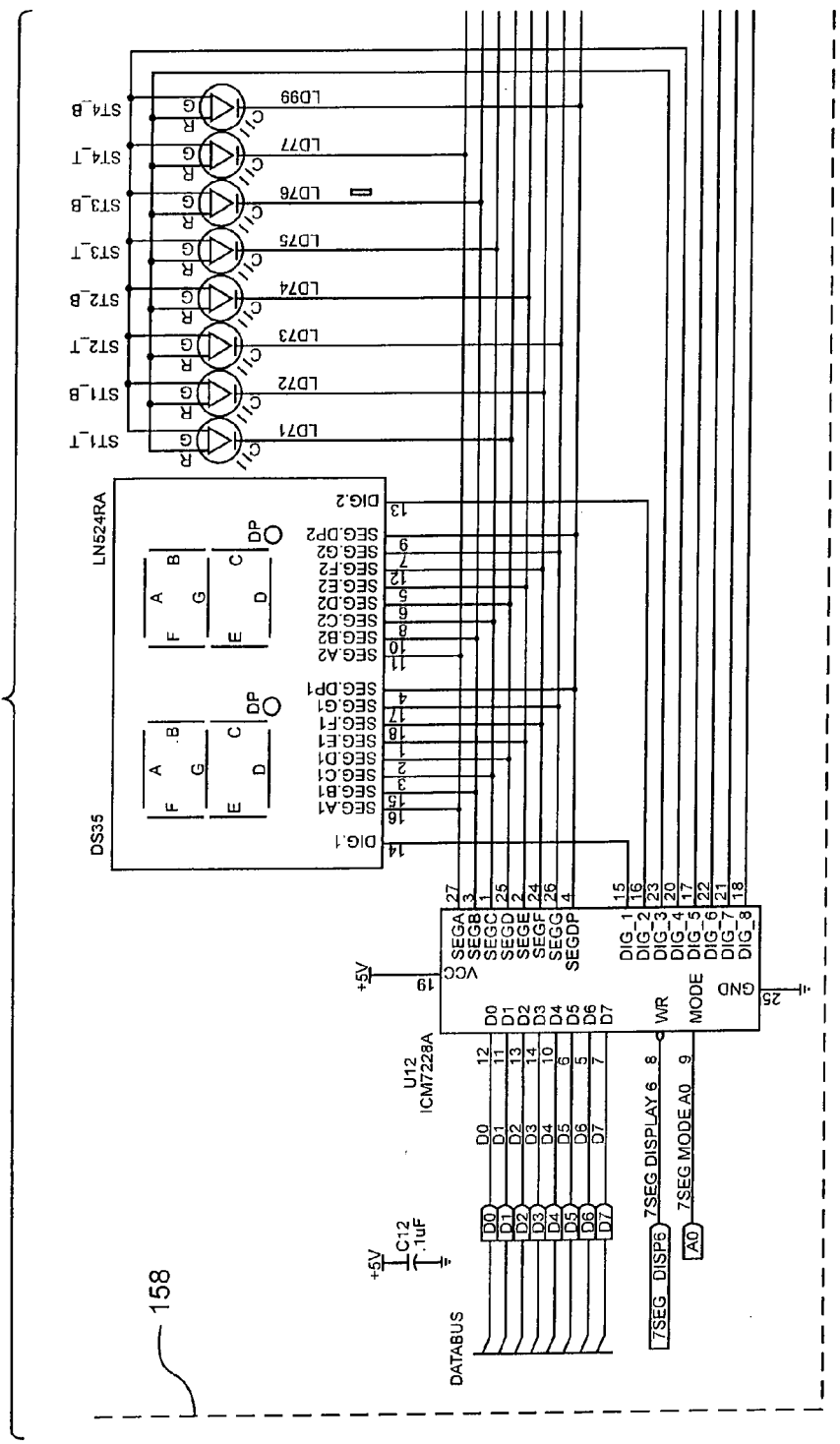
FIG. 15K3 CENTRAL DISPLAY BOARD

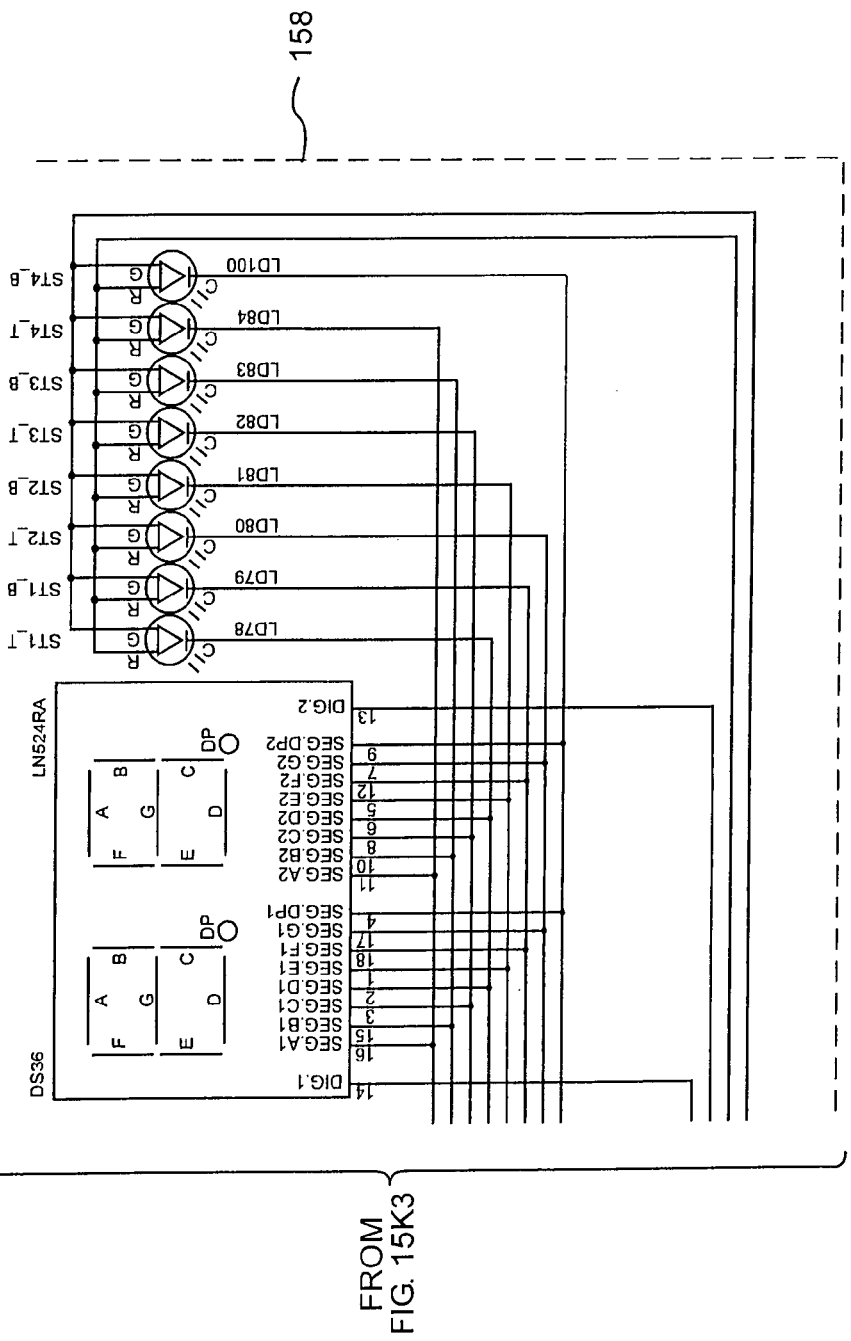
FIG. 15K4 CENTRAL DISPLAY BOARD

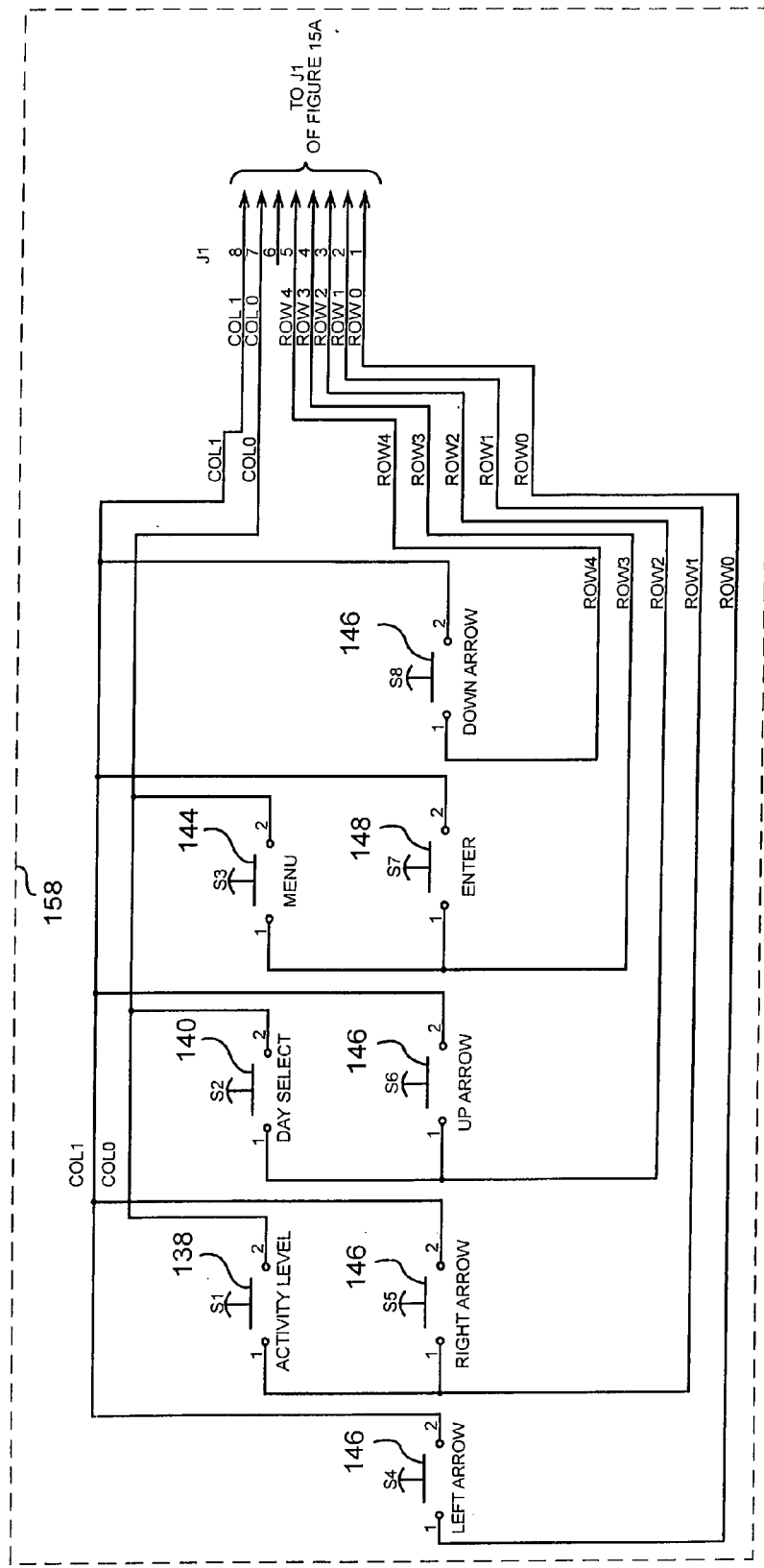
FIG. 15L CENTRAL DISPLAY BOARD

METHOD AND APPARATUS FOR MONITORING THE STATUS AND TRANSFER OF FOOD PRODUCTS

CROSS-REFERENCE TO RELATED APPLICATION

This application claims the benefit of U.S. Provisional Application No. 60/160,878, filed Oct. 22, 1999, which is incorporated herein by reference.

BACKGROUND OF THE INVENTION

1. Field of the Invention

This invention relates generally to systems which monitor a status of a product, such as prepared food, and more specifically relates to automated product status systems which communicate the status of multiple food products to food preparers, and enable the transfer of food products within the system.

2. Description of the Prior Art

The control of product freshness and quality has always been a major concern with industries, such as restaurants, dealing with the sale of perishable goods, such as prepared foods. Numerous inventory control systems exist which track parameters such as the origin, quantity used, quantity stored and the age of products. However, an automated system, which monitors the shelf life of perishable goods, has not yet been placed into practice. In addition, many of the systems and methods for monitoring product status currently in use cannot ensure that the oldest product is used first or that available product is optimally used to minimize waste. Therefore, it would be advantageous if such a system or method could accurately and efficiently track the status of perishable goods while providing a means for reducing the amount of waste.

In the restaurant industry, at least two durations of time become important variables to monitor. One is a hold time, which is the shelf life of prepared food or the duration of time during which a particular product meets a set of standards imposed by the food provider. The second variable is a cook time, which is the duration of time required to cook and/or prepare additional product. The cook time must be accounted for if product is to be continually available. In conventional product status systems, employees or workers engaged in the preparation of food typically monitor the hold and cook times, and are required to set, monitor and reset a different timer for each of the large number of food products being sold. Such a situation results in a tremendous inefficiency in the use of manpower and a reduction in productivity. In addition, the potential for human error can lead to an unacceptable or dangerous product being sold to the consumer. Therefore, it would be advantageous if the hold time, cook time and other variables relevant to the preparation and sale of the food product could be automatically monitored and provided to the worker in summary format without undue human intervention.

In most restaurants, the status of products and the need for additional products is communicated by shouting requests or commands across the kitchen or other food preparation area. This results in additional noise, confusion and often misinformation, which ultimately affects the quality of the food being provided to the consumer as well as the environment, provided for the consumers enjoyment within the restaurant. Therefore, a system and method that could effectively communicate the status of each of many products being offered for sale to all workers without the need for individual communication between workers would be advantageous.

Conventional methods of tracking product status do not provide an efficient means for collecting and processing information concerning loss or waste of perishable goods once they have been prepared for sale; the rate of sale for each product during different periods of the day and promotional events; and worker productivity. Therefore, it would be advantageous if a product status system could provide information on such variables for use in management databases and as a planning tool.

Many of the product status systems in the prior art, such as those using individual timers monitored by workers for each of a number of different products being sold, require that additional timers be used, and that the workers become familiar with additional hold and cook times when new and/or different products are sold. Therefore, it would be advantageous if a product status system was flexible and readily upgradeable to adapt to different types and quantities of food products without burdening the workers and decreasing productivity.

OBJECTS AND SUMMARY OF THE INVENTION

It is an object of the present invention to provide a product status system and a method for indicating the stock status of food products, which communicate the status of food products to all workers rather than requiring individual communication between workers.

It is another object of the present invention to provide a product status system and a method for indicating the stock status of food products, which monitor shelf life and displays stock status corresponding to a pan of food product in digital format to reduce errors.

It is yet another object of the present invention to provide a product status system and a method for monitoring the status of food products, which enable complete or partial transfers of a food product throughout the system to ensure availability of the food product according to demand from different locations in the system.

It is a further object of the present invention to provide a product status system and a method for monitoring the status of food products, which do not permit cross transfers between pans of food products located in non-coIresponding locations unless specifically programmed to do so.

It is an object of the present invention to provide a product status system and a method for monitoring the status of food products, which enable station worker interface boards to be substantially identical regardless of whether they are mounted on the front or rear of the station.

It is another object of the present invention to provide a product status system and a method for programming and displaying the amount of food products to be prepared that can be manually adjusted or automated according to the time, the day, promotional events, the anticipated rate of sale, and the like.

It is yet another object of the present invention to provide a product status system and a method for monitoring the status of food products that facilitates the use of the oldest food product first, thereby decreasing the waste of perishable goods.

It is a further object of the present invention to provide a product status system, which is flexible and readily upgradeable and/or programmable to meet the requirements imposed by different types and quantities of food products offered for sale.

It is an object of the present invention to provide a product status system and a method for monitoring the status of food products, which eliminate the need for workers to monitor individual variables for a variety of food products being sold, such as a shelf life, a stock status and a quantity of food product to cook, which improves overall operational efficiency, decreases waste associated with a perishable food product, decreases the manpower required to prepare the food product for sale and increases the efficiency of individual workers.

In accordance with the present invention, a product status system is provided which monitors the status and storage location of a prepared food product including a processing circuit, a food product status switch, a food product status indicator, and a storage timer. The food product status indicator displays the status of the food product in a particular storage location. The storage timer counts the duration of time the food product has been stored at the storage location. The status indicates whether or not the prepared food product is available in the storage location, whether the storage time of the food product has exceeded an acceptable food product hold time, and when additional food product should be cooked in order to be ready before the storage time of existing food product exceeds the hold time.

The product status system can include a plurality of storage locations, such as a source storage location and a destination storage location, between which the food product is transferred along with the storage time associated therewith. In this case, the storage time from the source storage location is transferred to a destination storage timer associated with the destination storage location, and the destination storage timer counts the duration of time the food product has been stored at both the source and destination storage locations. The status can also indicate which of two or more source storage locations contains the food product, which has been stored for the greatest length of time to facilitate use of the oldest product first. In addition, the status can indicate which of two or more destination storage locations to transfer a given food product into.

The product status system can include a display which displays the status, a pan fill level, an activity level and a day part associated with the prepared food product. Each of the food products can have a different pan fill level associated therewith, which represents a quantity of food product to prepare when the associated storage location becomes empty. The activity level represents an overall rate of sale for all of the food products in a restaurant, and can affect the pan fill level for any or all of the food products.

In further accordance with the present invention, a method for monitoring the status and storage location of a prepared food product is provided, which includes the steps of supplying the prepared food product to the storage location, changing the state of the food product status indicator, initiating a storage timer to count the storage time for the food product in the storage location, comparing the storage time with the acceptable food product hold time, changing the state of the food product status indicator if the storage time exceeds the hold time and changing the state of the food product status indicator when the storage location no longer contains the food product.

The storage time can be transferred with the food product if there are two or more storage locations, such as the source storage location and the destination storage location. In this case, the state of the food product status indicator is changed to indicate when the duration of time the food product has been stored at both the source and destination storage location exceeds the hold time. The state of the food product status indicator can also be changed to indicate which of two or more storage locations contains food product which has been stored longer, and which of two or more storage locations a given food product undergoing a transfer can be transferred into.

These and other objects, features, and advantages of the present invention will be apparent from the following detailed description of illustrative embodiments thereof, which is to be read in connection with the accompanying drawings.

BRIEF DESCRIPTION OF THE DRAWINGS

FIG. 4 is an enlarged view of the display shown in FIG. 3.

FIG. 5A shows a product label, product status switches, and product status indicators, which are located on the stations formed in accordance with the present invention.

FIG. 5B shows an active switch, an active indicator, a transfer switch, and a transfer indicator, which are located on the stations formed in accordance with the present invention.

FIG. 11 is a schematic diagram of a station/worker interface board (SWIB) of the product status and transfer system formed in accordance with the present invention.

FIG. 13 is a schematic diagram of a station interface board (SIB) of the product status and transfer system formed in accordance with the present invention.

FIGS. 14A and 14B are schematic diagrams of a station control board (SCB) of the product status and transfer system formed in accordance with the present invention.

FIGS. 15A–15L are schematic diagrams of a display board (CDB) of the product status and transfer system formed in accordance with the present invention.

DETAILED DESCRIPTION OF THE PREFERRED EMBODIMENTS

Top Level Description of Product Status and Transfer System

Figure 1:
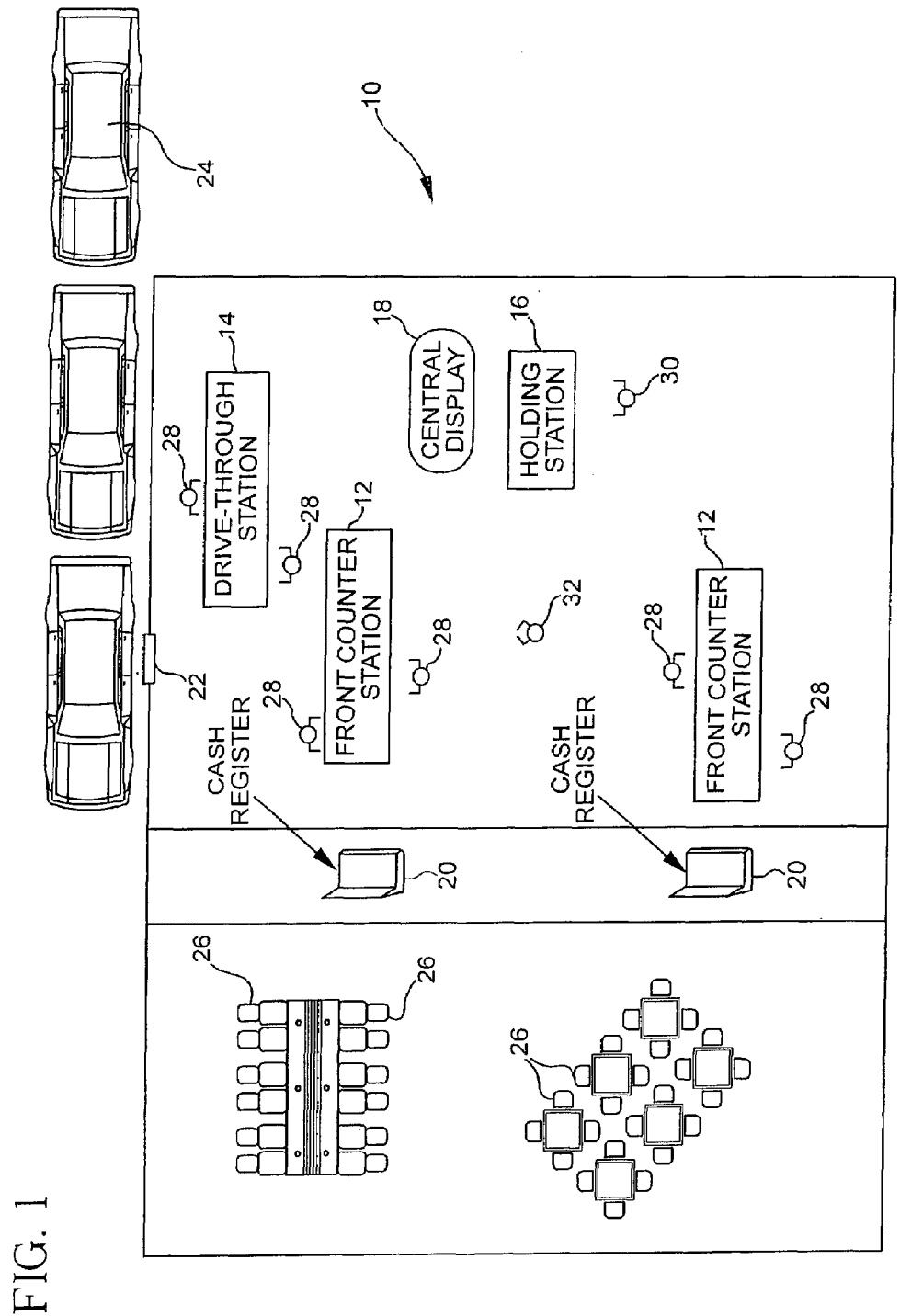
FIG. 1 is a block diagram of a product status and transfer system formed in accordance with the present invention and applied to a restaurant.

FIG. 1 shows a top-level block diagram of a product status and transfer system 10 formed in accordance with the present invention and applied to a restaurant serving prepared food. The product status and transfer system (PSTS) 10 preferably includes one or more front counter stations 12, one or more drive-through stations 14, a holding station 16, and a display 18. The display 18 may be centrally located. The front counter station 12 is preferably located near a serving counter and a corresponding cash register 20. The drive-through station 14 is preferably located near a window 22 through which workers service drive-up customers in their cars 24. The holding station 16 and the display 18 are preferably located in a centralized location, which is readily accessible to the front counter stations 12 and the drive-through station 14. Seating 26 may also be provided within the restaurant.

The drive-through station 14 and the front counter stations 12 preferably each enable two sandwich makers 28 standing on opposing sides of the stations 12, 14 to remove cooked product from the stations 12, 14 and to prepare the cooked product for sale to a consumer. The holding station 16 preferably enables at least one expeditor 30 to cook the food product and place the cooked product into the holding station 16. A store manager 32 is preferably responsible for managing the operation of the restaurant. The sandwich makers 28 and the expeditor 30 are collectively referred to as workers 28 or workers 30 according to the station they are working at.

Figure 2:
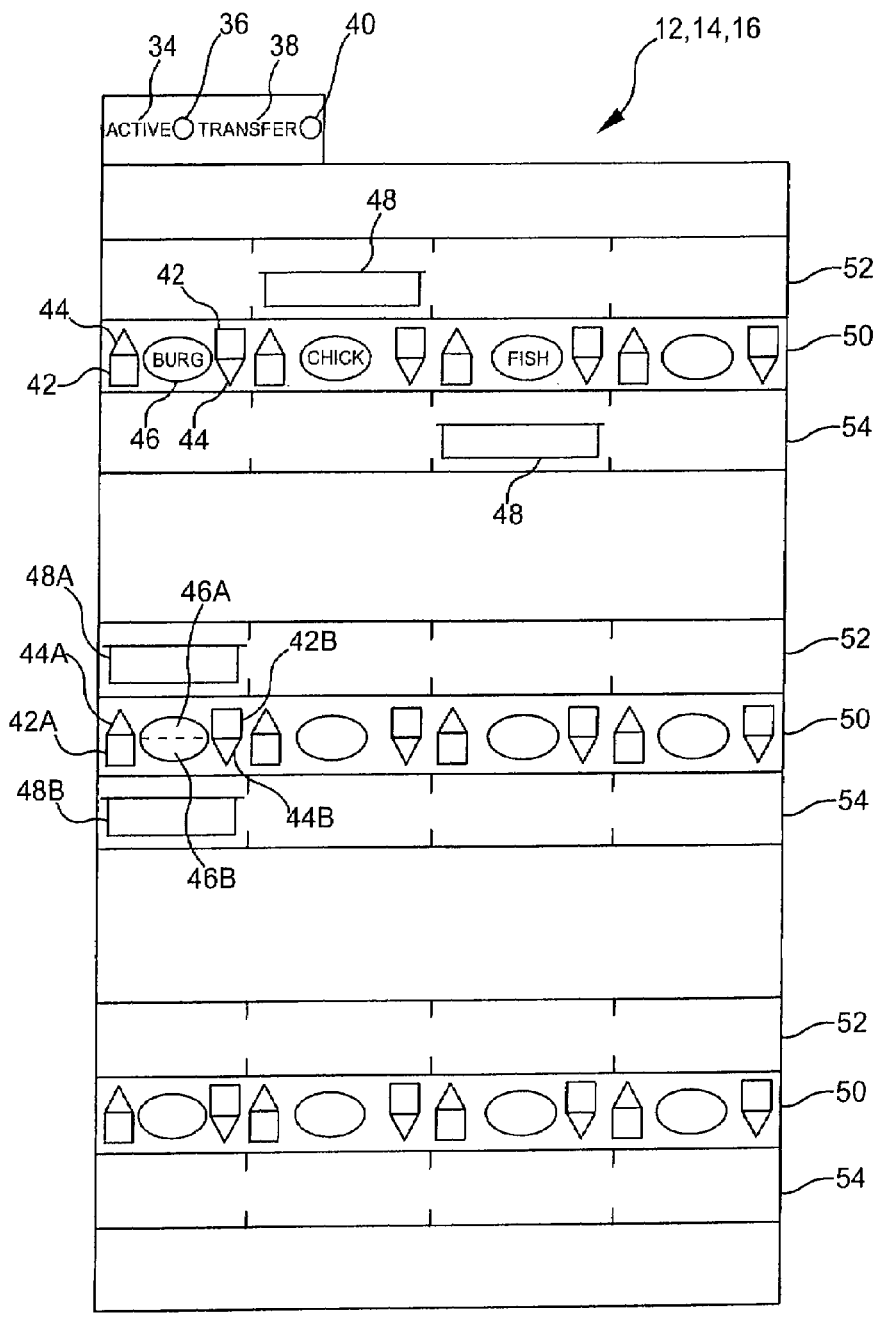
FIG. 2 is a front view of a workstation, such as a drive-through station, a front counter station, or a holding station of the product status and transfer system formed in accordance with the present invention.

FIG. 2 shows a pictorial representation of a front view of the front counter station 12, drive-through station 14 and holding station 16, which are collectively referred to as the station 12, 14, 16. The station 12, 14, 16 preferably includes at least one active switch 34, at least one active indicator 36, at least one transfer switch 38, at least one transfer indicator 40, product status switches 42, product status indicators 44 and product labels 46. The holding station 16 is substantially the same as the front counter station 12 and the drive-through station 14, except that the holding station 16 is preferably designed for use by one worker 30. Thus, since the product located in the holding station 30 is intended to be accessed by only one worker 30, preferably only one active switch 34, one active indicator 36, one transfer switch 38 and one transfer indicator 40 exist on the holding station 16. In contrast, two of each of these switches and indicators exist on each of the front counter station 12 and the drive-through stations 14.

The stations 12, 14, 16 can preferably each accommodate up to 24 different pans 48 of food product as shown in FIG. 2. Each product status switch 42 and product status indicator 44 corresponds to a particular pan 48 of product. The stations 12, 14, 16 preferably include three rows 50 of product status switches 42, product status indicators 44 and product labels 46. Each row 50 corresponds to an upper row of pans 52 and a lower row of pans 54. The upper row of pans 52 is preferably used by the worker 28 on one side of the station 12, 14, while the lower row of pans 54 is preferably used by the worker 28 on the opposing side of the station 12, 14. Thus, the upper row of pans 52 holds what is preferably considered to be primary pans by the worker on one side of the station 12, 14, while the lower row of pans 54 holds what is preferably considered to be secondary pans by the worker 28 on the opposing side of the station 12, 14. Conversely, the lower row of pans 54 holds what is considered to be primary pans by the worker 28 on one side of the station 12, 14, while the upper row of pans 52 holds what is considered to be secondary pans by the worker 28 on the opposing side of the station 12, 14. The primary pan corresponding to a particular side of the station 12, 14 is preferably used exclusively by the worker 28 located on that side of the station 12, 14. However, should the primary pan be empty, the worker 28 can use the product located in what is considered to be the secondary pan (which is considered the primary pan for the worker 28 on the opposing side of the station 12, 14).

The use of upper and lower rows of pans 52, 54 effectively enables two workers 28 to work at the station 12, 14 simultaneously without interfering with each other. Since as already described, there is preferably only one worker 30 at the holding station 16, that worker 30 preferably has equal access to both upper and lower rows of pans 52, 54. The food products are preferably located within pans 48 at the stations 12, 14, 16 which are ergonomically advantageous according to a rate of sale for that product. In other words, those products that are sold most often are preferably placed in the location most easily accessed by the worker at the station 12, 14, 16. Also, the same product is preferably placed in substantially the same location in each of the stations 12, 14, 16.

The product label 46 preferably indicates the identity of the food product or the selectable menu, which is located in the pan 48 immediately above and immediately below the product label 46. It is important to note that the product label 46, the food product status switch 42, and the food product status indicator 44 are preferably located in alignment with the corresponding food product pan 48. Alternatively, the identity of the food product or selectable menu associated with the pan 48 may be electronically displayed and changed in response to a selectable menu switch. The products immediately above and below the product label 46 are preferably the same since this allows two workers 28 to access the same product at the same station simultaneously, as well as the concept of primary and secondary pans described above.

The product status indicators 44 are preferably shaped in the form of an arrow. The product status switch 42 and the product status indicator 44 modify and indicate, respectively, the status of the products located in the pan pointed to by the corresponding product status indicator 44. For instance, as shown in FIG. 2, the product label 46, the product status indicator 44A and the product status switch 42A correspond to an upper pan 48A. Likewise, the product label 46, the product status indicator 44B and the product status switch 42B correspond to a lower pan 48B. If the products in corresponding upper and lower pans are different, the product label 46 can be divided into an upper portion indicating the identity of the product in the upper pan 48A, and a lower portion indicating the identity of the product in the lower pan 48B.

The active switch 34 and the active indicator 36 can modify and display the activity of the station 12, 14, 16. The transfer switch 38 and the transfer indicator 40 are used to initiate and indicate a transfer of the food product between locations in the same or different stations 12, 14, 16.

Figure 3:
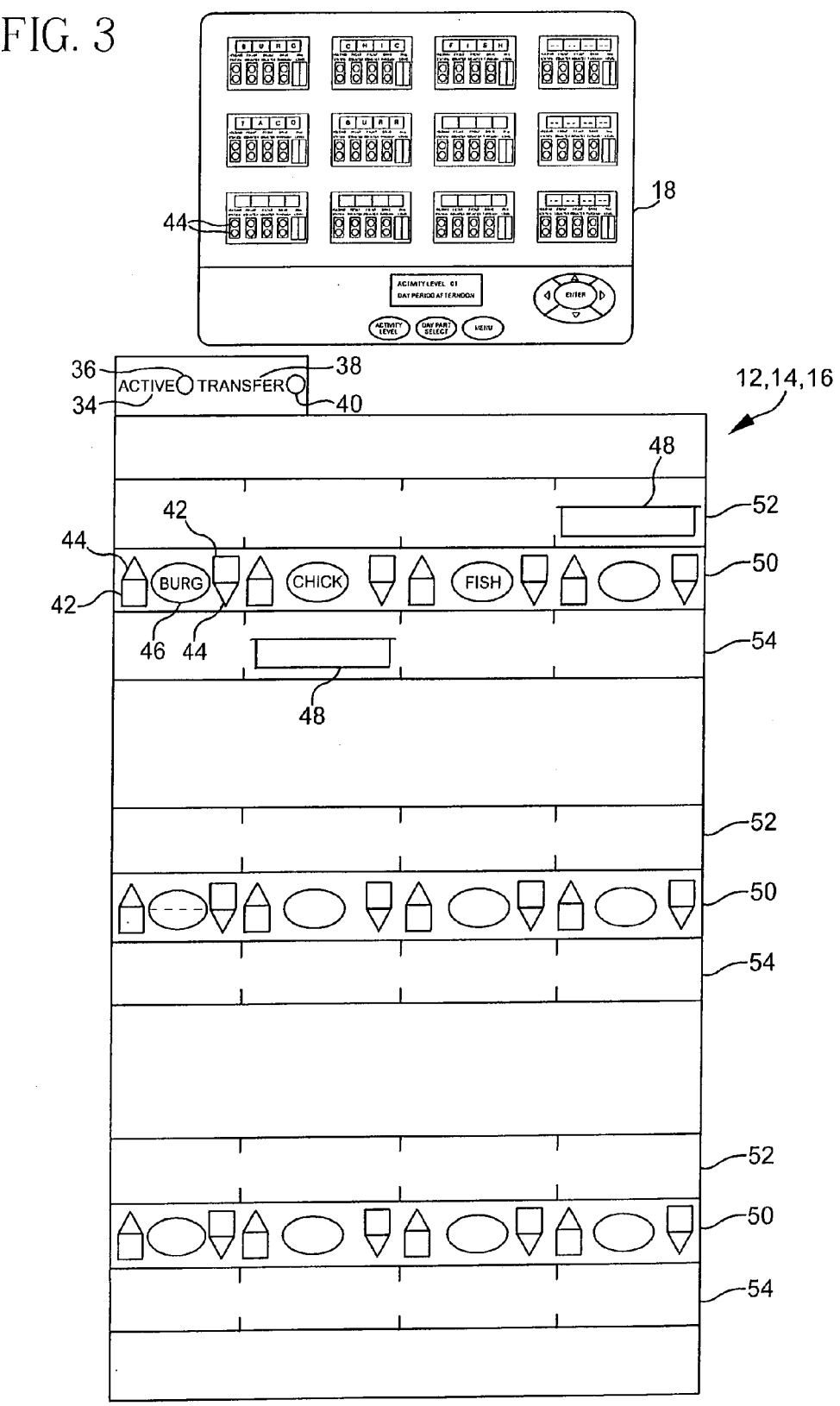
FIG. 3 is a front view of a display and the holding station of the product status and transfer system formed in accordance with the present invention.

FIG. 3 shows the holding station 16, which is equivalent to the drive-through station 14 and the front counter station 12, except that one worker 30 preferably operates the holding station 16, and both the upper and lower rows of product pans 52, 54 are accessed by that worker 30. In addition, the display 18 is preferably located in a position which is viewable by the worker 30 operating the holding station 16, such as above the holding station 16 as shown in FIG. 3.

Top Level Summary of Operation

At the beginning of a day in the restaurant, the worker 30 situated in front of the holding station 16 cooks a predetermined quantity or pan fill level of each product as indicated on the display 18, and stores the cooked product in the appropriate pan 48 in the holding station 16. Each product has a corresponding hold time, which represents a shelf life of the cooked product or a duration of time during which the product has an acceptable quality and can be served to consumers. The worker 30 then presses the product status switch 42 on the holding station 16 corresponding to the pan 48 just filled indicating the presence of cooked product, and triggering a timer corresponding to the location just filled to initiate a count of the storage time for the corresponding food product. The cooked product is then transferred from the holding station 16 to the front station 12 and the drive-through station 14 along with the storage time corresponding to the product being transferred.

As product is prepared and sold to consumers, the cooked food products at the stations 12, 14 are depleted. When the last unit of a particular product has been removed from one of the stations 12, 14, the worker 28 presses the product status switch 42 corresponding to the depleted product, which indicates that there is an absence of the depleted product in a particular location in the station 12, 14 via a corresponding product status indicator 44 on the display 18. The worker 30 at the holding station 16 observes the product status indicator 44 corresponding to the depleted product, and either cooks fresh product or transfers existing cooked product from the holding station 16 to the station 12, 14 requiring the cooked product.

If one of the cooked food products is retained in one of the stations 12, 14, 16 for a time which exceeds the hold time for that particular product, the corresponding product status indicator 44 will indicate that the product should be discarded rather than being sold to the consumer. The product status indicator 44 will also warn the workers 28, 30 that the hold time is about to expire by turning yellow to indicate that additional product must be cooked in order to have cooked product before the existing product expires. A cook time represents a duration of time required to cook the corresponding product. The product status indicator 44 preferably turns yellow when the storage time for the product equals the hold time minus the cook time. Thus, enough time is provided to cook additional product prior to the expiration of existing cooked product. The product status indicators turn green to indicate that unexpired food product is available at a particular location in a station 12, 14, 16, and turn red to indicate the absence of the food product at a particular location in the station 12, 14, 16.

Detailed Description of Common Functions and Components

Active/Inactive Station

As already described, each of the stations 12, 14, 16 includes at least one active switch 34 and at least one active indicator 36. Additional active switches and indicators may be included to indicate activity of the upper and lower pans of the station 12, 14, as shown in FIG. 5B. The front counter station 12 and the drive-through station 14 each have two active switches 34 and two active indicators 36. One active switch 34 and one active indicator 36, as shown in FIG. 5B, correspond to each side of the station 12, 14. Initially upon power-up, all stations 12, 14, 16 are placed in an active mode in which each of the active indicators 36 is illuminated. Thereafter, the workers 28, 30 may select any of the active switches 34 which function to place the station 16 or side of the station 12, 14 corresponding to the active switch 34 in an inactive mode. The active indicator 36 is not illuminated in the inactive mode.

When the station 12, 14, 16 is in the active mode, each of the product status indicators 44 are illuminated and indicate the status of the corresponding product. When the station 12, 14, 16 is in the inactive mode, each of the product status indicators 44 on the corresponding station 16 or side of the station 12, 14, as well as the product status indicator 44 corresponding to the inactive station 12, 14, 16 located on the display 18 are turned off. Activating any one of the active switches 34 causes the corresponding station 16 or side of the station 12, 14 to toggle between the active mode and the inactive mode.

Figure 6:
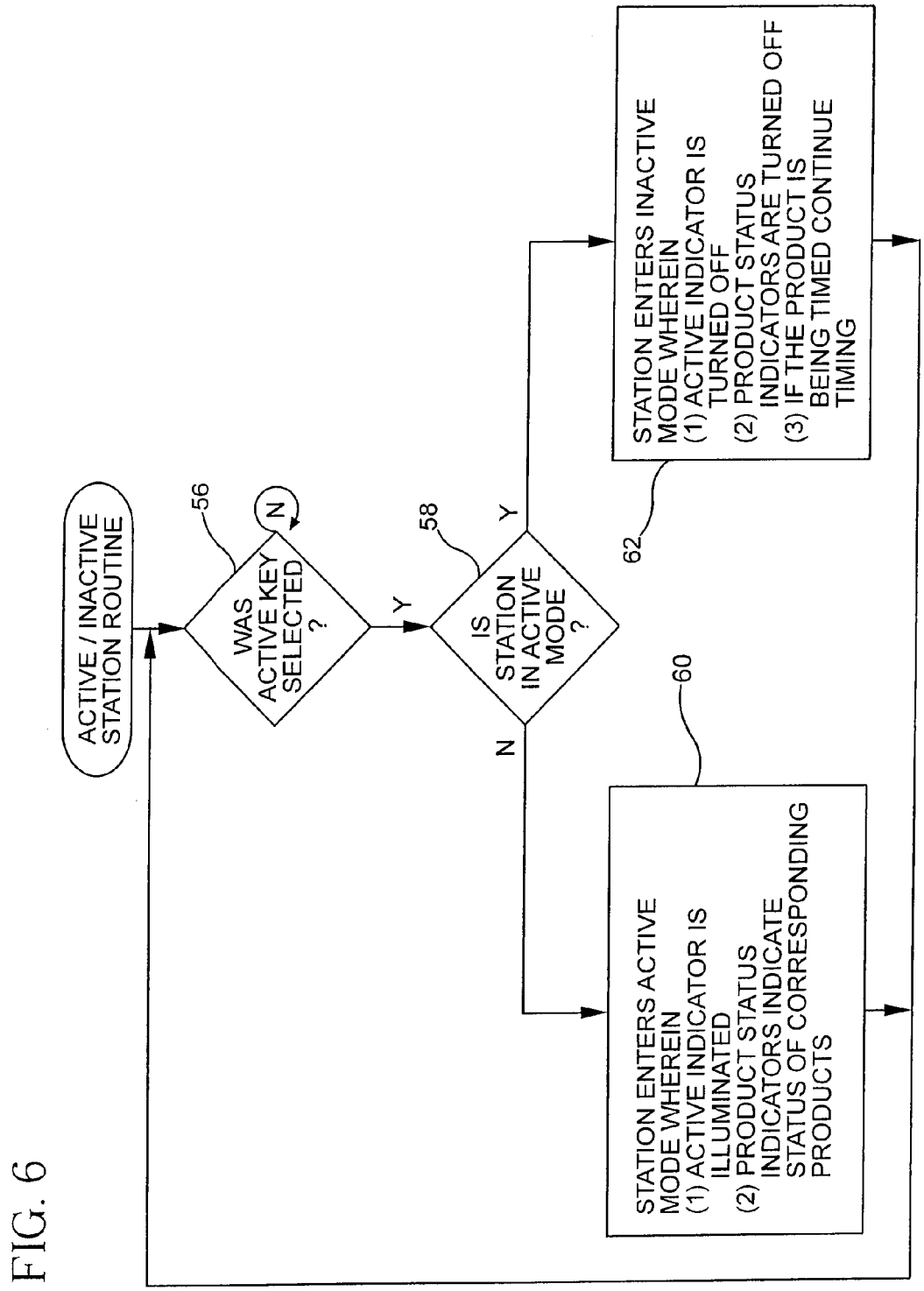
FIG. 6 is a flowchart of an active/inactive station routine used in a method formed in accordance with the present invention.

FIG. 6 is a flowchart showing the operation of the stations 12, 14, 16 during an active/inactive station routine. The station idles in step 56 until the active switch is depressed or selected, and then determines whether the station is currently in the active mode in step 58. If the station is not in the active mode, the station enters the active mode in step 60 wherein the active indicator on the inactive station is illuminated and the product status indicators on the active station indicate the status of the corresponding products. However, if the station is in the active mode in step 58, the station enters the inactive mode in step 62 wherein the corresponding active indicator and the product status indicators on the inactive station are turned off. However, timing for any products being timed prior to entry into the inactive mode continues during the inactive mode. Following steps 60 and 62, the routine again idles in step 56 waiting for the next selection of the active switch. It is to be noted that the product status indicators on the display reflect the same status as the corresponding product status indicators on the stations. Therefore, if the station is in the inactive mode, the product status indicators on the display corresponding to the inactive station are off.

Product Timers

The product status and transfer system 10 includes at least one timer for each of the preferably 12 different products in the preferably 24 different product locations in each of the stations 12, 14, 16. When fresh product is placed in a particular pan 48 in the station 12, 14, 16, the corresponding product status switch 42 is selected by the worker 28, 30 until the corresponding product status indicator 44 turns green, which triggers the timer to begin counting the storage time. The green product status indicator 44 indicates that the pan 48 contains unexpired product. Preferably, the storage time is counted by loading the hold time into the timer when fresh product is first placed into a particular pan 48, and continuing to count down the hold time until the corresponding food product has been depleted, or the timer reaches zero indicating that the storage time has reached the hold time.

The cook time corresponding to any given product is that duration of time necessary to cook the particular product. If the value remaining on the timer is less than or equal to the cook time, then the corresponding product status indicators 44 turn yellow indicating to the worker 30 at the holding station 16 that additional product should be cooked since the product corresponding to the yellow light is about to expire. When the timer has counted down to zero, the corresponding product status indicator 44 flashes slow red indicating that the product remaining in the corresponding pan has expired and should be discarded rather than being served to the consumer.

Product Status

As already described above, each of the 24 locations in each of the stations 12, 14, 16 has a corresponding product label 46, product status switch 42 and product status indicator 44 as shown in FIGS. 2, 3 and 5A. Each of the product status indicators 44 on each of the stations 12, 14, 16 has a corresponding product status indicator 44 on the display 18, which displays substantially the same status displayed to the workers 28, 30 at the stations 12, 14, 16. Table 1 provides a summary of the status and action to be taken for each of the colors and flashing speeds provided by the product status indicators 44.

TABLE 1

| COLOR | FLASH-ING SPEED | ACTIVE/INACTIVE SIDE/STATION | STATUS OF PRODUCT | ACTION TO BE TAKEN |
|---|---|---|---|---|
| Green | static | active | unexpired, existing | serve product |
| Red | static | active | no product | replenish product |
| Yellow | static | active | product is within cook time of expiring | begin cooking more product |
| Red | slow | active | expired | discard product |
| Red | fast | active | product can be transferred into location during a pending transfer | transfer product into location |
| Green | slow | active | oldest product available to transfer out of location | transfer this product first |
| Off | static | inactive | none | none or place station in active mode |

Product Transfer

Each of the stations 12, 14, 16 preferably includes at least one transfer switch 38 and transfer indicator 40, as shown in FIGS. 2, 3 and 5B. The front counter station 12 and drive-through station 14 both have two transfer switches 38 and two transfer indicators 40. One transfer switch 38 and one transfer indicator 40 correspond to each side of the station 12,14. The holding station 16 has one transfer switch 38 and one transfer indicator 40 since preferably only one side is accessed.

Figure 7A:
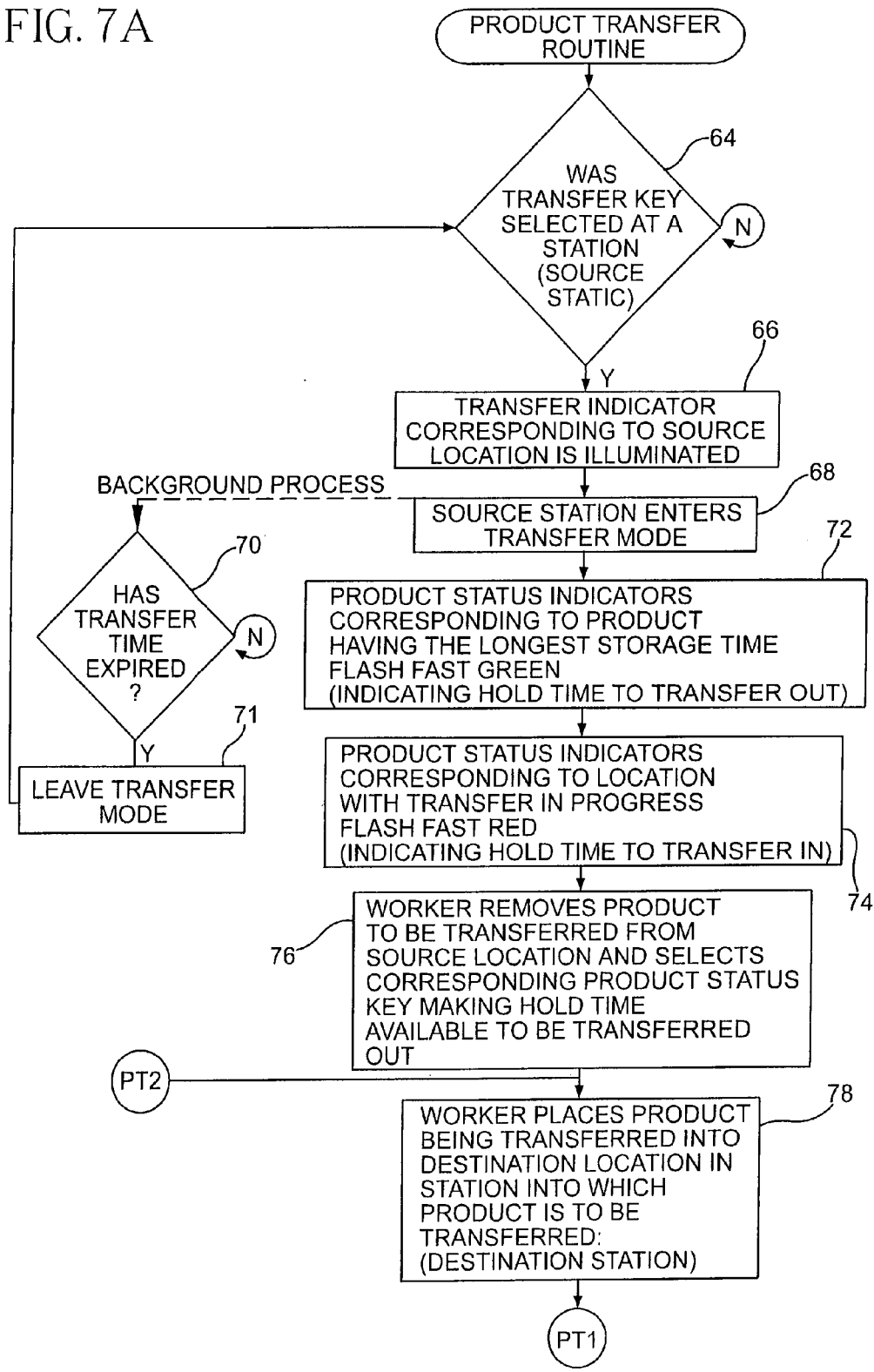
FIGS. 7A & 7B are flowcharts of a product transfer routine used in the method formed in accordance with the present invention.
Figure 7B:
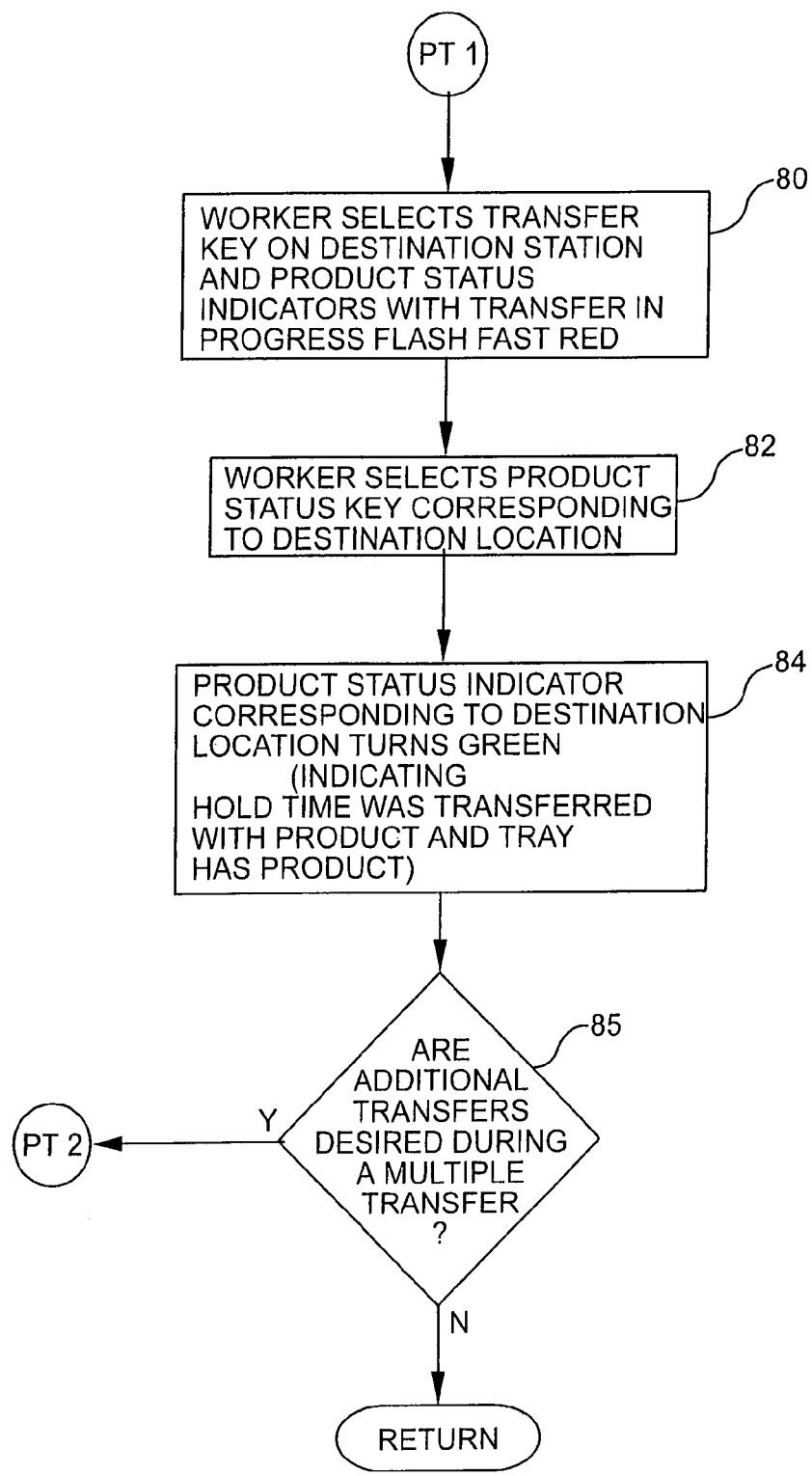

FIGS. 7A and 7B are flowcharts of the operation of a product transfer routine. The station idles in step 64 until the transfer switch is selected. Once the transfer switch is selected, the routine continues to step 66 in which the transfer indicator on the corresponding station or side of the station, which is now considered to be a source station or location, is illuminated. The source station enters a transfer mode in step 68, and the routine performs a background process in step 70, which determines whether a predetermined transfer time has expired. If the transfer time has expired, the system exits the transfer mode in step 71, and the routine proceeds back to step 64. If the transfer time has not expired, the background process in step 70 continues to idle.

After pressing the transfer switch on the source station, the product status indicator corresponding to the product which has been stored the longest flashes fast green, which indicates to the worker which product is the oldest and facilitates the use of the oldest product first. The product status indicators corresponding to locations holding products having a transfer in progress flash fast red indicating that the hold time may be transferred into these locations in step 74. The worker removes the product to be transferred from a source location in the source station, which is preferably the product corresponding to the product status indicator which is flashing fast green, and presses the corresponding product status switch which makes the corresponding storage time available to be transferred out in step 76. The worker then places the product being transferred into a destination location in a destination station in step 78. The destination station can be the same station as the source station. The destination location can also be the same location in the same station as the source location. The products are preferably transferred while in the pans 48. However, a portion of the food product in the pan may be transferred to more than one destination location. The destination location may be the same as the source location.

The flowchart continues on FIG. 7B in which the worker presses the transfer switch on the destination station and fills the destination location with the product being transferred in step 80. The empty pans in the destination station corresponding to product with a transfer in progress will flash fast red indicating an empty pan with a potential for accepting the product being transferred. The worker presses the product status switch in step 82 corresponding to the destination location filled in step 78, and the corresponding product status indicator turns green in step 84 indicating that the hold time, which was transferred out of the source station, has now been transferred into the destination location along with the product that was transferred. If only a portion of the product transferred out of the source location was transferred into the destination during a so-called "multiple transfer", the remaining product can be transferred to additional destination locations including back to the source location in step 85. If additional transfers are desired, the routine returns to repeat steps 78, 80, 82 and 84 until no additional transfers are desired and the routine returns. This completes the product transfer routine until the transfer switch is again selected.

Figure 8A:
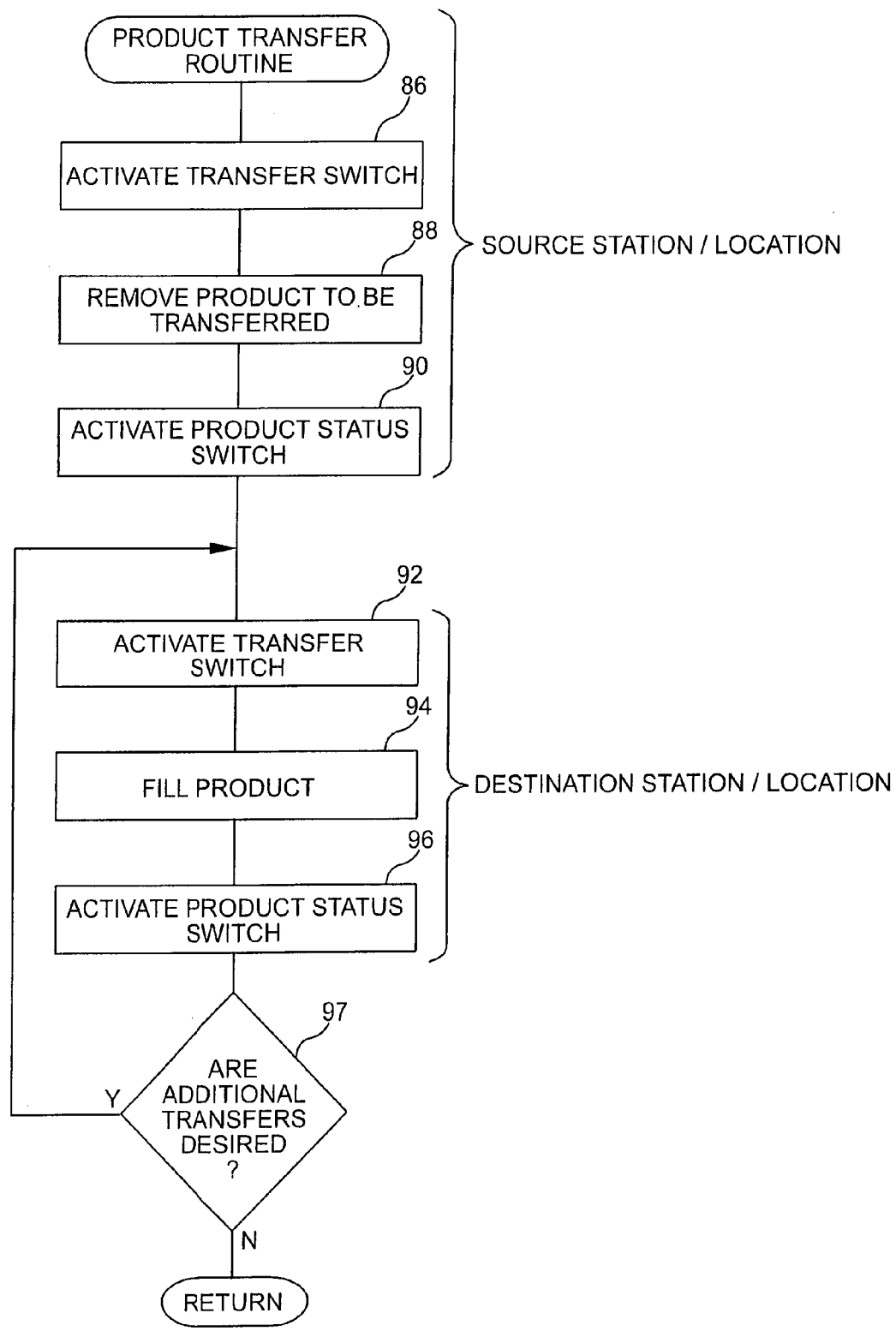
FIG. 8A is a flowchart summarizing the product transfer routine shown in FIGS. 7A and 7B.

The product transfer routine is essentially a very straightforward and simple process, which can readily be performed by workers having almost any level of skill. FIG. 8A shows a summarized form of the product transfer routine taken from the viewpoint of the worker. If the worker wishes to transfer product from one location to another, the worker selects or presses the transfer switch corresponding to the source station in step 86 and removes the product to be transferred in step 88. The worker then presses the product status switch corresponding to the source location in step 90. The worker transfers the product to the destination location and selects the transfer switch corresponding to the destination location in step 92. The worker selects the product status switch corresponding to the destination location in step 96. If some of the product transferred from the source location has not been transferred to the destination location, additional transfers can be made in step 97 via the reiteration of steps 92, 94 and 96 until additional transfers are no longer desired, at which point the routine returns. It is to be understood that the product transfer routine transfers not only product from one station to another, but also transfers the elapsed storage time corresponding to the product being transferred. This ensures the accurate maintenance of the storage time for each product regardless of the transfer of products within the system.

Figure 8B:
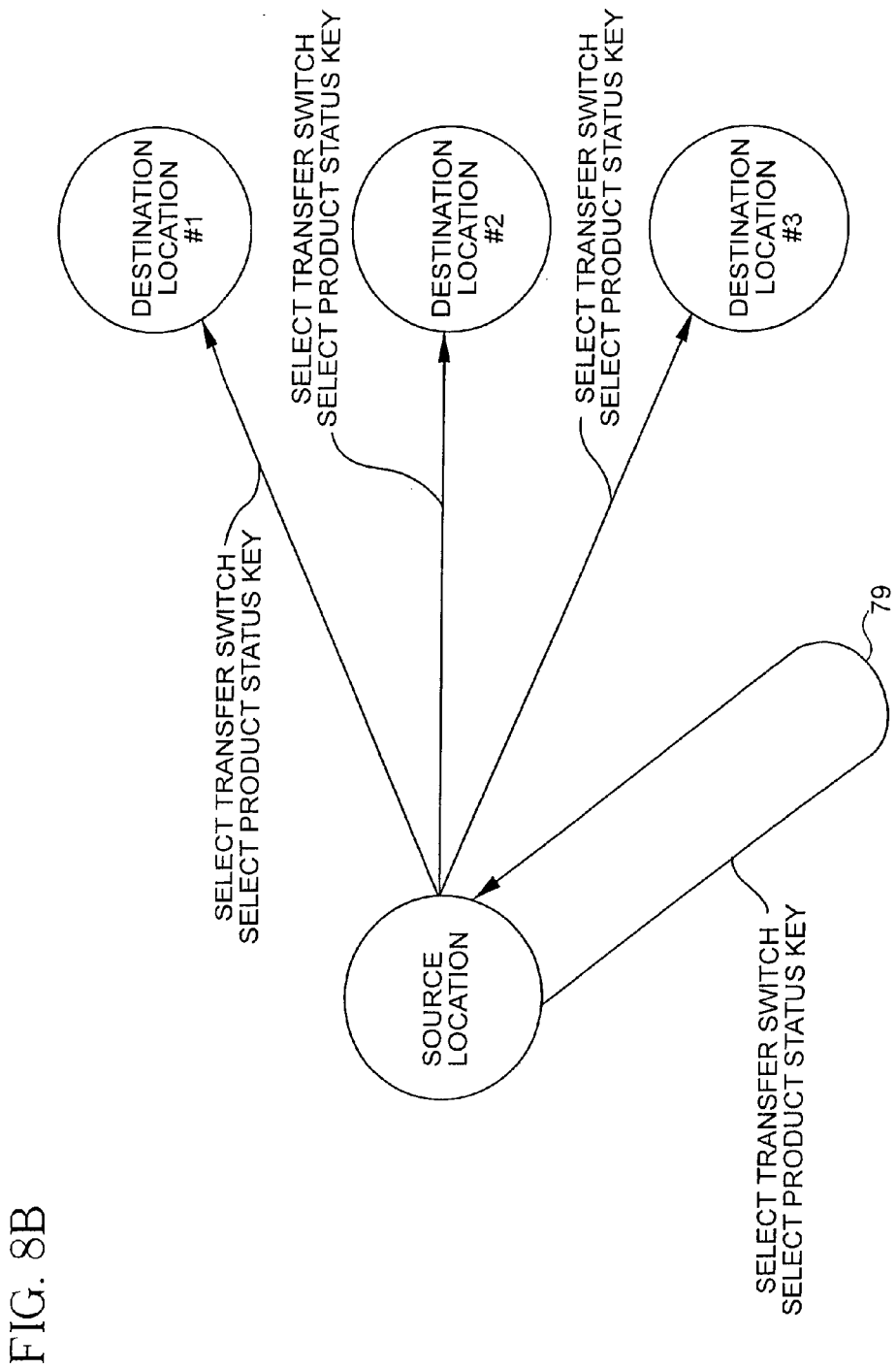
FIG. 8B is a block diagram showing the operation of a multiple transfer used in the method formed in accordance with the present invention.
Figure 8C:
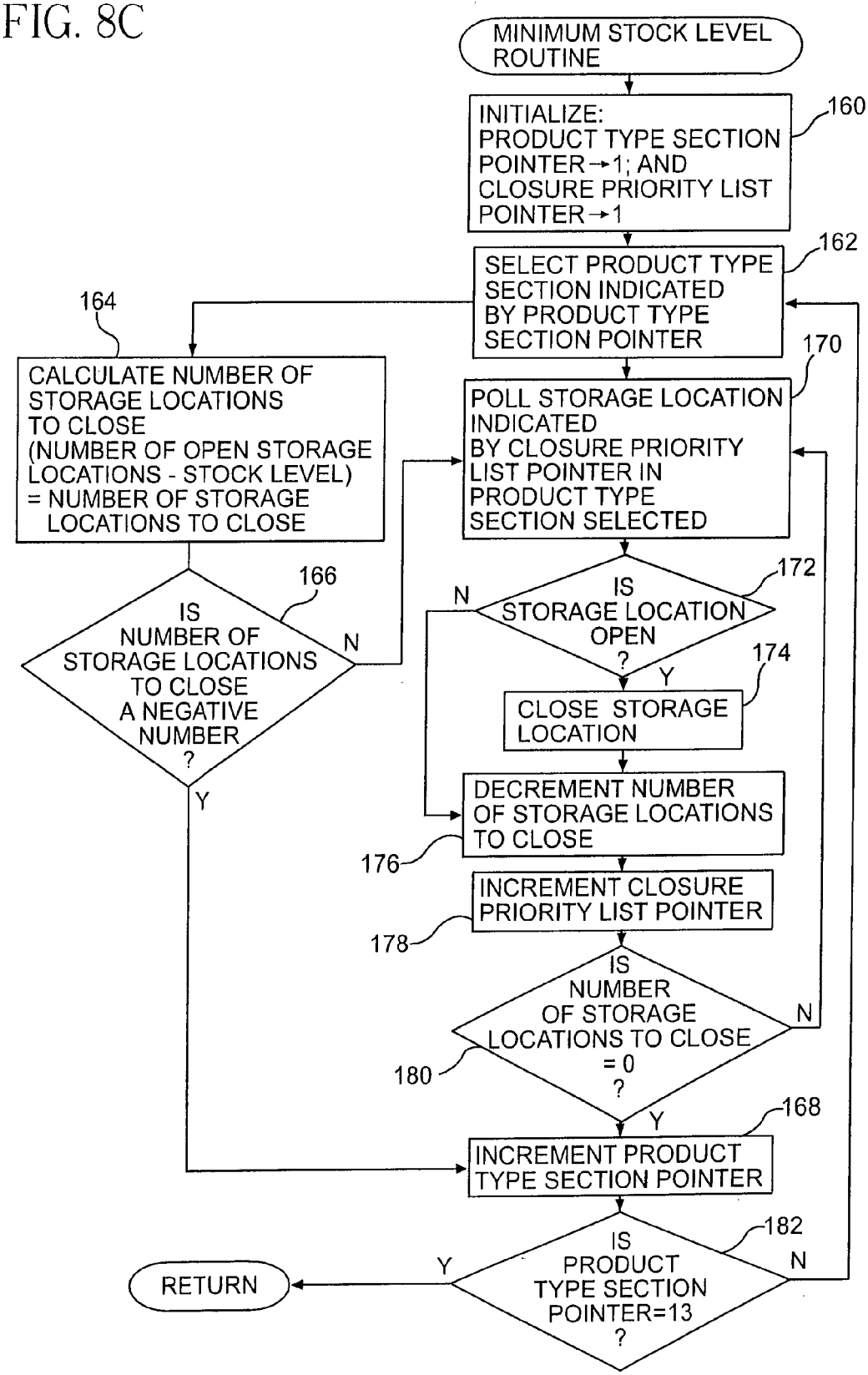
FIG. 8C is a flowchart of a minimum stock level routine formed in accordance with the present invention.
Figure 8E:
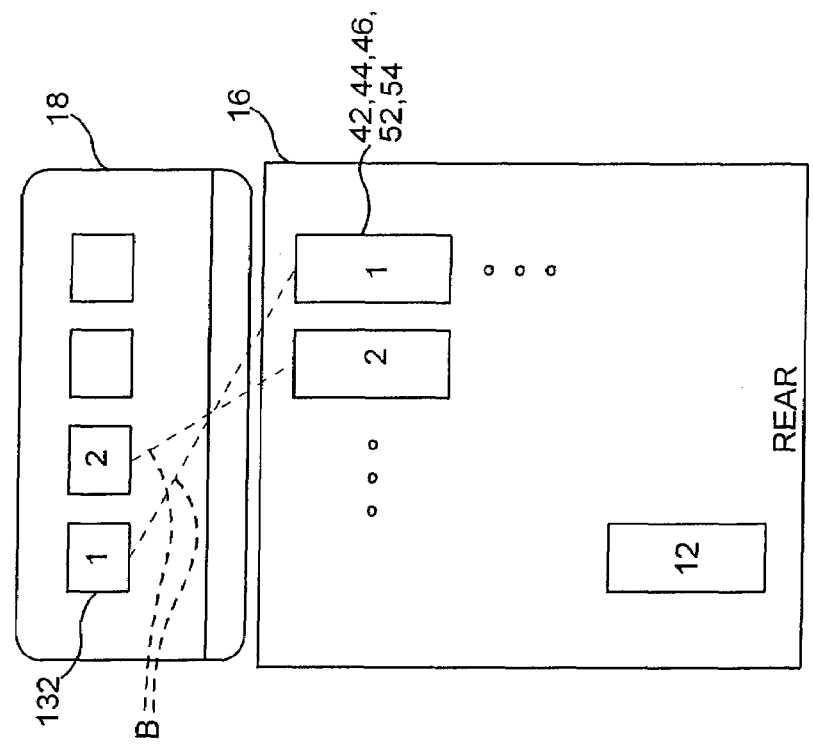
FIGS. 8D and 8E show a front and rear view of the holding station, respectively.
Figure 8D:
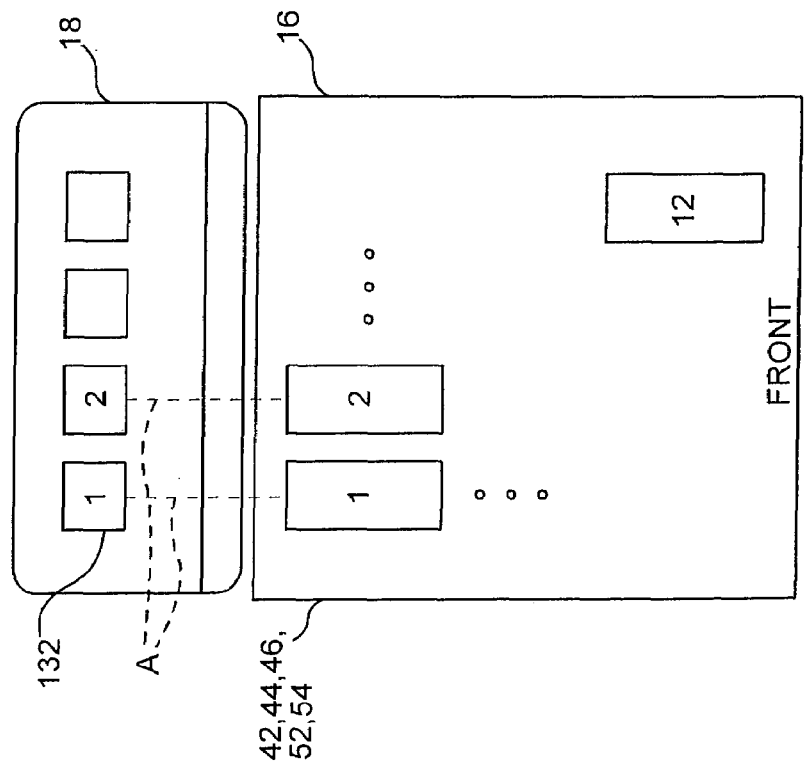
Figure 8F:
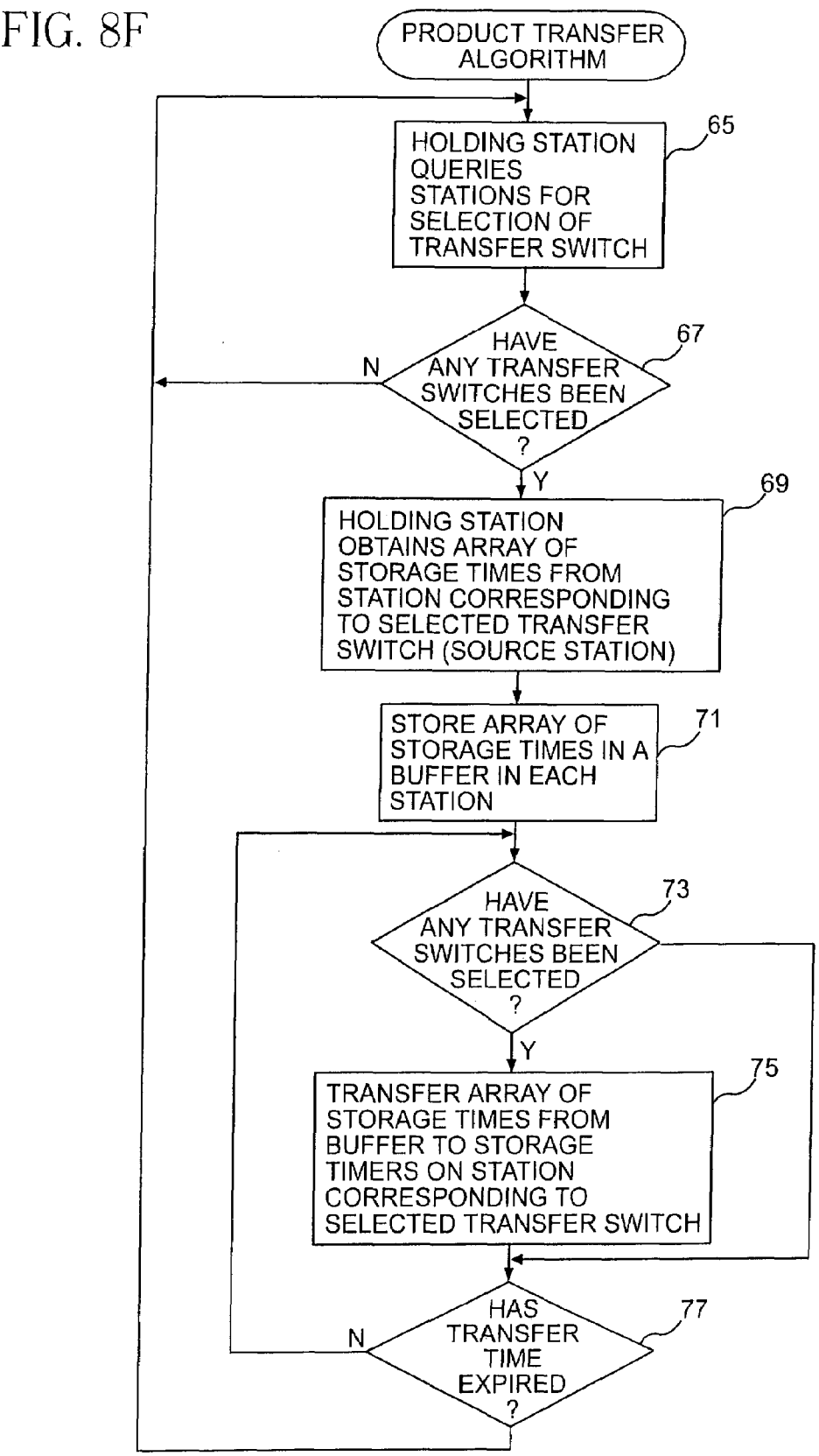
FIG. 8F shows a flowchart for a product transfer algorithm formed in accordance with the present invention.

FIG. 8F is a flowchart of an algorithm that enables the product status system to perform the product status transfer routine shown in FIG. 7A. The holding station queries the stations in step 65 to determine if the corresponding transfer switch has been selected at any of the stations. If the transfer switch has been selected in step 67, the holding stations obtains an array of storage times from the station corresponding to the transfer switch selected in step 69. The array includes twelve numbers representing the storage times for each of the twelve products stored in either the upper or lower pans in any of the stations. If the transfer switch has not been selected at any of the stations, the algorithm returns to re-execute step 65 from step 67.

The array of storage times is stored in a buffer within each of the stations in step 71. If the transfer switch has been selected at the same or another station in step 73, that station will transfer the array of storage times from its buffer to its storage timers in step 75. If the transfer switch has not been selected in step 73 or after the array of storage times is transferred to the storage timers, the algorithm determines whether the predetermined transfer time has expired in step 77. If the transfer time has expired, the algorithm returns to step 65. If the transfer time has not expired, the algorithm returns to re-execute step 73.

FIG. 8B is a block diagram showing the multiple transfer of food product between the source location and one or more destination locations. The food product and the elapsed storage time corresponding to the food product are transferred from the source location to the destination location in response to activation of the transfer switch corresponding to the source station and the product status switch corresponding to the source location as well as activation of the transfer switch corresponding to each of the destination stations and the product status switch corresponding to each of the destination locations. The source location can also be one of the destination locations by activating the transfer switch corresponding to the source station and the product status switch corresponding to the source station as indicated by arrow 79. In this way, the multiple transfer of product can be made from the source location back to the source location and one or more destination locations.

As an alternative to selecting the transfer switch 38, the transfer of food product may be initiated by pressing and holding the product status switch 36. This results in a significant reduction in the quantity of electromechanical components required by the system, which increases reliability and reduces manufacturing costs.

Minimum Stock Levels

FIG. 8C shows a flowchart of a minimum stock level routine, which is designed to inactivate or close storage locations when there are more storage locations are open than are required to hold a given stock level of the prepared food product. The stock level is equal to the total number of open stations for a given prepared food product multiplied by the pan fill level for that product. For instance, if the total number of stations open for burgers is 5 and the pan fill level for burgers is 8, the stock fill level is 40. However, the stock level indicates a preferred quantity of units of a given prepared food product, which should be present in the restaurant at any given time. Therefore, the stock level typically represents an initial value from which the pan fill level and number of open stations are determined. Thus, given a stock level of 42 for burgers, one possible result after rounding is that there are 5 open stations with a pan fill level of 8 for burgers.

The routine begins with step 160 in which a product type section pointer and a closure priority list pointer are preferably initialized to 1. The product type section pointer selects different product type sections 132 as shown in FIG. 4. The product type section pointed to or selected by the product type section pointer is selected in step 162, and each of the sides of the stations are polled to determine whether the storage location corresponding to the product type selected are open (active) or closed (inactive). The order of polling the storage locations is provided by the closure priority list, which is ordered in an increasing order of priority. Stated differently, those storage locations that have a higher priority of being closed are listed before those storage locations having a lower priority of being closed in the closure priority list. The number of storage locations to close is calculated in step 164 by subtracting the stock level from the total number of open storage locations for the given product type section. If the number of storage locations to close is a negative number in step 166, none of the storage locations are closed and the product type section pointer is incremented in step 168 to point to the next product type section.

If the number of storage locations to close is a positive number in step 166, the storage location indicated by the closure priority list pointer is polled in step 170. If the polled location is open in step 172, the storage location is closed in step 174, and the number of storage locations to close is decremented in step 176. However, if the storage location is not open in step 172, the number of storage locations to close is decremented in step 176, and the closure priority list pointer is incremented in step 178. If the number of storage locations to close is equal to zero in step 180, the product type section pointer is incremented in step 168. However, if the number of storage locations to close is not equal to zero in step 180, the routine returns to step 170 to select the next storage location to poll as indicated by the closure priority list pointer. Following step 168, if the product type section pointer is not equal to 13 in step 182, indicating that the routine has not been performed for each of the 12 product type sections, the routine returns to step 162. However, if the product type section is equal to 13 in step 182, the routine terminates.

Conversely, it is also possible that the demand for one or more food products exceeds the number of storage locations allocated to that food product given a maximum pan fill level for each of the storage locations. In this case, more than one storage location can be assigned to the same prepared food product, and transfers of the food product and the associated storage time can be made between each of these storage locations. Such a transfer is termed a "cross-transfer", and is not ordinarily permitted during normal operation, but can be programmed in response to increased demand for a particular food product.

The pan fill level represents the desired quantity of food product to be prepared on a per-pan basis. In order to calculate the pan fill level, a food product per unit sale volume is preferably determined, which represents the quantity of a particular food product sold at a predetermined unit of sale volume. For instance, if the unit of sale volume is selected to be $500 and the quantity of hamburgers sold is 50 when the volume of sale is $500, then the food product per unit sale volume would be 50. It is anticipated that the food product per unit sale volume will be calculated by sampling actual data under different conditions, such as at different times of the day and different days of the week to establish an acceptable degree of statistical certainty.

The current activity level is then preferably established as a multiple of the unit of sale volume in dollars. Thus, if the current activity level is $2000, then the activity level is equal to 4 since the current activity level is four times the unit of sale volume, which is $500. The food product per unit sale volume is then preferably multiplied by the current activity level and the product is divided by the total number of open pans to yield the pan fill level. Therefore, with a food product per unit sale volume equal to 50, an activity level equal to 4, and the quantity of open pans equal to 2, the pan fill level would preferably be equal to 100.

Method of Operation

Figure 9A:
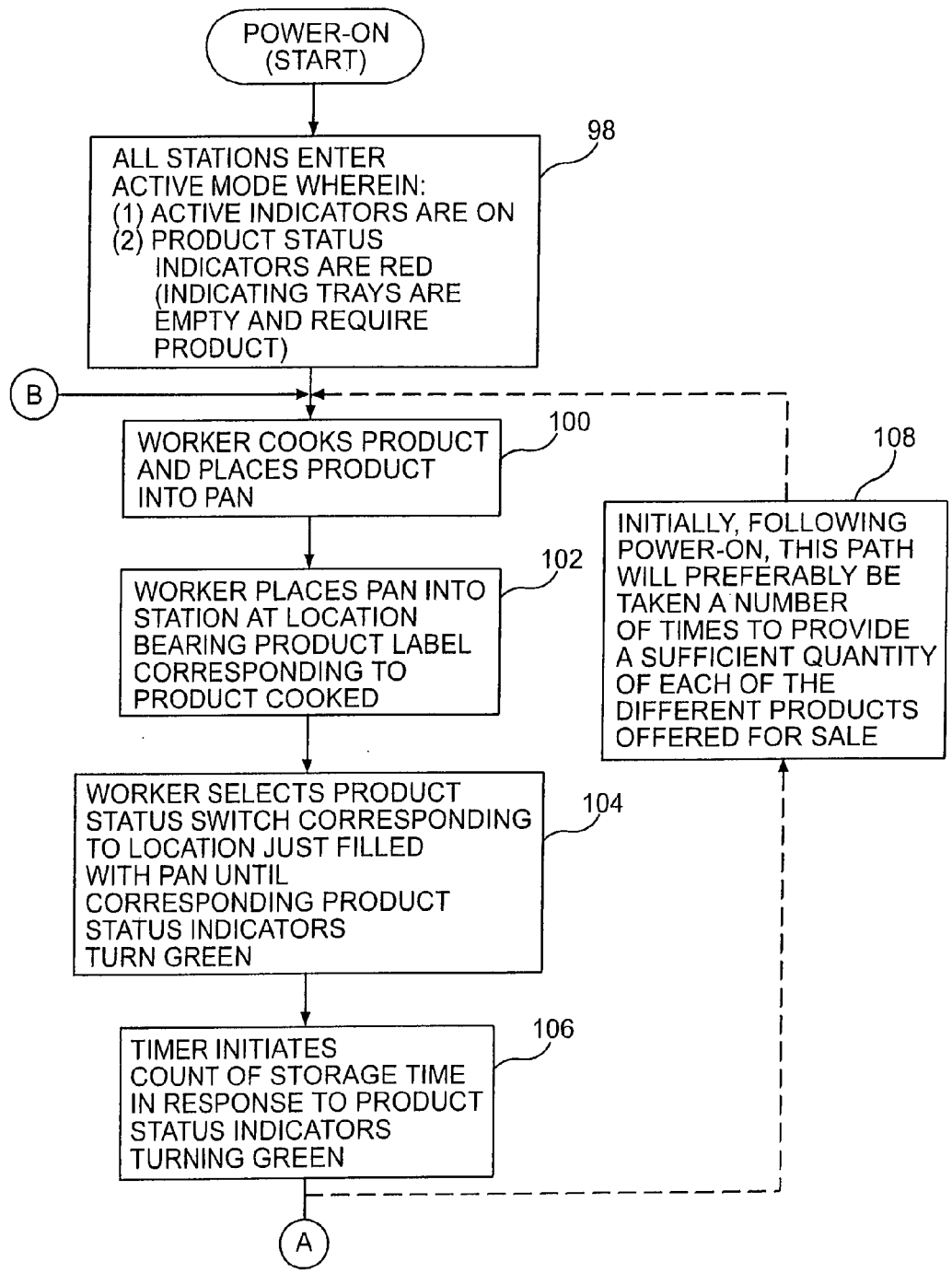
FIGS. 9A and 9B are flowcharts of the method for monitoring a status for each of a plurality of products formed in accordance with the present invention.
Figure 9B:
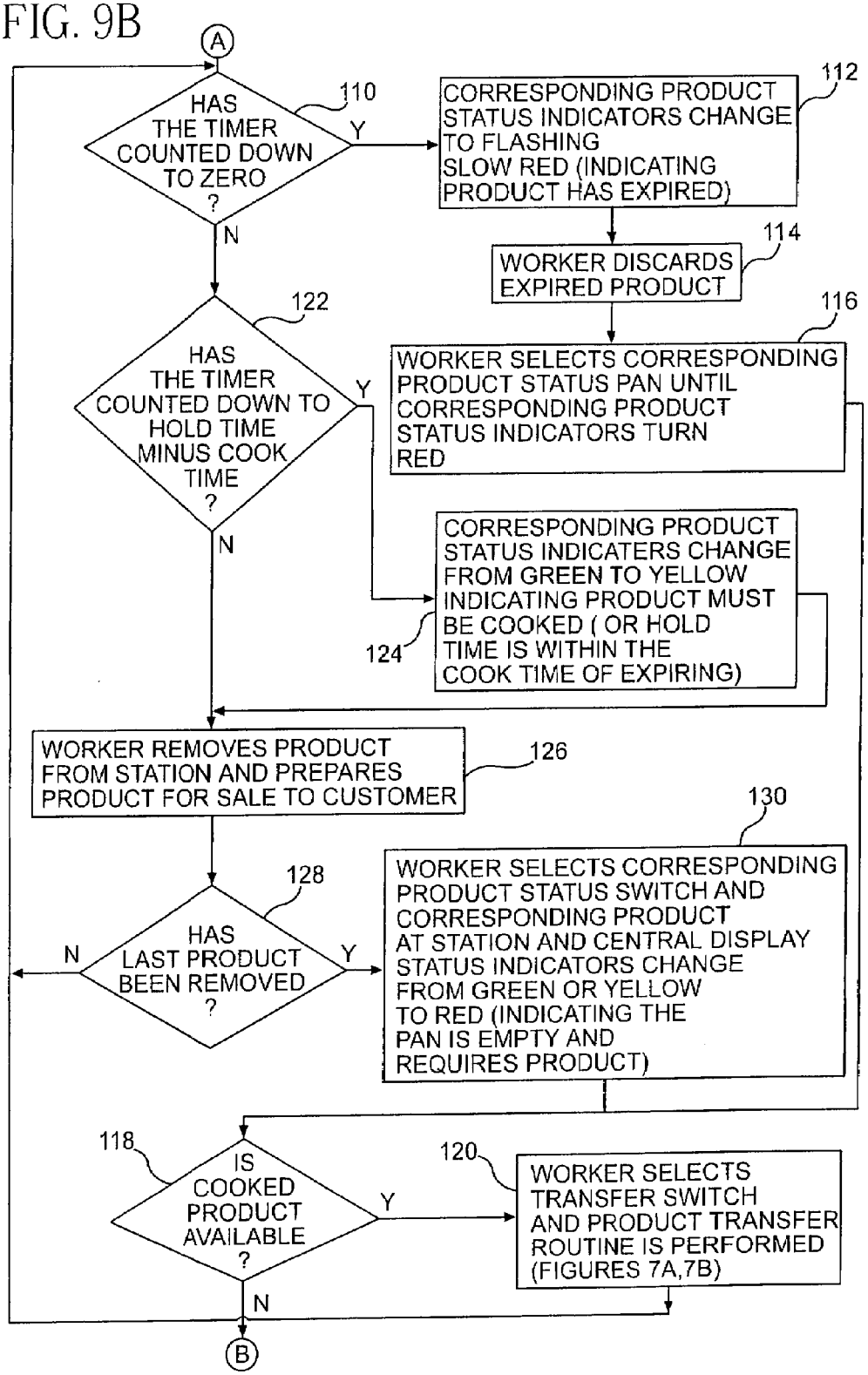

FIGS. 9A and 9B show flowcharts of a method for monitoring the status of a food product using the product status and transfer system formed in accordance with the present invention. Upon power-on of the product status and transfer system, all stations enter the active mode wherein all active indicators are illuminated, and all product status indicators are red indicating that the product pans are empty and require product in step 98. The worker then cooks the food product, places the cooked product into the pan in step 100, and places the pan into the station, which is preferably the holding station in step 102. The worker selects the product status switch corresponding to the location in the station just filled until the corresponding product status indicator turns green in step 104 indicating that there is unexpired product in the location just filled. The timer then initiates the count of the storage time by counting down the hold time in step 106 in response to the product status indicator turning green. Preferably following power-on, steps 100–106 will be repeated via step 108 until a sufficient quantity of each of the different products offered for sale is cooked and available at the holding station.

The flowchart continues on FIG. 9B with step 110, which determines whether the timer has counted down to zero. If the timer has counted down to zero, the corresponding product status indicators change to flashing slow red in step 112 indicating that the corresponding product has expired and is no longer of acceptable quality. The worker then discards the expired product in step 114, and selects the corresponding product status switch until the corresponding product status indicator turns red in step 116. The routine continues with step 118, which determines whether cooked product is available, and if it is, the worker selects the transfer switch which triggers the product transfer routine to be performed in step 120. When the transfer routine has been completed, the routine returns to step 110. If cooked product is not available, the routine returns to step 100 and the worker cooks additional product.

If the timer has not counted down to zero in step 110, the routine determines whether the timer has counted down to the hold time less the cook time in step 122. If the timer has counted down to the hold time less the cook time, the corresponding product status indicators change from green to yellow in step 124 indicating that the hold time is within the duration of the cook time of expiring and that additional product must be cooked. The routine continues with step 126 wherein the worker removes product from the station and prepares it for sale to the consumer. If the last food product has been removed from a particular location in step 128, the worker presses the corresponding product status switch and the corresponding product status indicator changes from green or yellow to red in step 130 indicating that the pan is empty and requires product. If cooked product is available in step 118, the product transfer routine is performed in step 120 and the routine continues with step 110. If cooked product is not available in step 118, the routine continues with step 100, which provides additional cooked product. If the last product has not been removed in step 128, the routine continues with step 110.

Detailed Description of Display

The display 18 shown in FIG. 4 includes a separate product type section 132 corresponding to each upper and lower pan combination found in the stations 12, 14, 16. Thus, the display 18 includes twelve total product type sections 132. Each product type section 132 includes a product name display 134, the product status indicators 44 corresponding to each of the stations 12, 14, 16 and a pan fill level display 136. It is to be noted that each product type section 132 preferably corresponds to upper and lower pan combinations in each of the stations 12, 14, 16, which are located in the same place on the station 12, 14, 16. For instance, the product type section 132 located in a first column and a first row of the display 18 corresponds to the upper and lower pan combinations in the first row and the first column of each of the stations 12, 14, 16. Thus, the product described by the product name display 134 in the first row and first column on the display 18, e.g., "Burg", preferably corresponds to the product noted in the product label 46 in the first row and the first column on each of the stations 12, 14, 16.

Similarly, the product status indicators 44 in each of the product type sections 132 on the display 18 correspond to their counterparts on each of the stations 12, 14, 16 and display the same status. For instance, the product status indicators 44 corresponding to the holding station 16 in the product type section 132 in the first column and the first row of the display 18 preferably correspond to the product status indicators 44 in the first column and the first row of the holding station 16. Likewise, the product status indicators 44 in the product type section 132 located in the first row and the first column of the display 18 corresponding to the front counter station 12, preferably correspond to the product status indicators 44 in the first row and the first column of the front counter station 12. Within each product type section 132 there are two product status indicators 44 (upper and lower) for each station 12, 14, 16. The upper product status indicator 44 preferably corresponds to the upper pan for that location in the station 12, 14, 16, and the lower product status indicator preferably corresponds to the lower pan for that location in the station 12, 14, 16.

Thus, the worker 30 responsible for cooking product at the holding station 16 can monitor the status of each of the products at each of the stations by looking at the display 18. In addition, the product status indicators 44 in each of the product type sections 132 are arranged such that the priority for replenishing the food products in each of the corresponding stations preferably decreases from left to right. The product status indicators 44 corresponding to the holding station 16 are positioned the farthest to the left, followed by the product status indicators 44 corresponding to the front counter station 12 and the drive-through station 14. Thus, the holding station 16 is to be refilled before the front counter station 12, which is to be refilled before the drive-through station 14. The pan fill level display 136 indicates the pan fill level for each product, which is the number of units of each product that should be prepared when new product is cooked.

The display 18 also includes an activity level switch 138, a day part switch 140 and an alphanumeric display panel 142 for electronically displaying an activity level and a day part. The activity level is preferably stored in memory. The pan fill level for each of the twelve different products displayed in the product type sections 132 is a function of the activity level, which represents an overall rate of sale for all of the products. Therefore, if the activity level is increased, the pan fill level for each of the products may increase causing additional product to be cooked and ready to meet an increase in demand. The worker can manually adjust the activity level by depressing the activity level switch 138 until the desired activity level is displayed on the alphanumeric display panel 142. The activity level can also be automatically adjusted as a function of the time, the day, promotional events, sales, and the like. A change in the activity level preferably causes changes in the pan fill level for each of the products independently. For example, when changing from activity level 1 to activity level 2, the number of chicken sandwiches can be increased from 6 to 10 whereas the number of burgers can remain at 10.

The day part switch 140 can be used to select a desired period of the day, such as morning, afternoon, early evening and late evening. The day part preferably affects the identity of the products shown in the product name displays 134 for each of the product type sections 132. For instance, if the day part is set to morning, typical products shown in the product name displays 134 might be eggs, muffins, sausages, and the like. In contrast, if the day part is set to afternoon, the product name displays 134 might indicate such products as burgers, chicken sandwiches, fish sandwiches, and the like.

The day part can be manually modified by activating the day part switch 140, which sequences through the possible values for the day part shown on the alphanumeric display 142 until the desired day part is obtained. The day part can also be automatically modified as a function of the time.

The display 18 includes a menu switch 144, editing cursor switches 146 and an enter switch 148, which enable the product name displays 134, pan fill level displays 136, and potential values for the activity level and day part to be entered and modified by the workers 28, 30 using means well known in the art. An external terminal (not shown) can optionally be connected to the display 18 and used to modify, download and upload versions of operational software, variables, constants, data, and the like as well as editing any of the parameters associated with and/or displayed on the display 18.

Circuit Board Level Block Diagram

Figure 10:
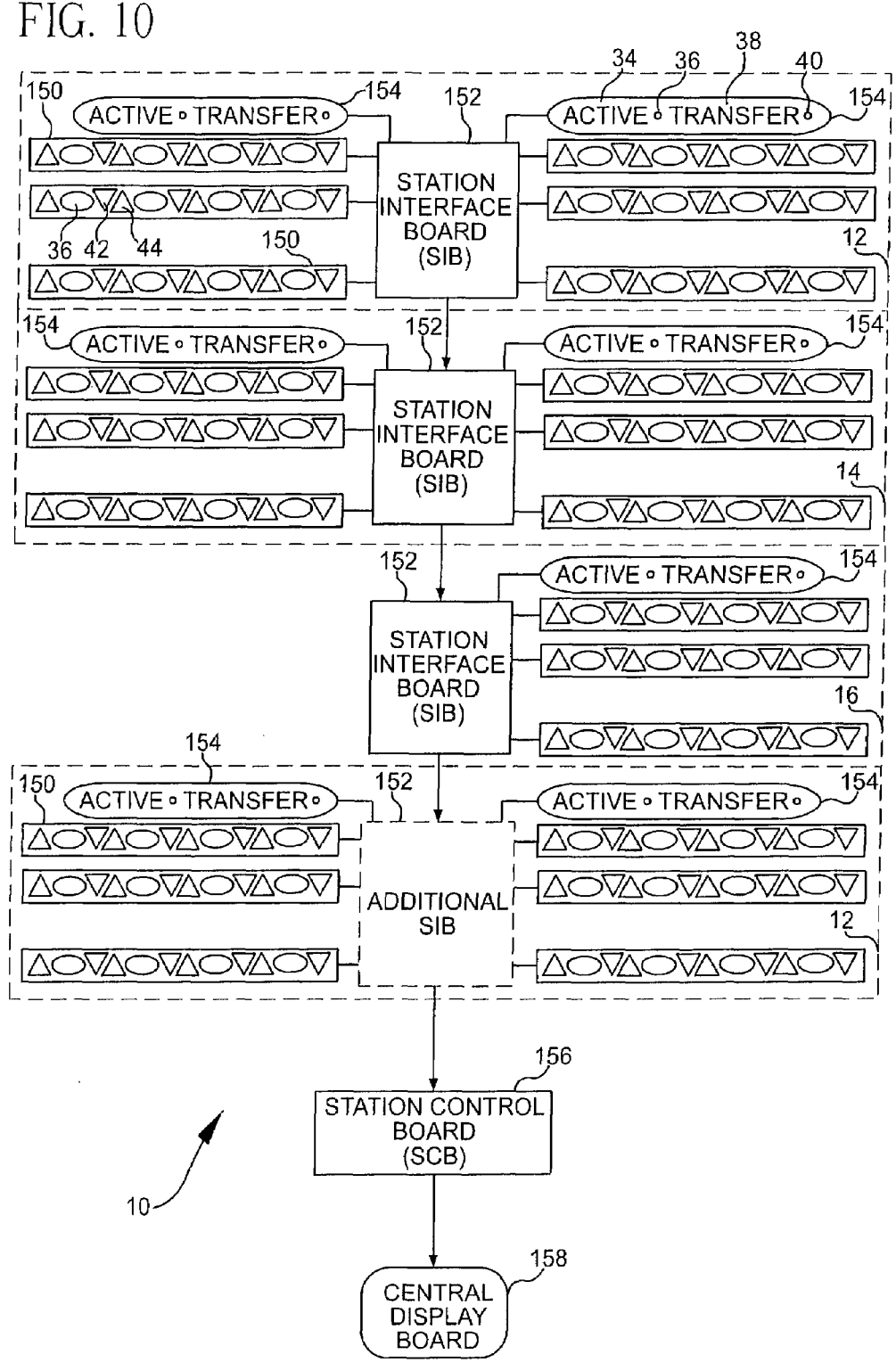
FIG. 10 is a circuit board level block diagram of the product status and transfer system formed in accordance with the present invention.

FIG. 10 shows a circuit board level block diagram of the product status and transfer system 10 formed in accordance with the present invention. The product status and transfer system 10 preferably includes six station/worker interface boards (SWIB) 150 for each of the stations 12, 14. Three of the SWIB 150 correspond to the front of the front counter station 12 or drive-through station 14, and three of the SWIB 150 correspond to the rear of the front counter station 12 or drive-through station 14. The holding station 16 preferably requires only three SWIB 150 since the worker 30 accesses only one side of the holding station 150. The SWIB 150 corresponding to each of the stations 12, 14, 16 is indicated by dashed lines surrounding sets of SWIB 150 bearing reference numerals corresponding to the stations 12, 14, 16.

Each station/worker interface board 150 includes four sets of two product status switches 42, two product status indicators 44 and one product label 46 corresponding to each of the four columns in the station 12, 14, 16. Each station 12, 14 also includes two active/transfer boards (ATB) 154. Each ATB 154 has one active switch 34, one active indicator 36, one transfer switch 38 and one transfer indicator 40. The holding station 16 preferably includes only one ATB 154 since only one worker 30 accesses the holding station 150. Each station 12, 14, 16 also includes a station interface board (SIB) 152 electrically coupled to each of the three or six SWIB 150, and one or two ATB 154. Each of the SIB 152 are electrically coupled to a station control board (SCB) 156, which is electrically coupled to a display board 158.

Detailed Description of Board Level Schematics

Tables 2A–2E are parts list for the display board (CDB), station control board (SCB), station interface board (SIB), station worker interface board (SWIB) and active transfer board (ATB), respectively, shown in the circuit board level block diagram of FIG. 10.

Tables 3A–3E are netlists for the display board (CDB), station control board (SCB), station interface board (SIB), station worker interface board (SWIB) and active transfer board (ATB), respectively, shown in the circuit board level block diagram of FIG. 10. The netlists provide a listing of connectivity between components located on the circuit boards according to the reference designations corresponding to the components and pin numbers on the components shown in the schematic diagrams for each of the circuit boards.

TABLE 2A

Bill of Material 810191
Title: PCB Assy, PMS Scoreboard Display
Detail: PCB Assy, Central Display Board (CDB)
Rev: A
Status: U   Date: Feb. 5, 1999

| Item | Qty | Part | Type Stat | Title Detail | Reference |
|---|---|---|---|---|---|
| 1 | 1 | 880289 | PL | LABOR, Protein Status System | |
| | | | U | Protein Status System, Scoreboard, Display Board | |
| 2 | 1 | 820006 | PS | Purchased PCB Assy | VFD1 |
| | | | R | VFD Display 2 × 20 | |
| 3 | 1 | 635-1-20-RA | PS | Connector | J2 |
| | | | U | Connector, IDC 20 Pin Header Right-Angle | |

TABLE 2A-continued

Bill of Material 810191
Title: PCB Assy, PMS Scoreboard Display
Detail: PCB Assy, Central Display Board (CDB)
Rev: A
Status: U          Date: Feb. 5, 1999

| Item | Qty | Part | Type Stat | Title Detail | Reference |
|---|---|---|---|---|---|
| 4 | 1 | 634042 | PS R | Header<br>Header, Dual Row .1 Straight 14 Pos | VFD1 |
| 5 | 1 | 634014 | PS R | Header<br>Header, 8 Pos RT Angle .100 | J1 |
| 6 | 1 | 634-3-2RA | PS U | Header .156<br>Header, 2 Pos Right Angle .156 Locked | J3 |
| 7 | 12 | 632040 | PS R | IC Socket<br>IC Socket, Low Profile 40 PIN DIP | DS1/DS2-DS23/<br>DS24 |
| 8 | 12 | 632018 | PS R | IC Socket<br>IC Socket, Low Profile 18 Pin Wide | DS25-DS36 |
| 9 | 1 | 620602 | PS R | Thermal Pad<br>Thermal Pad TO-220 Sil-Pad-400 | VR1 |
| 10 | 1 | 620504 | PS R | Heat Sink<br>Heat Sink, TO220 4.5 W | VR1 |
| 11 | 1 | 550000 | PS R | Transistor<br>Transistor, FET 2N7000 | Q1 |
| 12 | 1 | 530062 | PS U | Voltage Regulator<br>Voltage Reg, +5 Volt Switching LM2576T – 5.0 3ATO220 | VR1 |
| 13 | 2 | 520107 | PS R | IC<br>IC, 8 bit Latch 74HCT574 | U13 U15 |
| 14 | 1 | 520089 | PS R | IC<br>IC, Octal Buffer 74HCT540E Tri State | U14 |
| 15 | 6 | 520047 | PS R | IC<br>IC Led Driver 8 Character ALPHA CC | U1 U2 U3 U4 U5 U6 |
| 16 | 6 | 520046 | PS R | IC<br>IC LED Driver 8 digit Numeric CA, ICM7228AIPI | U7 U8 U9 U10 U11<br>U12 |
| 17 | 3 | 520008 | PS R | IC<br>IC, Decoder 1 of 8, 74LS138 | U16 U17 U18 |
| 18 | 1 | 510010 | PS U | Diode<br>Diode, ShoctKey 40 V, 3 A, 1N5822 | CR1 |
| 19 | 12 | 500025 | PS U | Display<br>Display-Green, LED Numeric Dual, Common Anode | DS25-DS36 |
| 20 | 24 | 500024 | PS U | Display<br>Display, LED Alphanumeric Dual Green CC | DS1-DS24 |
| 21 | 96 | 500018 | PS R | Display<br>LED, Bi Color Red Green | LD1-LD84<br>LD89-LD100 |
| 22 | 8 | 500004 | PS U | Display<br>Display, LED Green T 1¾ | LD85-LD88<br>LD101-LD104 |
| 23 | 1 | 400191 | PS R | PCB, Protein Status System<br>PCB, Scoreboard Display Board | |
| 24 | 18 | 308-0-0.1UF-50V | PS U | Cap., Ceramic Monolithic, Radial<br>Cap .1uF, 10%, 50 V (.2 space) | C1-C18 |
| 25 | 1 | 305-4-1000UF-16V | PS U | Cap., Electrolytic Axial<br>Cap 1000 uF, 20%, 16 V | C21 |
| 26 | 1 | 305-3-100UF-25V | PS U | Cap., Electrolytic Axial<br>Cap 100 uF, 20%, 25 V | C19 |
| 27 | 1 | 190006 | PS U | Inductor<br>Inductor, 150 uH Low EMI Torroid | L2 |
| 28 | 1 | 156103 | PS R | SIP Resistor<br>Sip, 9 Res 10K, 10 Pin Bussed | RN1 |
| 29 | 1 | 10-0-180 | PS U | Res. ¼ W 5% Carbon Film<br>Resistor 180 Ohm ¼ W, 5% | R3 |
| 30 | 5 | 013408 | PS R | Hardware<br>Thread Stnd Off 4-40 ¼ Hex × ¼ Alu | Processor board mount |
| 31 | 4 | 011602 | PS U | Hardware<br>Nylon Spacer #6 × .062 H × .25 OD - F/W | VFD1 |
| 32 | 104 | 011105 | PS U | Display<br>LED Spacer, .175 High, ELM 3-Series 3 lead .100 sp | LD1-LD104 |
| 33 | 10 | 002406 | PS R | Hardware<br>Screw, 4-40 × 3/16 Pan Hd Phil SS SEMS | Processor Board Mount |
| 34 | 5 | 002401 | PS R | Hardware<br>Nut, 4-40 Keps External Lock SS | VR1, VFD1 |
| 35 | 5 | 001412 | PS R | Hardware<br>Screw, 4-40 × 3/8 Pan Head Phil SS | VR1 VFD1 |

TABLE 2B

Bill of Material 810192
Title: PCB Assy, PMS Scoreboard Processor
Detail: PCB Assy, Station Control Board
Rev: B
Status: U          Date: Feb. 5, 1999

| Item | Qty | Part | Type Stat | Title Detail | Reference |
|---|---|---|---|---|---|
| 1 | 1 | 880290 | PL | LABOR, Protein Status System | |
| | | | U | Protein Status System, Scoreboard, Processor Bd. | |
| 2 | 1 | 635-1-20-RA | PS | Connector | J11 |
| | | | U | Connector, IDC 20 Pin Header Right-Angle | |
| 3 | 1 | 634-3-2RA | PS | Header .156 | J9 |
| | | | U | Header, 2 Pos Right Angle .156 Locked | |
| 4 | 0 | 634-1-6-RA | PS | Post Header .1 | J10 |
| | | | U | Post Header, Right Angle 6 pos | |
| 5 | 6 | 633-1-8X8-T | PS | Modular Jack | J3 J4 J5 J6 J7 J8 |
| | | | U | Modular Jack 8 × 8 Top Entry Without Stops | |
| 6 | 1 | 633-8-2.5 | PS | Power Jack | J2 |
| | | | U | DC Power Jack 2.5 MM Panel Mount, PCB Term, PC712 | |
| 7 | 1 | 632040 | PS | IC Socket | U1 |
| | | | R | IC Socket, Low Profile 40 PIN DIP | |
| 8 | 1 | 620602 | PS | Thermal Pad | VR1 |
| | | | R | Thermal Pad TO-220 Sil-Pad-400 | |
| 9 | 1 | 620504 | PS | Heat Sink | VR1 |
| | | | R | Heat Sink, TO220 4.5 W | |
| 10 | 1 | 600033 | PS | Switch | S1 |
| | | | U | Switch, Slide DPDT ON OFF PCB Mount | |
| 11 | 1 | 560009 | PS | Crystal | Y1 |
| | | | U | Crystal, 11.0592 MHZ HC49USHalf Height | |
| 12 | 1 | 560005 | PS | Crystal - S563 | Y2 |
| | | | R | Crystal, Quartz 32.768 KHZ | |
| 13 | 0 | 540-PLD-813 | PS | IC, Surface Mount | U3 |
| | | | U | IC, PSD813F Rom, Ram, I/O | |
| 14 | 1 | 530008 | PS | Voltage Regulator +5 | VR1 |
| | | | U | LM7805 TO220 Case | |
| 15 | 1 | 520115 | PS | IC | Q2 |
| | | | R | IC, Microprocessor Reset, TO-92, DS1833 | |
| 16 | 1 | 520112 | PS | IC | U2 |
| | | | R | IC, Oct D Latch Tri State Dip 74ALS573 | |
| 17 | 1 | 520101 | PS | IC | U1 |
| | | | U | IC Microcontroller 16KROM 87C54 | |
| 18 | 1 | 520-M-24C32 | PS | IC, Memory | U6 |
| | | | U | IC EEProm 4K × 8 Serial 24LC32 | do not use U7 |
| 19 | 1 | 520067 | PS | IC | U14 |
| | | | R | IC Real Time Clock/w Ram PCF8583PN | |
| 20 | 1 | 520008 | PS | IC | U17 |
| | | | R | IC, Decoder 1 of 8, 74LS138 | |
| 21 | 3 | 520005 | PS | IC | U19 U20 U21 |
| | | | R | IC RS232 Transmitter and Receiver | |
| 22 | 1 | 520004 | PS | IC | U5 |
| | | | R | IC HEX Inverter 7406 | |
| 23 | 0 | 520-M-8570 | PS | IC, Memory | U15 |
| | | | U | IC Ram, 256 Byte Static Ram PCF8570 | |
| 24 | 1 | 520-LS-251 | PS | IC | U18 |
| | | | U | 74LS251 Tri-State Data Selectors/Multiplexer | |
| 25 | 1 | 510012 | PS | Diode | CR1 |
| | | | R | Diode Bridge Rectifier MB805 8 Amp Bridge (BR6) | |
| 26 | 1 | 510007 | PS | Diode | CR6 |
| | | | U | Diode, Germanium 1N270 | |
| 27 | 1 | 500002 | PS | Display | LD1 |
| | | | U | Display, LED Red T 1¾-5 mm | |
| 28 | 1 | 400192ECN | PS | PCB, Protein Status System | |
| | | | U | PCB, Scoreboard Processor Board | |
| 29 | 1 | 310-0-0.1F-5.5V | PS | Cap., Gold | C29 |
| | | | U | Cap .1F, +/−30% 5.5 V NF Series | |
| 30 | 1 | 308-2-18PF-100V | PS | Cap., Ceramic Monolithic | C25 |
| | | | U | Cap, 18 pF, 5%, 100 V | |
| 31 | 10 | 308-0-0.1UF-50V | PS | Cap., Ceramic Monolithic, Radial | C1-C3 C14 C15 |
| | | | U | Cap .1 uF, 10%, 50 V (.2 space) | C17-C21 |
| 32 | 18 | 306-2-10UF-16V | PS | Cap., Electrolytic, Radial | C26 C31-C47 |
| | | | U | Cap, 10 uF, 20%, 16 V | |
| 33 | 2 | 305-3-470UF-35V | PS | Cap., Electrolytic Axial | C27 C28 |
| | | | U | Cap 470 uF, 20%, 35 V | |
| 34 | 2 | 303-2-30PF-500V | PS | Cap., Dipped Mica | C22 C23 |
| | | | U | Cap 30 pF, 5%, 500 V | |
| 35 | 2 | 300000 | PS | Choke | FB1 FB2 |
| | | | U | Wide Band Shield Bead Ferrite Choke | |

TABLE 2B-continued

Bill of Material 810192
Title: PCB Assy, PMS Scoreboard Processor
Detail: PCB Assy, Station Control Board
Rev: B
Status: U          Date: Feb. 5, 1999

| Item | Qty | Part | Type Stat | Title Detail | Reference |
|---|---|---|---|---|---|
| 36 | 1 | 151472 | PS<br>R | SIP Resistor<br>SIP, 9 Res 4.7 K 10 Pin Bussed | RN1 |
| 37 | 1 | 11-3-001.43K | PS<br>U | Resistor, ¼ W 1% Metal Film<br>Resistor, 1.43 K ¼ W 1% | R2 |
| 38 | 3 | 10-3-004.7K | PS<br>U | Res. ¼ W 5% Carbon Film<br>Resistor 4.7 K Ohm ¼ W, 5% | R3 R4 R7 |
| 39 | 1 | 002401 | PS<br>R | Hardware<br>Nut, 4-40 Keps External Lock SS | VR1 |
| 40 | 1 | 001412 | PS<br>R | Hardware<br>Screw, 4-40 × ⅜ Pan Head Phil SS | VR1 |

TABLE 2C

Bill of Material 810195
Title: PCB Assy, PMS Station Interface
Detail: PCB Assy,
Rev: B2
Status: U          Date: Jun. 25, 1999

| Item | Qty | Part | Type Stat | Title Detail | Reference |
|---|---|---|---|---|---|
| 1 | 1 | 880291 | PL<br>U | LABOR, PMS, Station Interface Board<br>PMS, Station Interface Board | |
| 2 | 0 | 634-1-6-RA | PS<br>U | Post Header .1<br>Post Header, Right Angle 6 pos | J7 |
| 3 | 3 | 633032 | PS<br>U | Connector<br>Phone Jack, 6 × 6 Top Entry Without Stops | J3 J4 J5 |
| 4 | 0 | 633-8-2.5 | PS<br>U | Power Jack<br>DC Power Jack 2.5 MM Panel Mount, PCB Term, PC712 | J1 |
| 5 | 1 | 633-1-8X8-T | PS<br>U | Modular Jack<br>Modular Jack 8 × 8 Top Entry Without Stops | J2 |
| 6 | 0 | 633-1-4X4-T | PS<br>U | Modular Jack<br>Modular Jack 4 × 4 Top Entry | J6 |
| 7 | 1 | 632040 | PS<br>R | IC Socket<br>IC Socket, Low Profile 40 PIN DIP | U1 |
| 8 | 1 | 560009 | PS<br>U | Crystal<br>Crystal, 11.0592 MHZ HC49US Half Height | Y1 |
| 9 | 0 | 540-PLD-813 | PS<br>U | IC, Surface Mount<br>IC, PSD813F Rom, Ram, I/O | U6 |
| 10 | 1 | 530055 | PS<br>U | Voltage Regulator<br>Switching Regulator LM2574N Dip .5 amp | VR1 |
| 11 | 1 | 520115 | PS<br>R | IC<br>IC, Microprocessor Reset, TO-92, DS1833 | Q1 |
| 12 | 1 | 520044 | PS<br>U | IC<br>IC Serial EEProm, 24C02 256 × 8 No Write prote | U4 |
| 13 | 1 | 520091 | PS<br>R | IC<br>IC Microcontroller P87C52 1 Shot Cmos | U1 |
| 14 | 1 | 520005 | PS<br>R | IC<br>IC RS232 Transmitter and Receiver | U2 |
| 15 | 1 | 520004 | PS<br>R | IC<br>IC HEX Inverter 7406 | U5 |
| 16 | 1 | 510015 | PS<br>R | Diode<br>Diode, Schotky 1A 40V 1N5819 | D1 |
| 17 | 0 | 510005 | PS<br>U | Diode<br>Diode, Bridge Rectifier 1 Amp | CR1 |
| 18 | 1 | 510003 | PS<br>R | Diode<br>Diode, Rectifier 1N4004 | D2 |
| 19 | 2 | 500002 | PS<br>U | Display<br>Display, LED Red T 1-¾-5 mm | LD1 LD2 |
| 20 | 1 | 400195ECN | PS<br>U | PCB, PMS, Station Interface<br>PCB, PMS, Station Interface, Rev. B2 | |
| 21 | 1 | 311-3-220UF-10V | PS<br>U | Cap., Electrolytic Axial<br>Cap 220 uF, 20%, 10 V Low ESR | C15 |
| 22 | 1 | 308-0-0.1UF-50V | PS<br>U | Cap., Ceramic Monolithic, Radial<br>Cap .1 uF, 10%, 50 V (.2 space) | C4 (DO NOT USE C6) |
| 23 | 5 | 306-2-10UF-16V | PS | Cap., Electrolytic, Radial | C2 C7 C8 C9 C10 |

TABLE 2C-continued

Bill of Material 810195
Title: PCB Assy, PMS Station Interface
Detail: PCB Assy,
Rev: B2
Status: U    Date: Jun. 25, 1999

| Item | Qty | Part | Type Stat | Title Detail | Reference |
|---|---|---|---|---|---|
| | | | U | Cap, 10 uF, 20%, 16 V | |
| 24 | 1 | 305-3-470UF-35V | PS | Cap., Electrolytic Axial | C14 |
| | | | U | Cap 470 uF, 20%, 35 V | |
| 25 | 2 | 303-2-30PF-500V | PS | Cap., Dipped Mica | C11 C12 |
| | | | U | Cap 30 pF, 5%, 500 V | |
| 26 | 1 | 302-2-10.0UF-16V | PS | Cap., Tantalum | C1 |
| | | | U | Cap 10 uf 10% 16 V | |
| 27 | 1 | 190004 | PS | Inductor | L1 |
| | | | R | 330 uH Coil in plastic enclosure. PE-52627 | |
| 28 | 1 | 151472 | PS | SIP Resistor | RN1 |
| | | | R | SIP, 9 Res 4.7K 10 Pin Bussed | |
| 29 | 1 | 10-3-004.7K | PS | Res. ¼ W 5% Carbon Film | R1 (DO NOT USE |
| | | | U | Resistor 4.7K Ohm ¼ W, 5% | R2 R3) |
| 30 | 2 | 10-0-330 | PS | Res. ¼ W 5% Carbon Film | R4 R5 |
| | | | U | Resistor 330 Ohm ¼ W, 5% | |
| 31 | 2 | 011606 | PS | Hardware | LD1 LD2 |
| | | | R | Nylon Spacer .141 hole × .188 h × .25 od | |
| 32 | 1 | 670403 | PS | Wire | R6 |
| | | | R | Wire Cut 24 AWG Buss Wire 2.00" | |

TABLE 2D

Bill of Material 810196
Title: PCB Assy, PMS, Pan Status Keyboard
Detail: PCB Assy, PMS, Pan Status Keyboard
Rev: B7
Status: U    Jun. 30, 1999

| Item | Qty | Part | Type Stat | Title Detail | Reference |
|---|---|---|---|---|---|
| 1 | 1 | 880196 | PS | Labor | |
| | | | U | Labor, Pan Status Keyboard PCB assy. | |
| 2 | 1 | 681-6X6-18 | PS | Cable, Tele Flat Pre Made | |
| | | | U | Tele, Flat 6 Cond., 18", 6 × 6 Modular-Tinned Assy | |
| 3 | 8 | 601009 | PS | Switch, Cap, Yellow | SW1-SW8 |
| | | | U | Switch, Cap, Yellow | |
| 4 | 8 | 600032 | PS | Switch | SW1-SW8 |
| | | | U | Switch, Momentary Tactile Surface mount On Reel | |
| 5 | 3 | 540-8574 | PS | IC, Surface Mount | U1 U3 U4 |
| | | | U | 8-Bit I/O Expander | |
| 6 | 2 | 540-2981 | PS | IC, Surface Mount | U2 U5 |
| | | | U | IC, UDN2981LW 8-Channel Source Driver | |
| 7 | 8 | 500018 | PS | Display | LD1-LD8 |
| | | | R | LED, Bi Color Red Green | |
| 8 | 1 | 400196 | PS | PCB, PMS Pan Status Key Board | |
| | | | R | PCB, Pan Status Key Board, Rev. B7 | |
| 9 | 3 | 313-0-.1UF-25V | PS | Surface Mount Multilayer Ceramic Chip Cap. | C1 C3 C4 |
| | | | U | Cap .1uF, 25 V, +/− 10% | |
| 10 | 3 | 08-3-004.7k | PS | Surface Mount Thick Film Chip Resistor | R17 R18 R19 |
| | | | U | Resistor, 4.7 K, ⅛ W, 5% | |
| 11 | 16 | 08-0-330 | PS | Surface Mount Thick Film Chip Resistor | R1-R16 |
| | | | U | Resistor, 330, ⅛ W, 5% | |

TABLE 2E

Bill of Material 810197
Title: PCB Assy, PMS, Transfer Keyboard
Detail: PCB Assy, PMS, Transfer Keyboard Rev. C, Active Transfer Board
Rev: C
Status: U          Date: Jul. 2, 1999

| Item | Qty | Part | Type Stat | Title Detail | Reference |
|---|---|---|---|---|---|
| 1 | 1 | 880292 | PL<br>U | LABOR, PMS, Transfer Keyboard<br>PMS, Transfer Keyboard | |
| 2 | 1 | 681-6X6-18 | PS<br>U | Cable, Tele Flat Pre Made<br>Tele, Flat 6 Cond., 18", 6 × 6 Modular-Tinned Assy | |
| 3 | 3 | 601009 | PS<br>U | Switch, Cap, Yellow<br>Switch, Cap, Yellow | SW1 SW2 SW3 |
| 4 | 2 | 600032 | PS<br>U | Switch<br>Switch, Momentary Tactile Surface mount On Reel | SW1 SW2 SW3 |
| 5 | 1 | 540-8574 | PS<br>U | IC, Surface Mount<br>8-Bit I/O Expander | U1 |
| 6 | 2 | 500004 | PS<br>U | Display<br>Display, LED Green T 1¾ | LD1 LD2 |
| 7 | 2 | 500002 | PS<br>U | Display<br>Display, LED Red T 1¾-5 mm | LD3 |
| 8 | 1 | 400197 | PS<br>U | PCB, PMS, Transfer Keyboard<br>PCB, PMS, Transfer Keyboard, Rev. C | |
| 9 | 1 | 313-0-.1UF-25V | PS<br>U | Surface Mount Multilayer Ceramic Chip Cap.<br>Cap .1uF, 25 V, +/−10% | C1 |
| 10 | 1 | 08-3-004.7K | PS<br>U | Surface Mount Thick Film Chip Resistor<br>Resistor, 4.7 K, ⅛ W, 5% | R4 |
| 11 | 3 | 08-0-330 | PS<br>U | Surface Mount Thick Film Chip Resistor<br>Resistor, 330, ⅛ W, 5%, | R1 R2 R3 |

TABLE 3A net NET00118

U1-37
DS1-10
DS2-10
DS4-10
DS3-10
net GND

U15-10
U15-1
U14-10
C15-B
C14-B
VFD1-1
C19-2
CR1-2
VR1-3
VR1-5
C21-MINUS
J3-2
Q1-1
U17-8
C18-B
U18-8
U16-8
C16-B
C17-B
U13-10
U13-1
C13-B
U8-28
C8-B
U7-28
C7-B
U10-28
C10-B
U9-28
C9-B
U12-28
U11-28

TABLE 3A-continued

C12-B
C11-B
U1-22
U1-16
U1-31
C1-B
U2-22
U2-16
U2-31
C2-B
U3-22
U3-16
U3-31
C3-B
U4-22
U4-16
U4-31
C4-B
U5-22
U5-16
U5-31
C5-B
U6-22
U6-16
U6-31
C6-B
Net D1

U15-3
U14-17
VFD1-8
J2-5
U13-3
U8-11
U7-11
U10-11
U9-11
U12-11
U11-11
U1-9
U2-9

TABLE 3A-continued

U3-9
U4-9
U5-9
U6-9
Net D3

U15-5
U14-15
VFD1-10
J2-6
U13-5
U8-14
U7-14
U10-14
U9-14
U12-14
U11-14
U1-11
U2-11
U3-11
U4-11
U5-11
U6-11
net D4

U15-6
U14-14
VFD1-11
J2-15
U13-6
U8-10
U7-10
U10-10
U9-10
U12-10
U11-10
U1-12
U2-12
U3-12
U4-12
U5-12
U6-12
net D7

U15-9
U14-11
VFD1-14
J2-8
U13-9
U8-7
U7-7
U10-7
U9-7
U12-7
U11-7
net D6

U15-8
U14-12
VFD1-13
J2-14
U13-8
U8-5
U7-5
U10-5
U9-5
U12-5
U11-5
Net D5

U15-7
U14-13
VFD1-12
J2-7
U13-7
U8-6
U7-6
U10-6
U9-6

TABLE 3A-continued

U12-6
U11-6
U1-13
U2-13
U3-13
U4-13
U5-13
U6-13
Net D2

U15-4
U14-16
VFD1-9
J2-16
U13-4
U8-13
U7-13
U10-13
U9-13
U12-13
U11-13
U1-10
U2-10
U3-10
U4-10
U5-10
U6-10
net D0

U15-2
U14-18
VFD1-7
J2-17
U13-2
U8-12
U7-12
U10-12
U9-12
U12-12
U11-12
U1-8
U2-8
U3-8
U4-8
U5-8
U6-8
net NET00020

U15-18
J1-8
Net VFD_RS

VFD1-4
J2-9
Net VFD_RW

VFD1-5
J2-12
Net VFD_ENABLE

VFD1-6
Q1-3
R3-B
Net NET00004

U15-19
J1-7
Net EARTH

U14-3
RN1-3
J1-2
Net READ_KEY_ROW

U14-19
U14-1
U18-15

TABLE 3A-continued net NET00064

U14-2
RN1-2
J1-1
net NET00069

U14-4
RN1-4
J1-3
net NET00070

U14-5
RN1-5
J1-4
net NET00071

U14-6
RN1-6
J1-5
net NET00072

U14-7
RN1-7
net NET00095

U14-8
RN1-8
net NET00096

U14-9
RN1-9
net NET00019

U11-15
DS33-14
LD85-A
net WRITE_KEYCOL

U15-11
U17-7
Net SEL_WRITELATCH1

J2-10
U16-6
Net SEL_WRITELATCH2

J2-11
U17-6
net WRITE_PORT

J2-18
U17-4
U16-4
net A0

J2-1
U8-9
U7-9
U10-9
U9-9
U12-9
U11-9
net A1

J2-20
U17-1
U18-1
U16-1
net A2

J2-2
U17-2
U18-2
U16-2
net A3

J2-19
U17-3

TABLE 3A-continued

U18-3
U16-3
net READ_PORT

J2-13
U18-4
Net IO\\FLASH_SELECT

J2-4
U17-5
U18-5
U16-5
net ALPHA_DISP_A0

U13-19
U1-30
U2-30
U3-30
U4-30
U5-30
U6-30
net NET00001

Q1-2
U17-9
net ALPHA_DISP_A1

U13-18
U1-29
U2-29
U3-29
U4-29
U5-29
U6-29
net ALPHA_DISP_A2

U13-17
U1-28
U2-28
U3-28
U4-28
U5-28
U6-28
Net NET00104

U16-7
U13-11
Net ALPHA_DISP1_WR

U16-15
U1-17
Net NET00036

U11-22
DS34-13
LD88-A
Net 7SEG_DISP1

U17-15
U7-8
Net 7SEG_DISP2

U17-14
U8-8
Net 7SEG_DISP3

U17-13
U9-8
Net 7SEG_DISP4

U17-12
U10-8
net 7SEG_DISP5

U17-11
U11-8

TABLE 3A-continued net 7SEG_DISP6

U17-10
U12-8
net ALPHA_DISP2_WR

U16-14
U2-17
net ALPHA_DISP3_WR

U16-13
U3-17
net ALPHA_DISP4_WR

U16-12
U4-17
net ALPHA_DISP5_WR

U16-11
U5-17
net ALPHA_DISP6_WR

U16-10
U6-17
net +5V

U15-20
U14-20
C15-A
RN1-1
C14-A
VFD1-2
L2-1
VR1-4
C21-PLUS
U17-16
C18-A
U18-6
U18-16
U16-16
C16-A
R3-A
C17-A
U13-20
C13-A
U8-19
C8-A
U7-19
C7-A
U10-19
C10-A
U9-19
C9-A
U12-19
U11-19
C12-A
C11-A
U1-1
U1-15
U1-14
C1-A
U2-1
U2-15
U2-14
C2-A
U3-1
U3-15
U3-14
C3-A
U4-1
U4-15
U4-14
C4-A
U5-1
U5-15
U5-14
C5-A
U6-1
U6-15

TABLE 3A-continued

U6-14
C6-A
net NET00016

U11-17
DS34-14
LD87-A
net NET00080

L2-2
CR1-1
VR1-2
net NET00000

U9-21
LD40-R
LD41-R
LD39-R
LD36-R
LD37-R
LD38-R
LD92-R
LD42-R
net +12 V

C19-1
VR1-1
J3-1
net NET00003

U9-4
LD91-C
LD92-C
LD103-C
LD102-C
LD101-C
LD104-C
net NET00117

U1-7
DS1-12
DS2-12
DS4-12
DS3-12
net NET00272

U7-20
LD1-G
LD2-G
LD3-G
LD4-G
LD5-G
LD6-G
LD7-G
LD89-G
net NET00157

U7-23
LD1-R
LD2-R
LD3-R
LD4-R
LD5-R
LD6-R
LD7-R
LD89-R
net NET00351

U7-15
DS25-14
net NET00352

U7-16
DS25-13
net NET00372

U7-17
DS26-14

TABLE 3A-continued net NET00353

U7-4
DS25-4
DS25-9
DS26-4
DS26-9
LD89-C
LD90-C
net NET00373

U7-22
DS26-13
net NET00308

U7-21
LD12-R
LD14-R
LD13-R
LD11-R
LD10-R
LD9-R
LD8-R
LD90-R
net NET00309

U7-18
LD12-G
LD14-G
LD13-G
LD11-G
LD10-G
LD9-G
LD8-G
LD90-G
net NET00392

U7-25
DS25-2
DS25-6
LD1-C
DS26-2
DS26-6
LD8-C
net NET00393

U7-24
DS25-18
DS25-12
LD2-C
DS26-18
DS26-12
LD9-C
net NET00394

U7-26
DS25-17
DS25-7
LD3-C
DS26-17
DS26-7
LD10-C
net NET00395

U7-2
DS25-1
DS25-5
LD4-C
DS26-1
DS26-5
LD11-C
net NET00396

U7-1
DS25-3
DS25-8
LD5-C
DS26-3

TABLE 3A-continued

DS26-8
LD12-C
net NET00397

U7-3
DS25-15
DS25-10
LD6-C
DS26-15
DS26-10
LD13-C
net NET00398

U7-27
DS25-16
DS25-11
DS26-16
DS26-11
LD7-C
LD14-C
net NET00399

U8-15
DS27-14
net NET00400

U8-16
DS27-13
net NET00403

U8-17
DS28-14
net NET00404

U8-22
DS28-13
net NET00416

U8-2
DS27-1
DS27-5
LD18-C
DS28-1
DS28-5
LD25-C
net NET00418

U8-1
DS27-3
DS27-8
LD19-C
DS28-3
DS28-8
LD26-C
net NET00425

U8-3
DS27-15
DS27-10
LD20-C
DS28-15
DS28-10
LD27-C
Net NET00426

U8-27
DS27-16
DS27-11
LD21-C
DS28-16
DS28-11
LD28-C
Net NET00427

U8-20
LD15-G
LD16-G
LD95-G
LD21-G

TABLE 3A-continued

LD17-G
LD18-G
LD20-G
LD19-G
Net NET00428

U8-23
LD15-R
LD16-R
LD95-R
LD21-R
LD17-R
LD18-R
LD20-R
LD19-R
Net NET00037

U8-21
LD22-R
LD23-R
LD24-R
LD25-R
LD26-R
LD27-R
LD28-R
LD96-R
Net NET00430

U8-18
LD22-G
LD23-G
LD24-G
LD25-G
LD26-G
LD27-G
LD28-G
LD96-G
Net NET00431

U8-25
DS27-2
DS27-6
LD15-C
DS28-2
DS28-6
LD22-C
net NET00432

U8-24
DS27-18
DS27-12
LD16-C
DS28-18
DS28-12
LD23-C
net NET00433

U8-26
DS27-17
DS27-7
LD17-C
DS28-17
DS28-7
LD24-C
net NET00023

U8-4
DS27-4
DS27-9
LD95-C
DS28-4
DS28-9
LD96-C
net NET00006

U9-23
LD29-R
LD30-R
LD33-R

TABLE 3A-continued

LD34-R
LD31-R
LD32-R
LD91-R
LD35-R
net NET00021

U9-15
DS29-14
LD101-A
net NET00435

U9-16
DS29-13
LD102-A
net NET00438

U9-17
DS30-14
LD103-A
net NET00439

U9-22
DS30-13
LD104-A
net NET00002

U11-21
LD67-R
LD66-R
LD65-R
LD64-R
LD68-R
LD69-R
LD70-R
LD94-R
net NET00451

U9-2
DS29-1
DS29-5
LD32-C
LD39-C
DS30-1
DS30-5
net NET00453

U9-1
DS29-3
DS29-8
LD33-C
LD40-C
DS30-3
DS30-8
Net NET00460

U9-3
DS29-15
DS29-10
LD34-C
LD41-C
DS30-15
DS30-10
Net NET00461

U9-27
DS29-16
DS29-11
LD35-C
DS30-16
DS30-11
LD42-C
Net NET00462

U9-20
LD29-G
LD30-G
LD33-G
LD34-G

TABLE 3A-continued

LD31-G
LD32-G
LD91-G
LD35-G
net NET00465

U9-18
LD40-G
LD41-G
LD39-G
LD36-G
LD37-G
LD38-G
LD92-G
LD42-G
net NET00466

U9-25
DS29-2
DS29-6
LD29-C
LD36-C
DS30-2
DS30-6
net NET00467

U9-24
DS29-18
DS29-12
LD30-C
LD37-C
DS30-18
DS30-12
net NET00468

U9-26
DS29-17
DS29-7
LD31-C
LD38-C
DS30-17
DS30-7
net NET00475

U10-26
DS31-17
DS31-7
LD45-C
DS32-17
DS32-7
LD52-C
net NET00476

U10-24
DS31-18
DS31-12
LD44-C
DS32-18
DS32-12
LD51-C
net NET00477

U10-25
DS31-2
DS31-6
LD43-C
DS32-2
DS32-6
LD50-C
net NET00478

U10-15
DS31-14
net NET00479

U10-16
DS31-13

TABLE 3A-continued net NET00480

U10-17
DS32-14
net NET00481

U10-22
DS32-13
net NET00482

U10-4
DS31-4
DS31-9
LD97-C
DS32-4
DS32-9
LD98-C
net NET00484

U10-2
DS31-1
DS31-5
LD46-C
DS32-1
DS32-5
LD53-C
net NET00486

U10-1
DS31-3
DS31-8
LD47-C
DS32-3
DS32-8
LD54-C
net NET00489

U10-23
LD44-R
LD43-R
LD97-R
LD47-R
LD49-R
LD48-R
LD46-R
LD45-R
net NET00490

U10-20
LD44-G
LD43-G
LD97-G
LD47-G
LD49-G
LD48-G
LD46-G
LD45-G
net NET00491

U10-27
DS31-16
DS31-11
LD49-C
DS32-16
DS32-11
LD56-C
net NET00492

U10-3
DS31-15
DS31-10
LD48-C
DS32-15
DS32-10
LD55-C
net NET00017

U10-18
LD53-G

TABLE 3A-continued

LD52-G
LD51-G
LD50-G
LD55-G
LD54-G
LD98-G
LD56-G
net NET00496

U10-21
LD53-R
LD52-R
LD51-R
LD50-R
LD55-R
LD54-R
LD98-R
LD56-R
net NET00497

U11-26
DS33-17
DS33-7
LD59-C
DS34-17
DS34-7
LD66-C
net NET00498

U11-24
DS33-18
DS33-12
LD58-C
DS34-18
DS34-12
LD65-C
net NET00499

U11-25
DS33-2
DS33-6
LD57-C
DS34-2
DS34-6
LD64-C
net NET00018

U11-16
DS33-13
LD86-A
net NET00506

U11-2
DS33-1
DS33-5
DS34-1
DS34-5
LD60-C
LD67-C
net NET00508

U11-1
DS33-3
DS33-8
DS34-3
DS34-8
LD61-C
LD68-C
net NET00535

U12-26
DS35-17
DS35-7
LD73-C
DS36-17
DS36-7
LD80-C

TABLE 3A-continued net NET00516

U11-20
LD59-G
LD58-G
LD57-G
LD63-G
LD93-G
LD61-G
LD62-G
LD60-G
net NET00517

U11-27
DS33-16
DS33-11
DS34-16
DS34-11
LD63-C
LD70-C
net NET00518

U11-3
DS33-15
DS33-10
DS34-15
DS34-10
LD62-C
LD69-C
net NET00015

U11-23
LD59-R
LD58-R
LD57-R
LD63-R
LD93-R
LD61-R
LD62-R
LD60-R
net NET00119

U1-5
DS1-9
DS2-9
DS4-9
DS3-9
net NET00536

U12-24
DS35-18
DS35-12
LD72-C
DS36-18
DS36-12
LD79-C
net NET00537

U12-25
DS35-2
DS35-6
LD71-C
DS36-2
DS36-6
LD78-C
net NET00538

U12-15
DS35-14
net NET00539

U12-16
DS35-13
Net NET00540

U12-17
DS36-14

TABLE 3A-continued

Net NET00541

U12-22
DS36-13
Net NET00542

U12-4
DS35-4
DS35-9
LD99-C
DS36-4
DS36-9
LD100-C
Net NET00544

U12-2
DS35-1
DS35-5
LD74-C
DS36-1
DS36-5
LD81-C
Net NET00546

U12-1
DS35-3
DS35-8
LD75-C
DS36-3
DS36-8
LD82-C
net NET00550

U12-23
LD71-R
LD72-R
LD73-R
LD74-R
LD75-R
LD76-R
LD77-R
LD99-R
net NET00552

U12-27
DS35-16
DS35-11
LD77-C
DS36-16
DS36-11
LD84-C
net NET00554

U12-3
DS35-15
DS35-10
LD76-C
DS36-15
DS36-10
LD83-C
net NET00555

U12-20
LD71-G
LD72-G
LD73-G
LD74-G
LD75-G
LD76-G
LD77-G
LD99-G
net NET00563

U12-21
LD78-R
LD79-R
LD80-R
LD81-R
LD82-R

TABLE 3A-continued

LD83-R
LD84-R
LD100-R
net NET00572

U12-18
LD78-G
LD79-G
LD80-G
LD81-G
LD82-G
LD83-G
LD84-G
LD100-G
net NET00120

U1-6
DS1-7
DS2-7
DS4-7
DS3-7
net NET00014

U11-18
LD67-G
LD66-G
LD65-G
LD64-G
LD68-G
LD69-G
LD70-G
LD94-G
net NET00121

U1-2
DS1-1
DS2-1
DS4-1
DS3-1
net NET00122

U1-35
DS1-18
DS2-18
DS4-18
DS3-18
net NET00123

U1-3
DS1-13
DS2-13
DS4-13
DS3-13
net NET00124

U1-38
DS1-6
DS2-6
DS4-6
DS3-6
net NET00125

U1-33
DS1-17
DS2-17
DS4-17
DS3-17
Net NET00126

U1-36
DS1-15
DS2-15
DS4-15
DS3-15
Net NET00127

U1-32
DS1-14
DS2-14

TABLE 3A-continued

DS4-14
DS3-14
Net NET00128

U1-4
DS1-5
DS2-5
DS4-5
DS3-5
Net NET00129

U1-39
DS1-4
DS2-4
DS4-4
DS3-4
net NET00130

U1-40
DS1-2
DS2-2
DS4-2
DS3-2
net NET00131

U1-34
DS1-8
DS2-8
DS4-8
DS3-8
net NET00132

U1-26
DS1-16
net NET00133

U1-25
DS1-11
net NET00134

U1-24
DS2-16
net NET00135

U1-23
DS2-11
net NET00136

U1-21
DS3-16
net NET00137

U1-20
DS3-11
net NET00138

U1-19
DS4-16
net NET00139

U1-18
DS4-11
net NET00012

U11-4
LD93-C
LD94-C
LD87-C
LD86-C
LD85-C
LD88-C
net NET00140

U2-18
DS8-11
net NET00141

U2-19
DS8-16

TABLE 3A-continued net NET00142

U2-20
DS7-11
net NET00143

U2-21
DS7-16
net NET00146

U2-23
DS6-11
net NET00147

U2-24
DS6-16
net NET00148

U2-25
DS5-11
net NET00149

U2-26
DS5-16
net NET00165

U2-7
DS5-12
DS6-12
DS8-12
DS7-12
net NET00166

U2-37
DS5-10
DS6-10
DS8-10
DS7-10
net NET00167

U2-5
DS5-9
DS6-9
DS8-9
DS7-9
net NET00168

U2-6
DS5-7
DS6-7
DS8-7
DS7-7
net NET00169

U2-2
DS5-1
DS6-1
DS8-1
DS7-1
net NET00170

U2-35
DS5-18
DS6-18
DS8-18
DS7-18
net NET00171

U2-3
DS5-13
DS6-13
DS8-13
DS7-13
net NET00172

U2-38
DS5-6
DS6-6

TABLE 3A-continued

DS8-6
DS7-6
net NET00173

U2-33
DS5-17
DS6-17
DS8-17
DS7-17
net NET00174

U2-36
DS5-15
DS6-15
DS8-15
DS7-15
net NET00175

U2-32
DS5-14
DS6-14
DS8-14
DS7-14
net NET00176

U2-4
DS5-5
DS6-5
DS8-5
DS7-5
net NET00177

U2-34
DS5-8
DS6-8
DS8-8
DS7-8
net NET00178

U2-40
DS5-2
DS6-2
DS8-2
DS7-2
Net NET00179

U2-39
DS5-4
DS6-4
DS8-4
DS7-4
Net NET00180

U3-26
DS9-16
Net NET00181

U3-25
DS9-11
Net NET00182

U3-24
DS10-16
Net NET00183

U3-23
DS10-11
Net NET00184

U3-21
DS11-16
net NET00185

U3-20
DS11-11
net NET00186

U3-19
DS12-16

TABLE 3A-continued net NET00187

U3-18
DS12-11
net NET00188

U3-37
DS9-10
DS10-10
DS12-10
DS11-10
net NET00189

U3-5
DS9-9
DS10-9
DS12-9
DS11-9
net NET00190

U3-7
DS9-12
DS10-12
DS12-12
DS11-12
net NET00191

U3-6
DS9-7
DS10-7
DS12-7
DS11-7
net NET00192

U3-2
DS9-1
DS10-1
DS12-1
DS11-1
net NET00193

U3-35
DS9-18
DS10-18
DS12-18
DS11-18
net NET00194

U3-3
DS9-13
DS10-13
DS12-13
DS11-13
net NET00195

U3-38
DS9-6
DS10-6
DS12-6
DS11-6
net NET00196

U3-33
DS9-17
DS10-17
DS12-17
DS11-17
net NET00197

U3-36
DS9-15
DS10-15
DS12-15
DS11-15
net NET00198

U3-32
DS9-14
DS10-14

TABLE 3A-continued

DS12-14
DS11-14
net NET00199

U3-4
DS9-5
DS10-5
DS12-5
DS11-5
net NET00200

U3-34
DS9-8
DS10-8
DS12-8
DS11-8
net NET00201

U3-40
DS9-2
DS10-2
DS12-2
DS11-2
net NET00202

U3-39
DS9-4
DS10-4
DS12-4
DS11-4
net NET00203

U4-26
DS13-16
net NET00204

U4-25
DS13-11
net NET00205

U4-24
DS14-16
net NET00206

U4-23
DS14-11
net NET00207

U4-21
DS15-16
net NET00208

U4-20
DS15-11
net NET00209

U4-19
DS16-16
net NET00210

U4-18
DS16-11
Net NET00211

U4-37
DS13-10
DS14-10
DS16-10
DS15-10
Net NET00212

U4-5
DS13-9
DS14-9
DS16-9
DS15-9

Net NET00213

U4-7
DS13-12
DS14-12
DS16-12
DS15-12
Net NET00214

U4-6
DS13-7
DS14-7
DS16-7
DS15-7
net NET00215

U4-2
DS13-1
DS14-1
DS16-1
DS15-1
net NET00216

U4-35
DS13-18
DS14-18
DS16-18
DS15-18
net NET00217

U4-3
DS13-13
DS14-13
DS16-13
DS15-13
net NET00218

U4-38
DS13-6
DS14-6
DS16-6
DS15-6
net NET00219

U4-33
DS13-17
DS14-17
DS16-17
DS15-17
net NET00220

U4-36
DS13-15
DS14-15
DS16-15
DS15-15
net NET00221

U4-32
DS13-14
DS14-14
DS16-14
DS15-14
net NET00222

U4-4
DS13-5
DS14-5
DS16-5
DS15-5
net NET00223

U4-34
DS13-8
DS14-8
DS16-8
DS15-8

TABLE 3A-continued net NET00224

U4-40
DS13-2
DS14-2
DS16-2
DS15-2
net NET00225

U4-39
DS13-4
DS14-4
DS16-4
DS15-4
net NET00226

U5-26
DS17-16
net NET00227

U5-25
DS17-11
net NET00228

U5-24
DS18-16
net NET00229

U5-23
DS18-11
net NET00230

U5-21
DS19-16
net NET00231

U5-20
DS19-11
net NET00232

U5-19
DS20-16
net NET00233

U5-18
DS20-11
net NET00234

U5-37
DS17-10
DS18-10
DS20-10
DS19-10
net NET00235

U5-5
DS17-9
DS18-9
DS20-9
DS19-9
Net NET00236

U5-7
DS17-12
DS18-12
DS20-12
DS19-12
Net NET00237

U5-6
DS17-7
DS18-7
DS20-7
DS19-7
Net NET00238

U5-2
DS17-1
DS18-1

TABLE 3A-continued

DS20-1
DS19-1
Net NET00239

U5-35
DS17-18
DS18-18
DS20-18
DS19-18
net NET00240

U5-3
DS17-13
DS18-13
DS20-13
DS19-13
net NET00241

U5-38
DS17-6
DS18-6
DS20-6
DS19-6
net NET00242

U5-33
DS17-17
DS18-17
DS20-17
DS19-17
net NET00243

U5-36
DS17-15
DS18-15
DS20-15
DS19-15
net NET00244

U5-32
DS17-14
DS18-14
DS20-14
DS19-14
net NET00245

U5-4
DS17-5
DS18-5
DS20-5
DS19-5
net NET00246

U5-34
DS17-8
DS18-8
DS20-8
DS19-8
net NET00247

U5-40
DS17-2
DS18-2
DS20-2
DS19-2
net NET00248

U5-39
DS17-4
DS18-4
DS20-4
DS19-4
net NET00249

U6-26
DS21-16

TABLE 3A-continued net NET00250

U6-25
DS21-11
net NET00251

U6-24
DS22-16
net NET00252

U6-23
DS22-11
net NET00253

U6-21
DS23-16
net NET00254

U6-20
DS23-11
net NET00255

U6-19
DS24-16
net NET00256

U6-18
DS24-11
net NET00257

U6-37
DS21-10
DS22-10
DS24-10
DS23-10
net NET00258

U6-5
DS21-9
DS22-9
DS24-9
DS23-9
net NET00259

U6-7
DS21-12
DS22-12
DS24-12
DS23-12
net NET00260

U6-6
DS21-7
DS22-7
DS24-7
DS23-7
net NET00261

U6-2
DS21-1
DS22-1
DS24-1
DS23-1
net NET00262

U6-35
DS21-18
DS22-18
DS24-18
DS23-18
net NET00263

U6-3
DS21-13
DS22-13
DS24-13
DS23-13

TABLE 3A-continued net NET00264

U6-38
DS21-6
DS22-6
DS24-6
DS23-6
net NET00265

U6-33
DS21-17
DS22-17
DS24-17
DS23-17
net NET00266

U6-36
DS21-15
DS22-15
DS24-15
DS23-15
net NET00267

U6-32
DS21-14
DS22-14
DS24-14
DS23-14
net NET00268

U6-4
DS21-5
DS22-5
DS24-5
DS23-5
net NET00269

U6-34
DS21-8
DS22-8
DS24-8
DS23-8
Net NET00270

U6-40
DS21-2
DS22-2
DS24-2
DS23-2
Net NET00271

U6-39
DS21-4
DS22-4
DS24-4
DS23-4
Net NET00052

J1-3
S2-1
S6-1
Net NET00051

J1-4
S7-1
S3-1
net NET00032

J1-8
S4-2
S5-2
S6-2
S7-2
S8-2
net NET00054

J1-1
S4-1

TABLE 3A-continued net EARTH

J1-2
S1-1
S5-1
net NET00003

J1-7
S1-2
S2-2
S3-2
net NET00034

J1-5
S8-1

TABLE 3B net VCC

C15-A
U15-1
U15-8
R4-B
R3-B
U7-1
U7-2
CR6-2
U1-31
U1-40
U3-38
U3-15
Q2-3
C26-1
U6-2
C45-1
C1-A
C3-A
C2-A
RN1-1
R7-B
U20-16
C21-A
U21-16
C44-2
C46-1
VR1-3
C31-1
U18-16
C18-A
U17-6
C17-A
C19-A
U19-16
C34-2
C35-1
C20-A
C39-2
C40-1
U17-16
U5-14
U2-20
U6-8
U7-8
net GND

C14-B
U14-3
U14-4
C29-2
C15-B
U15-2
U15-3
U15-7
U15-4
U7-3

TABLE 3B-continued

U7-7
U1-20
C22-B
C23-B
U3-1
U3-16
U3-26
Q2-1
C26-2
U6-1
U6-3
U6-7
C45-2
C1-B
C3-B
U2-1
C2-B
CR1-3
U20-15
C21-B
U21-15
C46-2
C47-1
C27-MINUS
VR1-2
C28-MINUS
C31-2
R2-A
U18-8
C18-B
C17-B
C19-B
U19-15
C35-2
C36-1
C20-B
C40-2
C41-1
J5-3
J5-1
J5-5
J5-7
J4-3
J4-1
J4-5
J4-7
J3-3
J3-1
J3-5
J3-7
J6-3
J6-1
J6-5
J6-7
J7-3
J7-1
J7-5
J7-7
J8-3
J8-1
J8-5
J8-7
J9-2
U17-8
U5-7
U2-10
U6-4
U7-4
net RS232_ADDR0

U1-1
U8-11
U17-1
net RS232_ADDR1

U1-2
U18-10
U17-2

TABLE 3B-continued net RS232_ADDR2

U1-3
U18-9
U17-3
net WRITE_LATCH_1

R7-A
U5-6
J11-10
net RS232_CE

U1-4
U18-7
U17-5
net NET00159

U20-14
J5-6
net NET00160

U21-13
J7-2
net TXD

U1-11
U17-4
net NET00073

U19-6
C36-2
net NET00074

C32-2
U19-3
net NET00076

C33-1
U19-4
net +12 V

CR1-4
C27-PLUS
VR1-1
C28-PLUS
LD1-A
J5-4
J5-8
J4-4
J4-8
J3-4
J3-8
J6-4
J6-8
J7-4
J7-8
J8-4
J8-8
J9-1
net NET00005

C32-1
U19-1
net NET00006

U19-2
C34-1
net NET00007

C33-2
U19-5
net NET00008

U19-14
J3-6
net NET00009

U19-13
J3-2

TABLE 3B-continued net NET00016

U19-7
J4-6
net NET00029

U20-11
U17-13
net NET00030

U20-12
U18-2
net NET00044

U20-6
C41-2
net NET00028

U19-8
J4-2
net NET00045

U20-3
C37-2
net NET00047

U20-4
C38-1
net NET00145

U17-15
U19-11
net NET00049

U20-1
C37-1
net NET00050

U20-5
C38-2
net NET00051

U20-2
C39-1
net NET00150

U18-4
U19-12
net NET00112

U20-10
U17-12
net NET00054

U20-7
J6-6
Net NET00062

U20-8
J6-2
Net NET00063

U20-13
J5-2
Net RXD

U1-10
U18-5
Net NET00092

U21-7
J8-6
Net NET00093

U21-8
J8-2

TABLE 3B-continued

Net NET00048

U20-9
U18-1
Net NET00113

U21-11
U17-11
net NET00098

U21-14
J7-6
net NET00114

U21-12
U18-15
net NET00116

U21-10
U17-10
net NET00144

U21-9
U18-14
net NET00151

U17-14
U19-10
net NET00152

U18-3
U19-9
net NET00106

U21-2
C44-1
net NET00107

U21-5
C43-2
net NET00108

U21-1
C42-1
net NET00109

U21-4
C43-1
net NET00110

U21-3
C42-2
net NET00111

U21-6
C47-2
net I/O SELECT

U1-5
J11-4
net NET00065

U3-14
J10-3
net NET00066

U3-13
J10-2
net NET00037

CR1-1
FB2-2
FB2-3
net NET00072

FB1-2
FB1-3
S1-2
S1-5

TABLE 3B-continued net NET00011

FB1-1
FB1-4
J2-1
net NET00012

FB2-1
FB2-4
J2-3
net D1

U1-38
U3-31
U2-3
RN1-3
J11-5
net D3

U1-36
U3-33
U2-5
RN1-5
J11-6
net D4

U1-35
U3-34
U2-6
RN1-6
J11-15
net D7

U1-32
U3-37
U2-9
RN1-9
J11-8
net D6

U1-33
U3-36
U2-8
RN1-8
J11-14
net D5

U1-34
U3-35
U2-7
RN1-7
J11-7
Net D2

U1-37
U3-32
U2-4
RN1-4
J11-16
Net D0

U1-39
U3-30
U2-2
RN1-2
J11-17
Net A0

U3-29
U2-19
J11-1
Net NET00064

U14-6
U15-6
R3-A
U7-6
U1-14
U6-6

TABLE 3B-continued net NET00035

U1-21
U3-39
net WRITE_PORT

U1-16
U3-47
J11-18
net VFD_RS

U1-6
J11-9
net VFD_RW

U1-7
J11-12
net NET00013

R2-B
LD1-C
net NET00001

CR1-2
S1-1
S1-4
net NET00061

U14-5
U15-5
R4-A
U7-5
U1-15
U6-5
net A1

U3-28
U2-18
J11-20
net READ_PORT

U1-17
U3-50
J11-13
net NET00067

U3-12
J10-1
net NET00025

U3-19
J10-5
net NET00026

U3-17
J10-4
net NET00003

U1-27
U3-45
net WRITE_LATCH_2

U1-12
U5-5
J11-11
net NET00002

U1-9
U5-3
Q2-2
net A2

U3-27
U2-17
J11-2
net NET00032

U3-20
J10-6

TABLE 3B-continued net A3

U3-25
U2-16
J11-19
net ~RESET

U3-48
U5-4
net NET00004

U1-26
U3-44
net NET00010

U1-25
U3-43
net NET00017

U1-24
U3-42
net NET00018

U1-23
U3-41
net NET00274

U1-18
Y1-2
C23-A
net NET00041

U1-29
U3-49
net NET00277

U1-19
C22-A
Y1-1
net NET00033

Y2-1
C25-B
U14-1
Net NET00019

U1-22
U3-40
Net NET00000

C25-A
C14-A
U14-8
C29-1
CR6-1
Net NET00031

U1-28
U3-46
Net ALE

U1-30
U3-10
U2-11
Net NET00043

Y2-2
U14-2

TABLE 3C net GND

CR1-3
SW1-2

TABLE 3C-continued

U4-1
U4-3
U4-7
Q1-1
U1-20
VR1-4
VR1-2
VR1-3
D1-2
C15-2
C14-MINUS
C4-B
J2-3
J2-1
J2-5
J2-7
U2-10
U2-8
U2-15
C7-1
C2-2
C1-2
C11-B
C12-B
U6-1
U6-16
U6-26
C6-B
J3-5
J3-6
J4-5
J4-6
J5-5
J5-6
J6-4
U5-7
U4-4
net NET00000

SW1-1
R1-B
U5-11
net NET00001

U5-10
U1-14
net NET00002

LD2-C
U5-4
net NET00003

J2-6
U2-13
net NET00043

U1-2
RN1-3
J3-4
Net SDATA

U4-5
U1-8
RN1-9
Net NET00028

CR1-1
J1-1
Net NET00032

U1-15
U5-5
U5-1
Net NET00036

U5-12
U6-48

TABLE 3C-continued

Net NET00037

U1-11
U2-11
Net VCC

R1-A
U4-2
Q1-3
U1-31
U1-40
VR1-1
L1-2
L1-4
C15-1
C4-A
U2-16
C8-2
C2-1
C1-1
U6-38
U6-15
C6-A
RN1-1
R6-B
R5-A
R4-A
R3-A
R2-A
U5-14
U4-8
Net NET00038

U1-10
U2-12
Net NET00042

U1-4
RN1-5
J4-4
net EE_SCLK

U4-6
U1-7
RN1-8
net NET00005

U1-1
RN1-2
J3-3
net NET00008

CR1-4
VR1-5
D2-1
C14-PLUS
net NET00006

U1-3
RN1-4
J4-3
net RESET

Q1-2
U1-9
U5-13
net NET00039

U1-39
U6-30
net NET00040

U1-38
U6-31
net NET00041

U1-37
U6-32

TABLE 3C-continued net NET00044

U1-36
U6-33
net NET00045

U1-35
U6-34
net NET00046

U1-34
U6-35
net NET00026

U1-5
RN1-6
J5-3
net NET00031

U1-6
RN1-7
J5-4
net NET00047

U1-33
U6-36
net NET00048

U1-32
U6-37
net NET00049

U1-21
U6-39
net NET00050

U1-22
U6-40
net NET00051

U1-23
U6-41
net NET00052

U1-24
U6-42
net NET00053

U1-25
U6-43
net NET00054

U1-26
U6-44
net NET00055

U1-27
U6-45
net NET00056

U1-28
U6-46
net NET00057

U1-16
U6-47
net NET00058

U1-17
U6-50
net NET00059

U1-29
U6-49
net NET00060

U1-30
U6-10

TABLE 3C-continued net NET00061

J7-6
U6-20
Net NET00062

J7-5
U6-19
Net NET00064

J7-4
U6-17
Net NET00065

J7-3
U6-14
Net NET00066

J7-2
U6-13
Net NET00067

J7-1
U6-12
Net NET00009

J3-2
J4-2
R6-A
J5-2
Net NET00274

U1-18
Y1-2
C12-A
Net NET00277

U1-19
Y1-1
C11-A
Net NET00138

U2-1
C9-1
Net NET00143

U2-2
C8-1
Net NET00069

U2-5
C10-2
Net NET00070

J2-2
U2-14
Net NET00073

U2-6
C7-2
Net NET00074

U2-3
C9-2
net NET00076

U2-4
C10-1
net +12V
D2-2
J2-4
J2-8
net NET00020

LD1-C
U5-3
U5-2

TABLE 3C-continued net NET00022

R4-B
LD1-A
net NET00025

R5-B
LD2-A
net NET00027

R3-B
U5-8
J6-2
net NET00030

R2-B
U5-9
U5-6
J6-1
net NET00267

CR1-2
J1-3
net NET00010

VR1-6
VR1-8
net NET00013

VR1-7
L1-1
L1-3
D1-1

TABLE 3D

Net NET00000

U2-1
U1-4
net NET00001

U2-2
U1-5
net GND

J1-5
U3-1
U3-8
C3-B
SW1-3
SW1-4
SW2-3
SW2-4
SW3-3
SW3-4
SW4-3
SW4-4
U2-10
U1-2
U1-1
U1-8
C1-B
LD1-C
LD2-C
LD3-C
LD4-C
J1-1
J2-2
net NET00002

U2-3
U1-6

TABLE 3D-continued net NET00003

U2-5
U1-9
net NET00004

U2-7
U1-11
net NET00005

U2-4
U1-7
net NET00006

U2-6
U1-10
net NET00007

U2-8
U1-12
net NET00008

U2-18
R1-B
Net NET00009

U2-17
R2-B
Net NET00012

U2-13
R6-B
Net NET00015

R14-A
LD7-G
Net NET00025

R3-A
LD2-R
Net NET00027

R7-A
LD4-R
Net NET00029

R11-A
LD6-R
Net NET00031

R16-A
LD8-G
net NET00034

U5-8
U4-12
net NET00035

U5-6
U4-10
net NET00036

U5-7
U4-11
net NET00037

U5-5
U4-9
net NET00033

U5-1
U4-4
net NET00038

U5-11
R16-B

TABLE 3D-continued net NET00039

U5-13
R14-B
net NET00051

U3-4
SW1-1
SW1-2
net NET00040

U5-12
R15-B
net NET00041

U5-14
R13-B
net NET00042

U5-18
R9-B
net NET00043

U2-14
R5-B
net NET00044

U5-16
R11-B
net NET00047

U5-4
U4-7
net NET00048

U5-3
U4-6
net NET00049

U5-2
U4-5
net NET00045

U5-17
R10-B
net NET00052

U3-5
SW2-1
SW2-2
net NET00053

U3-6
SW3-1
SW3-2
net NET00054

U3-7
SW4-1
SW4-2
net NET00055

U3-9
J2-6
net NET00056

U3-10
J2-7
net SCLK

J1-3
U3-14
U1-14
R17-B
J2-4
net NET00068

U3-11
J2-8

TABLE 3D-continued net SDATA

J1-4
R18-B
U3-15
U1-15
J2-5
net VCC_1

U5-9
U4-16
U4-1
C4-A
J4-2
J3-1
net GND-COM

U5-10
U4-2
U4-8
C4-B
J4-5
SW5-3
SW5-4
SW6-3
SW6-4
SW7-3
SW7-4
SW8-3
SW8-4
LD5-C
LD6-C
LD7-C
LD8-C
J4-1
J3-2
net VCC J1-2
R18-A
U3-16
U3-2
C3-A
U2-9
U1-16
C1-A
R19-A
R17-A
J2-1
net NET00016

R1-A
LD1-R
net NET00017

R2-A
LD1-G
net NET00018

R5-A
LD3-R
net NET00019

R9-A
LD5-R
net NET00020

U2-12
R7-B
net NET00021

R6-A
LD3-G
net NET00022

R10-A
LD5-G

TABLE 3D-continued net NET00023

U2-11
R8-B
net NET00010

U2-16
R3-B
net NET00011

U2-15
R4-B
net NET00013

U3-12
J2-9
net NET00024

R13-A
LD7-R
net NET00026

R4-A
LD2-G
net NET00028

R8-A
LD4-G
net NET00030

R12-A
LD6-G
net NET00032

R15-A
LD8-R
net NET00014

U5-15
R12-B
net FRONT/~BACK

J1-6
U3-3
U1-3
R19-B
J2-3
net NET00050

U4-14
J4-3
J3-4
net NET00057

U4-3
J4-6
J3-3
net NET00060

U4-15

TABLE 3E net GND: C1-B, J1-5, J1-1, U1-8, SW1-3, SW1-4, SW2-3, SW2-4, SW3-3, SW3-4,
net NET00001: J1-6, R4-B, U1-3
net VCC: R1-A, R3-A, R2-A, C1-A, J1-2, R4-A, U1-16, U1-2, U1-1
net NET00002: J1-4, U1-15
net NET00003: J1-3, U1-14
net NET00006: U1-4, LD1-C
net NET00007: LD2-C, U1-5
net NET00008: LD3-C, U1-6
net NET00009: R1-B, LD1-A
net NET00010: R2-B, LD2-A
net NET00011: R3-B, LD3-A
net NET00012: U1-10, SW3-1, SW3-2

TABLE 3E-continued net NET00013: U1-9, SW2-1, SW2-2
net NET00014: U1-7, SW1-1, SW1-2

Station/Worker Interface Board

FIG. 11 is a schematic diagram of the station/worker interface board (SWIB) 150 shown in FIG. 10. The SWIB 150 includes serially-addressable ports PCF8574T U1, U3, U4, drivers UDN2982LW U2, U5, LED's LD1–LD8, 330 ohm resistors R1–R16, 4.7 k ohm resistors R17–R19, 0.1 uF capacitor C1, C3, C4 and switches SW1–SW8. The LED's LD1–LD8 correspond to the product status indicators 44 on the SWIB 150, and the switches SW1–SW8 correspond to the product status switches 42 on the SWIB 150.

A connector J1 provides electrical connection between selected signals on the SWIB 150 and the station interface board (SIB) 152. The serially-addressable ports PCF8574T U1, U3, U4 and the drivers UDN2982LW U2, U5 enable control of the product status indicators 44, and monitoring of the product status switches 42 via serialized data to and from the SIB 152. Groups of two LED's and two switches, such as LED's LD1–LD2 and switches SW1–SW2 correspond to one column on one of the stations 12, 14, 16. The 4.7 k ohm resistors R17, R18 and R19 are used to pull the corresponding signals up to VCC, and the 0.1 uF capacitors C1, C3, C4 provide bypass capacitance for the SWIB 150.

The connector J1 for the SWIB 150 corresponding to the front of the station and the connector J1 for the SWIB 150 corresponding to the rear of station are connected to a modular T-connector (not shown), such as those used for telephones. A front/back signal coupled to connector J1 provides a unique address, which determines whether the corresponding SWIB 150 corresponds to the front or rear of the station. In the preferred embodiment, the pin on connector J1 corresponding to the front/back signal on the front SWIB 150 is cut, and since the front/back signal is pulled up to VCC on the SWIB 150, this SWIB 150 corresponds to the front of the station. Similarly, the front/back signal on the SWIB 150 corresponding to the rear of the station is tied to ground, which indicates that this SWIB 150 corresponds to the rear of the station. Thus, the preferred embodiment is advantageous in that the front/back signal is not required for the SWIB 150 corresponding to the front of the station, which results in a significant reduction in the number of wires between the SWIB 150 and the SIB 152.

Remapping of Product Status Switches

FIGS. 8D and 8E show the display 18 mounted facing the front of the holding station 16 and the rear of the holding station 16, respectively. It is preferred that the position of a given product type section 132 on the display 18 spatially corresponds to one of the upper and lower tray combinations on the holding station 16 as shown by dashed lines A on FIG. 8D. Each of the upper and lower tray combinations includes the product status indicators 42, product status switches 44, product label 46 and upper and lower trays 48. It is sometimes desirable to mount the display 18 facing the rear of the holding station 16 if, for instance, access to an ac outlet can only be obtained by doing so. When this is done, the product type sections 132 on the display no longer correspond spatially to the correct upper and lower tray combinations as shown by dashed lines B on FIG. 8E. However, by remapping the addresses of the serially addressable ports PCF8574T U1–U3 the spatial correspondence shown in FIG. 8D can again be achieved. This remapping can be achieved through software in the operational program of the SIB 152 or the SCB 156 based upon a switch selected by the user to indicate whether the display 18 is mounted facing the front of the holding station 16 or the rear of the holding station 16.

Active/Transfer Board

Figure 12:
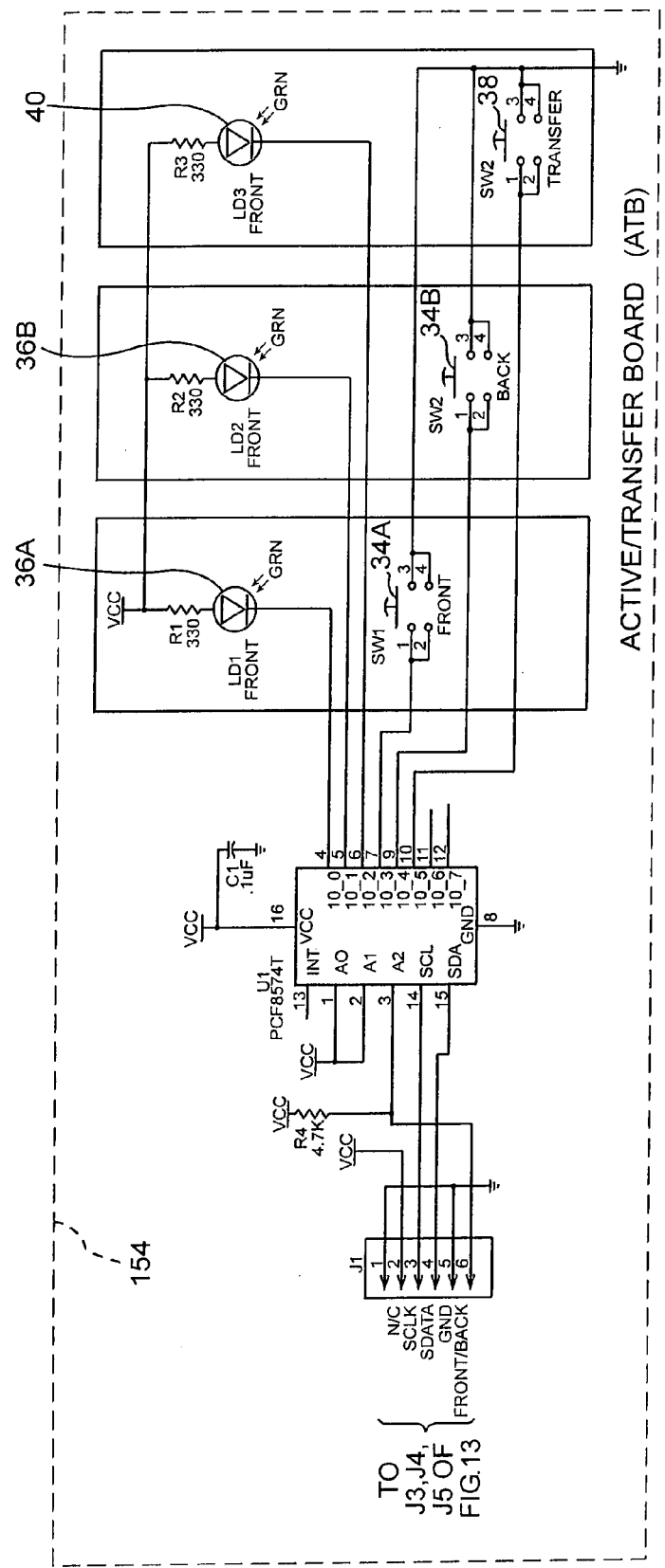
FIG. 12 is a schematic diagram of an active/transfer board (ATB) of the product status and transfer system formed in accordance with the present invention.

FIG. 12 is a schematic diagram of the active/transfer board (ATB) 154. The ATB 154 includes connector J1, LED's LD1–LD3, 330 ohm resistors R1–R3 and switches SW1–SW3. The switches SW1–SW3 correspond to the active switch 34A, for the front of the station, the active switch 34B for the rear of the station and the transfer switch 38, respectively. The LED's LD1–LD3 correspond to the active indicator 36A for the front of the station, the active switch 36B for the rear of the station, and the transfer indicator 40, respectively. The 330 ohm resistors R1–R3 limit the series current seen by the LED's LD1–LD3, and the connector J1 provides electrical connection between the ATB 154 and the SIB 152. A serially-addressable port PCF8574A7 U1 is electrically connected to and disposed between the connector J1 and the switches SW1–SW3 and LED's LD1–LD3. The serially-addressable port PCF85747 U1 enables the SIB 152 to access each of the switches and LED's via a serial data and address stream.

Station Interface Board

FIG. 13 is a schematic diagram of the station interface board (SIB) 152. The SIB 152 includes a microcontroller 80C32A U1, which monitors and controls the SIB 152, the ATB 154 and the SWIB 150. A serial data bus is pulled up to VCC using a 4.7 k ohm resistor pack RN1. Three sets of serial ports, which are electrically connected to three connectors J3–J5, enable the microcontroller 80C32A U1 to monitor the product status switches 44 located on the SWIB 150.

The combination of an 11.059 MHz crystal Y1 and 30 pF capacitors C11, C12 provide a clock signal to the microcontroller 80C32A U1. A reset circuit DS1833-10 provides a reset signal having the required rise time, fall time and duration to the microcontroller 80C32A U1. A serial interface MAX 232 U2 and 10 uF capacitors C7–C10 in electrical connection thereto, provide an RS-232 bidirectional serial interface between the microcontroller 80C32A U1 on the SIB 152 and components on the station control board 156 via a connector J2.

A set of capacitors C1, C2, C4, C5 provide bypass capacitance, and a 4.7 k ohm resistor R1–R3 is used to pull corresponding signals up to VCC. An inverter 7406 U10 is used to logically invert the reset signal before being applied to a memory device PSD813F U8, which provides external RAM and ROM for the microcontroller 80C32A U1. A set of LED's LD1, LD2 provide a visual indication of the day part, and whether the microcontroller 80C32A U1 is running, which is also provided to an optional warmer daypart temperature select board (not shown) via a connector J6. A set of 330 ohm resistors R4, R5 are used to limit the series current seen by the LED LD1, LD2 and inverters 7405 U5 provide the necessary drive current.

Connectors J3–J5 provide electrical connection between signals on the SIB 152 and those on each of up to six SWIB 150 and two ATB 154. A voltage regulator LM2575T-5.0 VR1, L1, diodes D1, D2, a 470 uF capacitor C14, a 220 uF capacitor C15, and a bridge rectifier CR1 provide regulation of a 12 volt supply to a 5 volt VCC via a connector J1 on the SIB 152. A programmable read only memory (PROM) 24C164 U4 provides additional permanent memory storage for the microcontroller 80C32A U1.

Station Control Board

FIGS. 14A and 14B are schematic diagrams for the station control board (SCB) 156. The SCB 156 is substantially similar to the SIB 152 with the exception of an additional bank of serial PROM 24C164 U6, U7 and a serial RAM PCF8570 U15, which provide additional external memory for the microcontroller 80C32 U1. A time-of-day clock PCF8583 U14 in combination with a 32.768 KhZ oscillator Y2, a 0.1 uF capacitors C29, C14 an 18 pF capacitor C25 and a diode 1N270 CR5 provide a battery-backed time of day to the microcontroller 80C32 U1 to permit, for instance, automated control of the day part and the activity level.

The schematic diagram for the SCB 156 continues on FIG. 14B with a decoder 74LS138 U17 and a multiplexer 74LS251N U18, which provide address decoding and data directivity for three bidirectional serial channels provided by a set of serial interfaces MAX232 U19–U21, and 10 uF capacitors C32–C47 which are electrically connected to connectors J3–J8. The connectors J3–J8 then connect to J2 on FIG. 13 of the SIB 153. A connector J11 on the SCB 156 provides electrical connection between signals such as the data bus on the SCB 156 and the display board 158.

A connector J2 provides a 12 v ac power signal from the display board to ferrite beads FB1, FB2, a switch S1, a bridge rectifier CR1, 470 μF capacitors C27, C28, an LED LD1 and a 1.43 k ohm resistor R2, which convert the 12 v ac power signal to a 12 v dc power signal. The 12 v dc power signal is regulated down to 5 v dc by a voltage regulator LM7805CT VR1 and a 10 μF capacitor C31. The 12 v dc power signal is also provided to the display board via a connector J9. The remaining components shown in FIGS. 14A and 14B and their associated functions and connectivity are substantially similar to those described above for the SIB 152 shown in FIG. 13.

Display Board

The display board 158 is shown in FIGS. 15A–15L. The connector J11 on the station control board 156 shown in FIG. 14A is coupled to a connector J2 on the display board 158 shown in FIG. 15A, and provides the multiplexed address and data bus to decoders 74LS138 U16–U18, latches 74HCT574 U13, U15 and a buffer 74HCT540 U14. The outputs of the buffer 74HCT540 U14 are pulled up to VCC with a 10K ohm resistor pack RN1. These devices along with a transistor 2N7000 Q1 and a 180 ohm resistor R3 enable control of the displays and indicators located on the display board 158 shown in FIGS. 15C–15K, as well as a vacuum fluorescent display VFD1 shown in FIG. 15A, by the station control board 156. A set of 0.1 μF capacitors C1–C18 provide bypass capacitance for the devices on the display board 158.

The vacuum fluorescent display VFD1 shown in FIG. 15A corresponds to the alphanumeric display 142 shown in FIG. 4. Groups of four 14-segment displays LTP3784E DS1–DS24 shown in FIGS. 15C–15H correspond to one product name display 134 shown in FIG. 4. Each of the 14-segment displays LTP3784E DS1–DS24 is capable of indicating two alphanumeric digits. The decoders, latches and buffer shown in FIGS. 15A and 15B are electrically connected to six 14-segment drivers ICM7243B U1–U6 shown in FIGS. 15C and 15H. These drivers provide the signals required by the 14-segment displays LTP3784 DS1–DS24 to display the identities of the different products sold. It is to be noted that there are twelve groups of four 14-segment displays LTP3784E DS1–DS24 shown in FIGS. 15C and 15H, which correspond to the twelve product name displays 134 on FIG. 4.

FIGS. 15I and 15K show the pan fill level display 136 and the product status indicators 44 located on the display 18 as shown in FIG. 4. Twelve groups of two 7-segment displays LN524RA DS25–DS36 correspond to the twelve pan fill level displays 136 shown in FIG. 4. Likewise, groups 160 of eight LED's LD1–LD100 correspond to the product status indicators 44 in each product type section 132 shown in FIG. 4. For instance, LED LD1 on FIG. 15I corresponds to the product status indicator 44 in the first column and upper first row in the front counter station 12, and LED LD2 corresponds to the product status indicator 44 corresponding to the first column and lower first row in the front counter station 12. Six 7-segment display drivers ICM7228A U7–U12 are electrically connected to the decoders, latches and buffer shown in FIGS. 15A and 15B, and provide signals required for the LED's LD1–LD100 and the 7-segment displays LN524RA DS25-DS36 to display the status and the pan fill levels for each product, respectively.

FIG. 16F is a schematic diagram of the activity level switch 138, the day part select switch 140, the menu switch 144, the editing cursor switches 146 and the enter switch 148 shown in the lower portion of the display 18 on FIG. 4. Each of the switches include two terminals interconnected in a column and row matrix and provided as signals via a connector J1 to the buffer 74HCT540 U14 and the latch 74HCT574 U15 shown in FIG. 15A. The microcontroller 80C32 U1 on the SCB 156 can readily determine which of the switches was selected by accessing the buffer and latch by means well known in the art.

Additional Embodiments

The product status indicators 44 may include a liquid crystal display (LCD) or light emitting diode (LED) display, which is used to display the current value of the storage time for the corresponding food product. The worker may then use the storage time to determine whether a particular action should be taken with respect to the corresponding food product, such as cooking replenishment product or discarding the product.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A product status system for monitoring the status and storage location of a prepared food product, which comprises:
    a processing circuit;
    a food product status switch associated with a storage location, the food product status switch being coupled to the processing circuit;
    a food product status indicator associated with the storage location, the food product status indicator being coupled to the processing circuit, the food product status indicator having at least a first state which indicates that the prepared food product is stored at the associated storage location and at least a second state which indicates that the prepared food product is not stored at the associated storage location, the state of the food product status indicator associated with the storage location changing from the second state to the first state in response to the prepared food product being supplied to the storage location and the food product status switch being selectively operated by a user, the state of the food product status indicator associated with the storage location changing from the first state to the second state in response to the storage location no longer containing prepared food product and the food product status switch being selectively operated by the user;
    a storage timer associated with the storage location, the storage timer being coupled to the processing circuit, the storage timer being initiated in response to the food product status indicator changing from the second state to the first state, the storage timer counting a storage time, the storage time being representative of the duration of time that the prepared food product has been stored at the storage location, the food product status indicator having at least a third state which indicates that the storage time exceeds an acceptable food product hold time, the processing circuit comparing the storage time with the acceptable food product hold time, the state of the food product status indicator associated with the storage location changing to the third state in response to the storage time exceeding the acceptable food product hold time.

2. A product status system which monitors the status and storage location of a prepared food product in a restaurant as defined by claim 1, wherein the food product status indicator has at least a fourth state which indicates that the cooking of a replenishment food product should commence, wherein the processing circuit compares the storage time with a cook start time, the cook start time being equal to the difference between the acceptable food product hold time and the time required to cook the replenishment food product, and wherein the state of the food product status indicator associated with the storage location is changed to the fourth state in response to the storage time exceeding the cook start time.

3. A product status system which monitors the status and storage location of a prepared food product in a restaurant as defined by claim 1, further comprising a display, the display indicating the state of the food product status indicator associated with the storage location, the display being located remotely from the storage location.

4. A product status system which monitors the status and storage location of a prepared food product in a restaurant as defined by claim 1, further comprising an active switch associated with the storage location, wherein the food product status indicator has at least a seventh state which indicates that the storage location is not being used, the state of the food product status indicator changing to the seventh state in response to activation of the active switch.

5. A product status system which monitors the status and storage location of a prepared food product in a restaurant as defined by claim 1, wherein the food product status indicator has at least a seventh state which indicates that the storage location is not being used, the state of the food product status indicator changing to the seventh state in response to at least one of a time, a day and an event.

6. A product status system which monitors the status and storage location of a prepared food product in a restaurant as defined by claim 1, further comprising a pan fill level display associated with the storage location, the pan fill level display indicating a quantity of the prepared food product to cook in response to the state of the food product status indicator changing to the second state.

7. A product status system which monitors the status and storage location of a prepared food product in a restaurant as defined by claim 6, wherein the pan fill level display is located remotely from the storage location.

8. A product status system which monitors the status and storage location of a prepared food product in a restaurant as defined by claim 6, wherein the storage location has associated therewith a current activity level, wherein the activity level is a rate of sale of the prepared food product, and a pan fill level, wherein the pan fill level is the quantity of the prepared food product to cook in response to the state of the food product status indicator changing to the second state, the pan fill level changing as a function of the current activity level.

9. A product status system which monitors the status and storage location of a prepared food product in a restaurant as defined by claim 8, further comprising a memory, the current activity level being stored in the memory.

10. A product status system which monitors the status and storage location of a prepared food product in a restaurant as defined by claim 8, further comprising a manual activity level switch associated with the storage location, the current activity level changing in response to activation of the manual activity level switch.

11. A product status system which monitors the status and storage location of a prepared food product in a restaurant as defined by claim 8, wherein the current activity level is changed in response to at least one of a time, a day and an event and without the need to load new data.

12. A product status system which monitors the status and storage location of a prepared food product in a restaurant as defined by claim 8, further comprising an activity level display, the activity level display being located remotely from the storage location, the current activity level being displayed on the activity level display.

13. A product status system which monitors the status and storage location of a prepared food product in a restaurant as defined by claim 6, further comprising a selectable menu display, the storage location having a selectable menu associated therewith, the selectable menu having associated therewith a pan fill level, the pan fill level corresponding to the quantity of the prepared food product to cook in response to the state of the food product status indicator changing to the second state, the selectable menu being electronically displayed on the selectable menu display.

14. A product status system which monitors the status and storage location of a prepared food product in a restaurant as defined by claim 13, which further comprises a selectable menu switch associated with the storage location, the selectable menu changing in response to activation of the selectable menu switch.

15. A product status system which monitors the status and storage location of a prepared food product in a restaurant as defined by claim 1, wherein the storage location has a food product pan associated therewith, at least one of the food product status switch and the food product status indicator being located in proximity to the food product pan.

* * * * *